(12) United States Patent
Akiyama et al.

(10) Patent No.: US 9,497,170 B2
(45) Date of Patent: Nov. 15, 2016

(54) COMPUTER ASSISTED NAME-BASED AGGREGATION SYSTEM FOR IDENTIFYING NAMES OF ANONYMIZED DATA

(71) Applicant: International Business Machines Corporation, Armonk, NY (US)

(72) Inventors: Kazuhito Akiyama, Tokyo (JP); Nobuhiro Asai, Tokyo (JP); Masami Tada, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 212 days.

(21) Appl. No.: 14/227,254

(22) Filed: Mar. 27, 2014

(65) Prior Publication Data

US 2014/0298030 A1    Oct. 2, 2014

(30) Foreign Application Priority Data

Mar. 27, 2013 (JP) ................. 2013-066377

(51) Int. Cl.
*H04L 29/06* (2006.01)
(52) U.S. Cl.
CPC ......... *H04L 63/0421* (2013.01); *H04L 63/062* (2013.01)
(58) Field of Classification Search
CPC ....................... G06F 11/30; H04L 63/0421
USPC ........................................ 713/172
See application file for complete search history.

(56) References Cited

U.S. PATENT DOCUMENTS 5,345,587 A * 9/1994 Fehskens ............... H04L 12/24
                                                    718/102
7,234,059 B1 * 6/2007 Beaver ................. H04L 9/0833
                                                    380/283
(Continued)

FOREIGN PATENT DOCUMENTS

JP    2002175432 A    6/2002
JP    2005301978 A    10/2005
(Continued)

OTHER PUBLICATIONS

WorldLII, "Act on the Protection of Personal Information (Japan)—[2005]", 2005.*

(Continued)

*Primary Examiner* — Ondrej Vostal
(74) *Attorney, Agent, or Firm* — Yee & Associates, P.C.; Richard Wilhelm

(57) ABSTRACT

A computer assisted name-based aggregation system that acquires anonymized data from a plurality of service providing systems without obtaining the personal information, and identifies the name of the acquired anonymized data. The computer assisted name-based aggregation system transmits a transmission request that requests transmission of data, and a value that changes for each transmission request to the plurality of service providing systems; receives a set containing hash values created based on an identification number for controlling data and the aforementioned value, and the anonymized data specified by the identification number, from the plurality of service providing systems; and identifies the name of anonymized data specified by the hash value from the anonymized data received from each of the plurality of service providing systems.

25 Claims, 39 Drawing Sheets

(56) References Cited

U.S. PATENT DOCUMENTS

| | | | | |
|---|---|---|---|---|
| 7,385,479 | B1* | 6/2008 | Green | G06Q 10/00 340/286.02 |
| 7,644,285 | B1* | 1/2010 | Murray | G06F 21/31 380/285 |
| 8,316,237 | B1* | 11/2012 | Felsher | H04L 9/0825 380/282 |
| 8,756,673 | B2* | 6/2014 | Barrus | G06F 21/6254 713/159 |
| 8,843,997 | B1* | 9/2014 | Hare | H04L 63/0281 709/200 |
| 9,003,186 | B2* | 4/2015 | Kailash | H04L 63/08 713/168 |
| 9,119,050 | B1* | 8/2015 | Metcalf | H04L 67/32 |
| 9,319,311 | B2* | 4/2016 | Wang | H04L 45/306 |
| 2001/0054155 | A1* | 12/2001 | Hagan | G06F 21/6254 713/193 |
| 2003/0061170 | A1* | 3/2003 | Uzo | G06Q 20/06 705/64 |
| 2004/0034591 | A1* | 2/2004 | Waelbroeck | G06Q 30/0251 705/37 |
| 2004/0133671 | A1* | 7/2004 | Taniguchi | G06Q 10/063 709/224 |
| 2005/0283621 | A1* | 12/2005 | Sato | G06F 21/6254 713/189 |
| 2006/0041562 | A1* | 2/2006 | Paczkowsk | G06F 17/30884 |
| 2008/0028206 | A1* | 1/2008 | Sicard | H04L 63/0407 713/156 |
| 2009/0150362 | A1* | 6/2009 | Evenhaim | G06F 21/6254 |
| 2009/0327296 | A1* | 12/2009 | Francis | G06F 17/30 |
| 2010/0131765 | A1* | 5/2010 | Bromley | H04L 63/0414 713/175 |
| 2010/0135484 | A1* | 6/2010 | Nishikawa | H04L 9/3239 380/28 |
| 2010/0185656 | A1* | 7/2010 | Pollard | G06F 17/30578 707/769 |
| 2010/0257358 | A1* | 10/2010 | Grajek | H04L 9/3263 713/158 |
| 2012/0084567 | A1* | 4/2012 | Hwang | H04L 9/3255 713/176 |
| 2012/0246200 | A1* | 9/2012 | Balasubramanian | G06F 21/552 707/809 |
| 2012/0284127 | A1* | 11/2012 | Heiser, II | G06F 17/30867 705/14.66 |
| 2013/0096943 | A1* | 4/2013 | Carey | G06F 19/366 705/2 |
| 2013/0290700 | A1* | 10/2013 | Davis | H04L 63/0428 713/153 |
| 2014/0108262 | A1* | 4/2014 | Plateaux | G06Q 20/3825 705/71 |
| 2014/0123229 | A1* | 5/2014 | Franklin | G06F 21/335 726/4 |
| 2014/0331058 | A1* | 11/2014 | Heyner | G06F 21/602 713/185 |
| 2015/0026784 | A1* | 1/2015 | Kurkure | H04L 63/083 726/7 |
| 2015/0067185 | A1* | 3/2015 | Tamblin | H04N 21/2407 709/231 |
| 2015/0282143 | A1* | 10/2015 | Kim | H04W 8/005 370/329 |
| 2015/0312233 | A1* | 10/2015 | Graham, III | H04L 63/08 713/171 |
| 2016/0004881 | A1* | 1/2016 | Sukeda | G06Q 20/0457 726/27 |

FOREIGN PATENT DOCUMENTS

| | | |
|---|---|---|
| JP | 2006285490 A | 10/2006 |
| JP | 2007142504 A | 6/2007 |
| JP | 2007181011 A | 7/2007 |
| JP | 2007264730 A | 10/2007 |
| JP | 2009020646 A | 1/2009 |
| JP | 2009129321 A | 6/2009 |
| JP | 2010237811 A | 10/2010 |
| JP | 2011243066 A | 12/2011 |
| JP | 2013008175 A | 1/2013 |

OTHER PUBLICATIONS

Asai et al., "Enabling use of world-wide data by on-demand data conversion for achieving a Connected World," ProVISION, No. 74, Aug. 2012, 7 pages (English abstract only). http://www-06.ibm.com/ibm/jp/provision/no74/pdf/74_article2.pdf Yamamoto et al., "The Development of medical data anonymizing software," MSS Technical Report, vol. 19, Mar. 2008, pp. 24-29 (English abstract only). http://www.mss.CO.jp/technology/report/pdf/19-04.pdf.

Honda, "Anonymizing of personal information and a reliable and safe high precision recommendation system," Graduate School of Engineering, Osaka Prefecture University, Dec. 2012, (48 pages) English translation and original Japanese article). http://jstshingi.jp/abst/p/12/1230/osaka2-10.pdf.

"Smarter Planet," International Business Machines Corporation, accessed Mar. 11, 2013, 2 pages (English translation and original Japanese article). http://www-06.ibm.com/innovation/jp/smarterplanet/.

Kwabata et. al., "Proposal of System to Support a User to Judge Whether Personal Data can be Provided," 2013 Proceedings of the IEICE General Conference of the Institute of Electronics, Information and Communication Engineers, B-19-51, Mar. 2013, pp. 595. (English abstract not available).

Quantin et. al., "Automatic Record Hash Coding and Linkage for Epidemiological Follow-up Data Confidentiality," Methods of Information in Medicine, vol. 37, Issue 3, 1998, pp. 271-277.

Tsutsui et. al., "A Study of Distribution Framework for Real-world Data", 2012 Proceedings of the IEICE General Conference of the Institute of Electronics, Information and Communication Engineers, B-19-24, Mar. 2012, p. 647. (English abstract not available).

Yoshikawa, "An Anonymus Student Evaluation System Using Roll Call," IEICE Transactions of the Institute of Electronics, Information and Communication Engineers, J91-D, vol. 12, Dec. 2008, pp. 2992-2994. (English abstract not available).

* cited by examiner

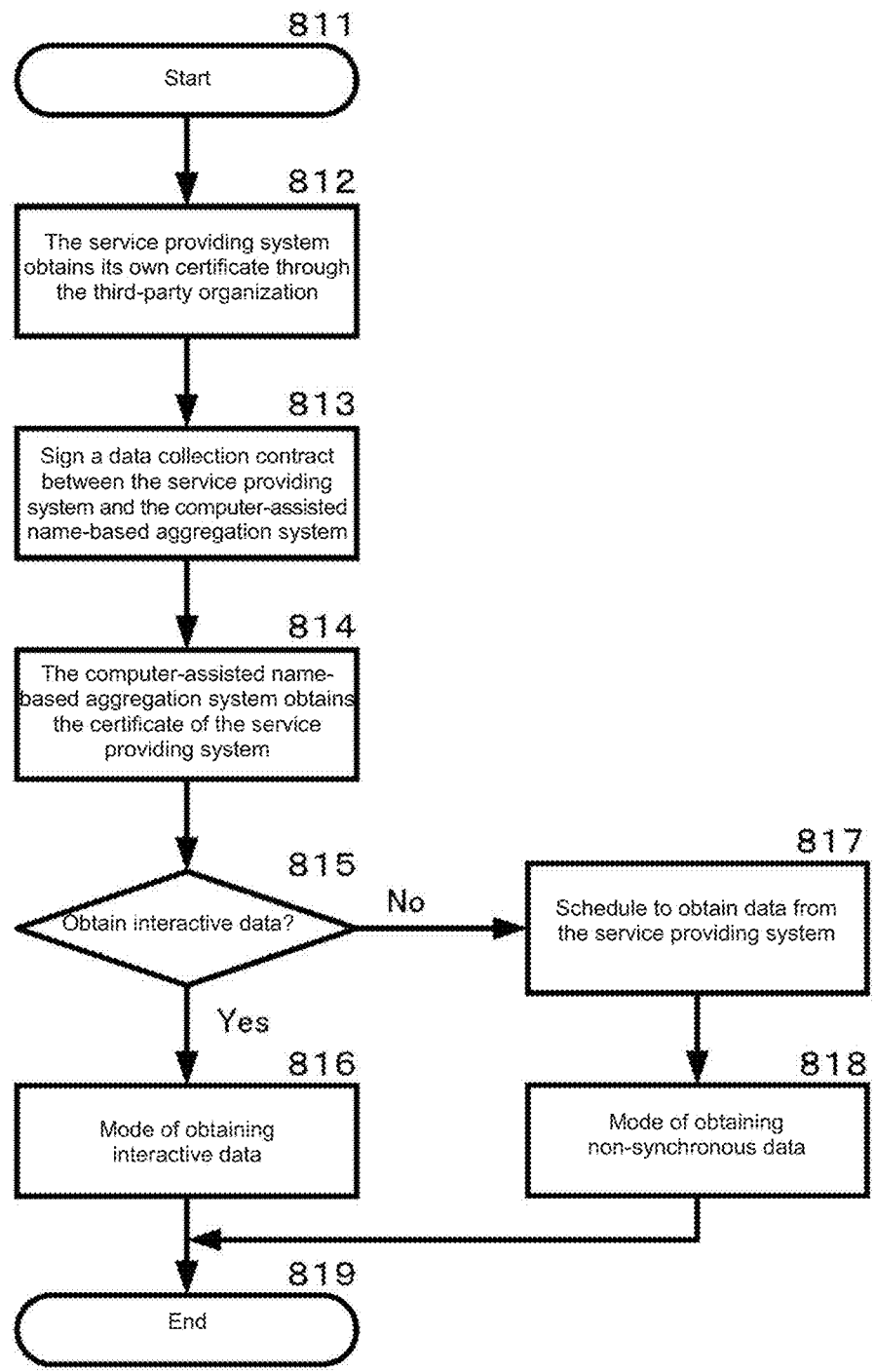

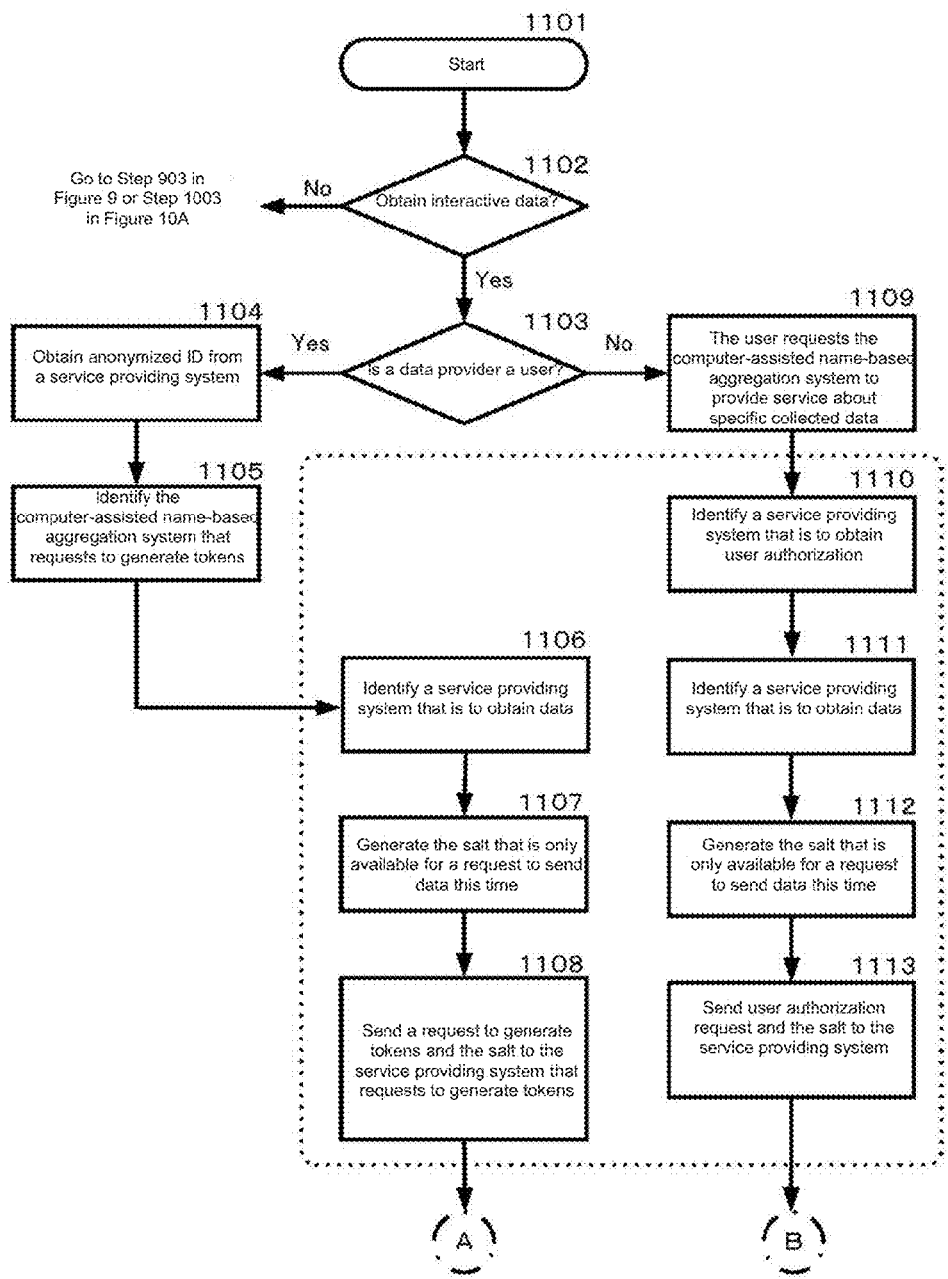

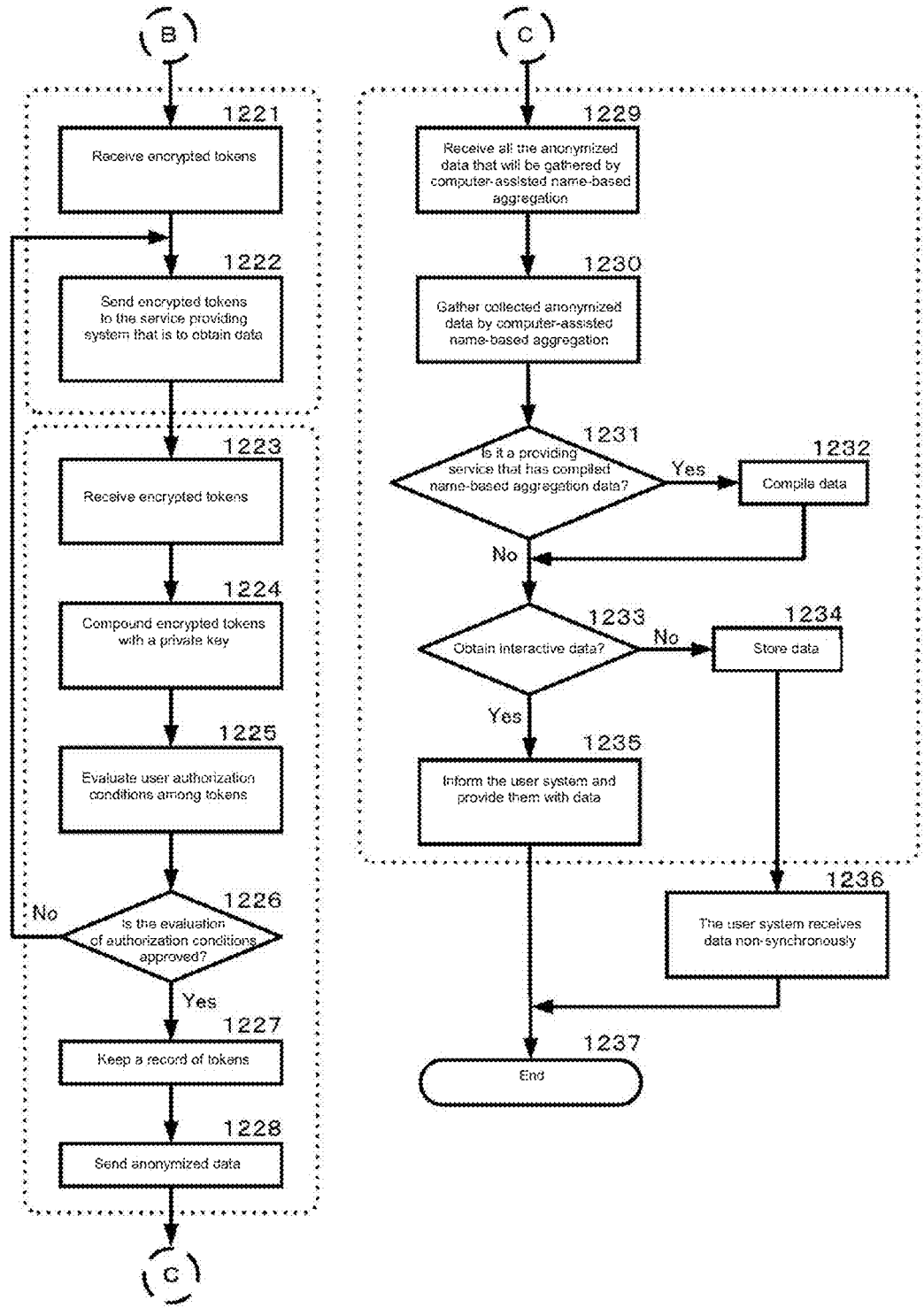

COMPUTER ASSISTED NAME-BASED AGGREGATION SYSTEM FOR IDENTIFYING NAMES OF ANONYMIZED DATA

This application claims the benefit of priority to Japanese Patent Application No. JP 2013-066377, filed on Mar. 27, 2013, the contents of which are hereby incorporated by reference.

TECHNICAL FIELD

The present invention relates to technology for computer assisted name-based aggregation of anonymized data. In particular, the present invention relates to technology for computer assisted name-based aggregation of anonymized data while preserving anonymity.

BACKGROUND TECHNOLOGY

Recently, due to the development of ground services, various data, for example information from individuals or specific equipment is collected from the ground services, and various services are provided using the collected information. Furthermore, the various data collected from ground services are integrated (mashup), and various services are provided using the integrated data. For example, the following Non-Patent Literature 1 discloses an IT mechanism for acquiring various data, applying potential big data, and applying the data for the business of a company.

A law related to the protection of personal information (also known as the Personal Information Protection Law) was established on Apr. 1, 2005. The Personal Information Protection Law is a Japanese law related to the treatment of personal information. Personal information as defined by the Personal Information Protection Law refers to information related to living individuals, and information that can identify specific individuals by names, dates, and the like included in the information. Information that can be simply combined with other information, thereby enabling identification of specific individuals (for example, school registers and the like that can specify individuals by comparing university registers of names and the like) are also included in the law.

In order to use personal information while complying with the Personal Information Protection Law, a notification of the purpose of use or approval by the person is required when acquiring personal information, and in order to provide personal information to a third party, consent of the person is required.

The following Patent Literature 1 is an invention related to an information mediation system (paragraph 0001), and discloses that the mediation server periodically collects information from an information provider terminal, and when there is a request from a user terminal, the mediation server switches to dummy information such that name-based aggregation of a combination of attribute items of the information provider that is not allowed to be published, and information items from the information provider is performed, and publishes to the user terminal (summary). Furthermore, Patent Literature 1 discloses a processing method for vehicle information 235 in a vehicle information control part 232 providing a vehicle information control server 107 connected to an mediation server 105 (paragraph 0030 through paragraph 0031). In other words, Patent Literature 1 discloses that by rewriting the computer assisted name-based aggregation key (vehicle number) to dummy information, rules for disabling computer assisted name-based aggregation of member information 222 and vehicle information 235, and for rewriting the vehicle number to dummy vehicle information can be converted using random variables, can be changed using time information, can be changed using internal serial numbers, and can be changed using data items, and the rules for rewriting the dummy information can be modified by date, by day of the week, or by regular intervals (paragraph 0065).

The following Patent Literature 2 is an invention related to an information system sharing PC terminal data through a network server over a communication network using a portable terminal, and discloses that a session key is encrypted using a salt and a password (Claim 1, paragraph 0008 and paragraph 0014).

The following Patent Literature 3 is an invention related to a personal information management system, and discloses that a hash value with a key for a section that can identify an individual included in individual information and for key information unique to the user is created (Claim 1, paragraphs 0026 through 0031).

The following Patent Literature 4 discloses that anonymizable technology is appropriately provided even if combining terms and a peripheral descriptor including the terms (paragraph 0012) is rare, and does not require preparing a dictionary of anonymized terms.

The following Patent Literature 5 is an invention related to a computer assisted name-based aggregation control method (Claim 1), and discloses the use of an anonymized ID created by a hash function that uses an individual ID as a key.

The following Patent Literature 6 discloses a method for distributing concept emails to a number of targets by interposing the distribution mediation service, and a distribution mediation service device (patent claims).

The following Patent Literature 7 discloses a personal information browsing update system and a personal information browsing update method (scope of the claims).

The following Patent Literature 8 discloses a data sharing device for sharing data in a group including a plurality of users (paragraph 0001).

The following Non-patent Literature 2 discloses software for anonymizing personal information.

The following Non-patent Literature 3 discloses anonymizing personal information.

PRIOR TECHNOLOGY DOCUMENTS

Patent Literature
a. [Patent literature 1] Japanese Unexamined Patent Application 2007-264730
b. [Patent literature 2] Japanese Unexamined Patent Application 2007-142504
c. [Patent literature 3] Japanese Unexamined Patent Application 2010-237811
d. [Patent literature 4] Japanese Unexamined Patent Application 2009-020646
e. [Patent literature 5] Japanese Unexamined Patent Application 2005-301978
f. [Patent literature 6] Japanese Unexamined Patent Application 2002-175432
g. [Patent literature 7] Japanese Unexamined Patent Application 2006-285490
h. [Patent literature 8] Japanese Unexamined Patent Application 2007-181011

Non-Patent Literature
a. [Non-patent Literature 1] ASAI, Nobuhiro et al., "Enabling use of world-wide data by on-demand data conversion for achieving a Connected World", ProVISION, No. 74, Summer 2012, accessible from Internet URL: http://www-06.ibm.com/ibm/jp/provision/no74/pdf/74_article2.pdf
b. [Non-patent Literature 2] YAMAMOTO, Keiji et al., "The development of medical data anonymizing software", MSS technical report, Vol. 19, page 24 to 29, March 2008, accessible from Internet <URL: www.mss.CO.jp/technology/report/pdf/19-04.pdf>
c. [Non-patent Literature 3] HONDA, Katsuhiro, "Anonymizing of personal information and a reliable and safe high precision recommendation system", [online], [Searched Mar. 9, 2013], Internet <URL: http://jst-shingi.jp/abst/p/12/1230/osaka2-10.pdf>
d. [Non-patent Literature 4] "Smarter Planet", [online], [Searched Mar. 11, 2013], Internet <URL: http://www-06.ibm.com/innovation/jp/smarterplanet/>

SUMMARY OF THE INVENTION

Problem to be Resolved by the Invention

When an individual or specific equipment provides various data to a service providing system, an administrator of the individual or specific equipment and an administrator of the service providing system enter a contract related to personal information protection. Therefore, the individual or the specific equipment provides data including personal information only to the aforementioned contracted service providing system. However, because the data has personal information, the service providing system cannot provide the data as is to the computer assisted name-based aggregation (i.e., identifying certain user name as the record) system. Therefore, the computer assisted name-based aggregation system has a need for preventing personal information within the data from becoming known, and for allowing name-based aggregation of data collected from the service providing system.

Therefore, an object of the present invention is to provide technology where the aforementioned computer assisted name-based aggregation system can acquire anonymized data from a plurality of service providing systems without obtaining the aforementioned personal information (in other words, while remaining anonymized), and can identify the name of the acquired anonymized data.

Furthermore, an object of the present invention is to provide technology executing computer assisted name-based aggregation based on a request from the computer assisted name-based aggregation system.

Furthermore, an object of the present invention is to provide technology executing computer assisted name-based aggregation only when a user desires to use name identified data, or aggregate data obtained by aggregating the name identified data.

Furthermore, an object of the present invention is to provide technology that can refund or provide profit to data providers that provide data, and that enables billing to users using name identified data or aggregate data that aggregates the name identified data.

SUMMARY OF THE INVENTION

The present invention provides technology that identifies names of anonymized data transmitted from a plurality of service providing systems in a computer assisted name-based aggregation system. The technology may encompass a method for identifying the name of anonymized data transmitted from a plurality of service providing systems in a computer assisted name-based aggregation system, a computer program thereof, a computer assisted name-based aggregation system for identifying the name of anonymized data transmitted from each of the plurality of service providing systems, and a computer system for name-based aggregation providing the computer assisted name-based aggregation system, a plurality of service providing systems providing anonymized data to the computer assisted name-based aggregation system, and a user system related to a user that uses the data that is arbitrarily name identified.

The method according to the present invention includes a computer assisted name-based aggregation system that executes:
  a. a step of transmitting a transmission request that requests transmission of data, and a value that changes for each transmission request to the plurality of service providing systems;
  b. a step of receiving a set containing hash values created based on an identification number for controlling data and the aforementioned value, and the anonymized data specified by the identification number, from the plurality of service providing systems, wherein the hash values are hashed using the same hashing algorithm in each of the plurality of service providing systems; and
  c. a step of identifying the name of anonymized data specified by the hash value from the anonymized data received from each of the plurality of service providing systems. In one aspect of the present invention, the anonymized data specified by the hash value is encrypted using a public key related to users using the name identified data or aggregate data that aggregates the name identified data. Furthermore, in one aspect of the present invention, when the anonymized data specified by the hash value is encrypted using the public key, the encrypted anonymized data may be decoded using a private key that is related to the user and that corresponds to the public key.

The method according to the present invention includes the computer assisted name-based aggregation system that executes:
  a. a step of transmitting a first transmission request that requests transmission of data, and a first value that is valid only for each transmission request, to the plurality of service providing systems;
  b. a step of receiving a set containing a first hash value created based on an identification number for controlling data and the first value, and the anonymized data specified by the identification number, from the plurality of service providing systems, wherein each of the service providing systems perform hashing using that same hashing algorithm;
  c. a step of identifying the name of the anonymized data specified by the first hash value from the anonymized data received from each of the plurality of service providing systems;
  d. a step of transmitting a second transmission request requesting data transmission, and a second value valid only for the second transmission request, wherein the second value is different from the first value;
  e. a step of receiving a set containing a second hash value created based on the identification number for controlling the data and the second value, and the anonymized data specified by the identification number, from the plurality of service providing systems; and f. a step of identifying the name of the anonymized data specified by the second hash value from the anonymized data received from each of the plurality of service providing systems.

In one aspect of the present invention, the anonymized data specified by the first hash value or the second hash value is encrypted using a public key related to users using the name identified data or aggregate data that aggregates the name identified data. Furthermore, in one aspect of the present invention, when the anonymized data specified by the first hash value or the second hash value is encrypted using the public key, the encrypted anonymized data may be decoded using a private key that is related to the user and that corresponds to the public key.

Furthermore, the method according to the present invention includes a. a step where the computer assisted name-based aggregation system transmits a transmission request that requests transmission of data, and a value that changes for each transmission request, to the plurality of service providing systems;

b. a step where the plurality of service providing systems creates a hash value based on the identification number for controlling the data, and the aforementioned value, wherein the each of the plurality of service providing systems perform hashing using the same hashing algorithm;

c. a step where each of the plurality of service providing systems transmits a set containing the hash value and the anonymized data specified by the identification number to the computer assisted name-based aggregation system, and d. a step where the computer assisted name-based aggregation system identifies the name of the anonymized data specified by the hash value from the anonymized data received from each of the plurality of service providing systems.

In one aspect of the present invention, the anonymized data specified by the hash value is encrypted using a public key related to users using the name identified data or aggregate data that aggregates the name identified data. Furthermore, in one aspect of the present invention, when the anonymized data specified by the hash value is encrypted using the public key, the encrypted data may be decoded using a private key that is related to the user and that corresponds to the public key.

Furthermore, the method according to the present invention includes a. a step where the computer assisted name-based aggregation system transmits a first transmission request that requests transmission of data, and a first value that is valid only for each transmission request, to the plurality of service providing systems;

b. a step where the plurality of service providing systems creates a first hash value based on the identification number for controlling the data, and the aforementioned first value, wherein the each of the plurality of service providing systems perform hashing using the same hashing algorithm;

c. a step where each of the plurality of service providing systems transmits a set containing the first hash value and the anonymized data specified by the identification number to the computer assisted name-based aggregation system;

d. a step where the computer assisted name-based aggregation system identifies the name of the anonymized data specified by the first hash value from the anonymized data received from each of the plurality of service providing systems;

e. a step where the computer assisted name-based aggregation system transmits a second transmission request requesting data transmission, and a second value that is valid only for the second transmission request, wherein the second value is different from the first value;

f. a step where the plurality of service providing systems create a second hash value based on the identification number for controlling the data, and the aforementioned second value;

g. a step where each of the plurality of service providing systems transmits a set containing the second hash value and the anonymized data specified by the identification number to the computer assisted name-based aggregation system; and h. a step where the computer assisted name-based aggregation system identifies the name of the anonymized data specified by the second hash value from the anonymized data received from each of the plurality of service providing systems.

In one aspect of the present invention, the anonymized data specified by the first hash value or the second hash value is encrypted using a public key related to users using the name identified data or aggregate data that aggregates the name identified data. Furthermore, in one aspect of the present invention, when the anonymized data specified by the first hash value or the second hash value is encrypted using the public key, the encrypted anonymized data may be decoded using a private key that is related to the user and that corresponds to the public key.

Furthermore, the method according to the present invention includes:

a. a step where the computer assisted name-based aggregation system transmits the user approval request that identifies the name in each of the plurality of service providing systems, and a value that changes for each user approval request, to a system that can process the user approval request;

b. a step where a system that has received the user approval request creates a token that has at least an identification number related to the user and the value, based on the user approving the name-based aggregation;

c. a step where the system that has received the user approval request encrypts the token;

d. a step where the system that has received the user approval request transmits the encrypted token to the computer assisted name-based aggregation system;

e. a step where the computer assisted name-based aggregation system transmits at least one of the encrypted tokens from the plurality of service providing systems that store anonymized data subject to name-based aggregation;

f. a step where each of the service providing systems receiving the encrypted token decodes the encrypted token;

g. a step where each of the service providing systems receiving the encrypted token determines if the anonymized data can be transmitted to the computer assisted name-based aggregation system, based on the encrypted token;

h. a step where each of the service providing systems that have received the encrypted token transmits the anonymized data to the computer assisted name-based aggregation system, based on whether the anonymized data can be transmitted to the computer assisted name-based aggregation system; and i. a step where the computer assisted name-based aggregation system identifies the name of the anonymized data specified by the token from the anonymized data received from each of the plurality of service providing systems.

Furthermore, the method according to the present invention includes:

a. a step where a user system related to a user that uses name identified data that identifies the name of the anonymized data or aggregate data that aggregates the name identified data queries one of the service providing systems from the plurality of service providing systems of the anonymized identification number of the user;

b. a step where the one service providing system from the plurality of service providing systems transmits the first transmission request requesting data transmission and the queried identification number to the computer assisted name-based aggregation system;

c. a step where the computer assisted name-based aggregation system transmits the first transmission request, the first value that is valid only for first transmission request, and the identification number to at least one of the plurality of service providing systems;

d. a step where the service providing system receiving the first transmission request, the first value that is valid only for the first transmission request, and the queried identification number creates a token based on the identification number and the first value;

e. a step where the service providing system receiving the first transmission request, the first value valid only for the first transmission request, and the queried identification number encrypts the token;

f. a step where the service providing system receiving the first transmission request, the first value valid only for the first transmission request, and the queried identification number transmits the encrypted token to the computer assisted name-based aggregation system;

g. a step where the computer assisted name-based aggregation system transmits at least one of the encrypted tokens from the plurality of service providing systems that stores data subject to computer assisted name-based aggregation;

h. a step where each of the service providing systems receiving the encrypted token decodes the encrypted token;

i. a step where each of the service providing systems receiving the encrypted token determines if the anonymized data can be transmitted to the computer assisted name-based aggregation system, based on the encrypted token;

j. a step where each of the service providing systems that have received the encrypted token transmits the anonymized data to the computer assisted name-based aggregation system, based on whether the anonymized data can be transmitted to the computer assisted name-based aggregation system; and k. a step where the computer assisted name-based aggregation system identifies the name of the anonymized data specified by the token from the anonymized data received from each of the plurality of service providing systems.

Furthermore, the method according to the present invention includes:

a. a step where a user system related to the user that uses name identified data that identifies the name of the anonymized data or aggregate data that aggregates the name identified data creates a token with a first value that is valid only for the first transmission request that requests transmission of the anonymized data and the identification number for controlling the anonymized data;

b. a step where the user system encrypts the token;

c. a step where the user system transmits the first transmission request and the encrypted token to the computer assisted name-based aggregation system;

d. a step where the computer assisted name-based aggregation system transmits at least one of the encrypted tokens from the plurality of service providing systems that store anonymized data subject to name-based aggregation;

e. a step where each of the service providing systems receiving the encrypted token decodes the encrypted token;

f. a step where each of the service providing systems receiving the encrypted token determines if the anonymized data can be transmitted to the computer assisted name-based aggregation system, based on the encrypted token;

g. a step where each of the service providing systems that have received the encrypted token transmits the anonymized data to the computer assisted name-based aggregation system, based on whether the anonymized data can be transmitted to the computer assisted name-based aggregation system; and h. a step where the computer assisted name-based aggregation system identifies the name of the anonymized data specified by the token from the anonymized data received from each of the plurality of service providing systems.

In one aspect of the present invention, a. the step of encrypting the token includes b. a step of encrypting the token using public keys of each of the plurality of service providing systems, and creating a set of encrypted tokens;

c. the step of transmitting the encrypted tokens to the computer assisted name-based aggregation system includes d. a step of transmitting the set of encrypted tokens to the computer assisted name-based aggregation system; and e. the step of decoding the encrypted tokens includes f. a step where the service providing system receiving the encrypted tokens decodes the encrypted tokens using a private key of the service providing system.

Furthermore, the method according to the present invention includes a. a step where a user system related to the user that uses name identified data that identifies the name of the anonymized data or aggregate data that aggregates the name identified data transmits the transmission request that requests the transmission of the value that changes for each of the transmission requests that request data transmission to the computer assisted name-based aggregation system;

b. a step where the computer assisted name-based aggregation system creates the value, based on receiving a transmission request for the value, and transmits the created value to the user system;

c. a step where the user system creates a first hash value based on the identification number related to the anonymized data and the aforementioned value, based on the received data, and then transmits the created first hash value to the computer assisted name-based aggregation system;
d. a step where the computer assisted name-based aggregation system transmits the first hash value and the aforementioned value to each of the plurality of service providing systems, based on the received first hash value;
e. a step where each of the service providing systems receiving the first hash value and the aforementioned value creates a second hash value based on the identification number related to the anonymized data and the received value, wherein each of the plurality of service providing systems performs hashing using the same algorithm as the user system;
f. a step where each of the service providing systems receiving the first hash value and the aforementioned value compares the first hash value and the second hash value, and then transmits the anonymized data with the identification number used when creating the second hash value to the computer assisted name-based aggregation system, based on the matching of the first hash value and the second hash value;
g. a step where the computer assisted name-based aggregation system identifies the name of the anonymized data specified by the first hash value from the anonymized data received from each of the plurality of service providing systems; and
h. the computer assisted name-based aggregation system transmits the name identified data or the aggregate data to the user system.

In one aspect of the present invention, the step of transmitting the anonymized data with the identification number used when creating the second hash value by each of the service providing systems to the computer assisted name-based aggregation system may include a step of encrypting the anonymized data transmitted to the computer assisted name-based aggregation system using the public key related to the user using the name identified data or the collected data collecting the name identified data, and transmitting the encrypted anonymized data to the computer assisted name-based aggregation system.

Furthermore, in one aspect of the present invention, the step where the computer assisted name-based aggregation system identifies the name of anonymized data specified by the first hash value may include a step of identifying the name of the encrypted anonymized data specified by the first hash value. Furthermore, in one aspect of the present invention, the step where the computer assisted name-based aggregation system transmits the name identified data or the aggregate data to the user system may include a step of transmitting the name identified encrypted data to the user system. Furthermore, in one aspect of the present invention, the user system may execute a step of decoding the name identified encrypted data using a private key that is related to the user, and that corresponds to the public key.

Furthermore, the computer assisted name-based aggregation system according to the present invention provides
a. transmitting means for transmitting a transmission request that requests data transmission, and a value that changes for each transmission request to each of the plurality of service providing systems;
b. receiving means for receiving hash values created based on a set containing an identification number for controlling data and the aforementioned value, and the anonymized data specified by the identification number, from the plurality of service providing systems, wherein the hash values are hashed using the same hashing algorithm in each of the plurality of service providing systems; and
c. name identifying means for identifying the name of anonymized data specified by the hash value from the anonymized data received from each of the plurality of service providing systems.

Furthermore, in the computer system according to the present invention,
a. the computer assisted name-based aggregation system provides transmitting means for transmitting a transmission request that requests transmission of data, and a value that changes for each transmission request, to the plurality of service providing systems;
b. the plurality of service providing systems provides hashing means for creating a hash value based on the identification number for controlling the data, and the aforementioned value, wherein the each of the plurality of service providing systems perform hashing using the same hashing algorithm;
c. each of the plurality of service providing systems provides transmitting means for transmitting a set containing the hash value and the anonymized data specified by the identification number to the computer assisted name-based aggregation system, and
d. the computer assisted name-based aggregation system provides name identifying means for identifying the name of the anonymized data specified by the hash value from the anonymized data received from each of the plurality of service providing systems.

Furthermore, in the computer system according to the present invention,
a. the computer assisted name-based aggregation system provides transmitting means for transmitting the user approval request that identifies the name in each of the plurality of service providing systems, and a value that changes for each user approval request, to a system that can process the user approval request;
b. a system that has received the user approval request provides token creating means for creating a token having at least the identification number related to the user and the aforementioned value, based on the user approving the name-based aggregation;
c. the system that has received the user approval request provides encrypting means for encrypting the token;
d. the system that has received the user approval request provides transmitting means for transmitting the encrypted token to the computer assisted name-based aggregation system;
e. the computer assisted name-based aggregation system provides transmitting means for transmitting at least one of the encrypted tokens from the plurality of service providing systems that store anonymized data subject to name-based aggregation;
f. each of the service providing systems that have received the encrypted token provides decoding means for decoding the encrypted token;
g. each of the service providing systems that have received the encrypted token provides determining means for determining if the anonymized data can be transmitted to the computer assisted name-based aggregation system, based on the encrypted token;
h. each of the service providing systems that have received the encrypted token transmits the anonymized data to the computer assisted name-based aggregation system, based on whether the anonymized data can be transmitted to the computer assisted name-based aggregation system; and i. the computer assisted name-based aggregation system provides name identifying means for identifying the name of the anonymized data specified by the token from the anonymized data received from each of the plurality of service providing systems.

Furthermore, in the computer system according to the present invention, a. the user system provides querying means for querying the anonymized identification number of the user to one of the service providing systems from the plurality of service providing systems;

b. the one service providing system from the plurality of service providing systems provides transmitting means for transmitting the transmission request requesting data transmission and the queried identification number to the computer assisted name-based aggregation system;

c. the computer assisted name-based aggregation system provides transmitting means for transmitting the transmission request, the value that changes for each transmission request, and the identification number to at least one of the plurality of service providing systems;

d. the service providing system that has received the transmission request, the value that changes for each of the transmission requests, and the queried identification number provides token creating means for creating a token based on the identification number and the aforementioned value;

e. the service providing system that has received the transmission request, the value valid only for the transmission request, and the queried identification number provides encrypting means for encrypting the token;

f. the service providing system that has received the transmission request, the value valid only for the transmission request, and the queried identification number provides transmitting means for transmitting the encrypted token to the computer assisted name-based aggregation system;

g. the computer assisted name-based aggregation system provides transmitting means for transmitting at least one of the encrypted tokens from the plurality of service providing systems that store data subject to name-based aggregation;

h. each of the service providing systems that have received the encrypted token provides determining means for determining if the anonymized data can be transmitted to the computer assisted name-based aggregation system, based on the encrypted token;

i. each of the service providing systems that has received the encrypted token provides determining means for determining if the anonymized data can be transmitted to the computer assisted name-based aggregation system, based on the encrypted token;

j. each of the service providing systems that have received the encrypted token provides transmitting means for transmitting the anonymized data to the computer assisted name-based aggregation system, based on whether the anonymized data can be transmitted to the computer assisted name-based aggregation system; and k. the computer assisted name-based aggregation system provides name identifying means for identifying the name of the anonymized data specified by the token from the anonymized data received from each of the plurality of service providing systems.

Furthermore, in the computer system according to the present invention, a. a user system related to the user that uses name identified data that identifies the name of the anonymized data or aggregate data that aggregates the name identified data provides token creating means for creating a token with a value that changes for each transmission request that requests transmission of the anonymized data and the identification number for controlling the anonymized data;

b. the user system provides encrypting means for encrypting the token;

c. the user system provides transmitting means for transmitting the transmission request and the encrypted token to the computer assisted name-based aggregation system;

d. the computer assisted name-based aggregation system provides transmitting means for transmitting at least one of the encrypted tokens from the plurality of service providing systems that store anonymized data subject to name-based aggregation;

e. each of the service providing systems that have received the encrypted token provides determining means for determining if the anonymized data can be transmitted to the computer assisted name-based aggregation system, based on the encrypted token;

f. each of the service providing systems that has received the encrypted token provides determining means for determining if the anonymized data can be transmitted to the computer assisted name-based aggregation system, based on the encrypted token;

g. each of the service providing systems that have received the encrypted token provides transmitting means for transmitting the anonymized data to the computer assisted name-based aggregation system, based on whether the anonymized data can be transmitted to the computer assisted name-based aggregation system; and h. the computer assisted name-based aggregation system provides name identifying means for identifying the name of the anonymized data specified by the token from the anonymized data received from each of the plurality of service providing systems.

Furthermore, in the computer system according to the present invention, a. the user system provides transmitting means for transmitting a transmission request that requests transmission of a value that changes for each transmission request that requests data transmission, to the computer assisted name-based aggregation system;

b. the computer assisted name-based aggregation system provides transmitting means for creating the aforementioned value, based on receiving a transmission request for the aforementioned value, and transmitting the created value to the user system;

c. the user system provides hashing means for creating a first hash value based on the identification number related to the anonymized data and the aforementioned value, based on the received data, and transmitting means for transmitting the created first hash value to the computer assisted name-based aggregation system;

d. the computer assisted name-based aggregation system provides transmitting means for transmitting the first hash value and the aforementioned value to each of the plurality of service providing systems, based on the received first hash value;

e. each of the service providing systems that have received the first hash value and the aforementioned value provides hashing means for creating a second hash value based on the identification number related to the anonymized data and the received value, wherein each of the plurality of service providing systems performs hashing using the same algorithm as the user system;

f. each of the service providing systems that have received the first hash value and the aforementioned value provides comparing means for comparing the first hash value and the second hash value, determining means for determining whether the first hash value and the second hash value match, and transmitting means for transmitting the anonymized data with the identification number used when creating the second hash value to the computer assisted name-based aggregation system;

g. the computer assisted name-based aggregation system provides name identifying means for identifying the name of the anonymized data specified by the first hash value from the anonymized data received from each of the plurality of service providing systems; and h. the computer assisted name-based aggregation system provides transmitting means for transmitting the name identified data or the aggregate data to the user system.

Furthermore, a computer program and computer program product according to the present invention causes the computer assisted name-based aggregation system to execute the steps of the method according to the present invention.

The computer program according to an aspect of the present invention can be stored in one or a plurality of arbitrary computer readable recording medium such as a flexible disk, MO, a CD-ROM, a DVD, a BD, a hard disk drive, or a memory medium that can be connected to a USB, ROM, MRAM, RAM, and the like. The computer program can be download from another data processing system connected by a communication line such as a server computer, or can be duplicated from another recording medium. Furthermore, the computer program according to an aspect of the present invention can be compressed, divided into a plurality, or stored in one or a plurality of recording medium. Furthermore, it should be noted a computer program product according to an aspect of the present invention can certainly be provided for various aspects. The computer program product according to an aspect of the present invention may include a recording medium that has recorded the computer program, or a transmitting medium that transmits the computer program.

The summary of the present invention does not list all required features of the present invention, and one should bear in mind that a combination or sub-combinations of these components may comprise the present invention.

Each hardware component of the computer used in an aspect of the present invention can be combined with a plurality of machines, and obviously a variety of modifications and the like for executing and distributing these functions can be easily conceived by one skilled in the art. The modifications are naturally a concept included in the idea of the present invention. However, the components are examples, and all of the components are not necessarily essentials components of the present invention.

Furthermore, the present invention can be achieved as hardware, software, or a combination of hardware and software. When executing by combining hardware and software, execution in a computer with the installed computer program is presented as a typical example. In this case, because the computer program is loaded in the memory of the computer, and then executed, the computer program controls the computer, and executes the program according to the present invention. The computer program may be formed from a group of commands that can be represented by an arbitrary term, code, or descriptor. This group of commands enable the computer to execute a specific function directly, or after either or both of 1. converting to a different language, code, or descriptor, and 2. copying to another medium.

Effect of the Invention

According to an aspect of the present invention, a data providing entity, such as a user providing information or equipment related to the user, preferably provides data only to one (1) or a plurality of service providing systems contracted by the user, and transfers anonymized data only to users using name identified data, or aggregate data aggregating the name identified data by the computer assisted name-based aggregation system. Therefore, anonymity of the data is preserved.

According to an aspect of the present invention, the computer assisted name-based aggregation system acquires anonymized data from a plurality of service providing systems, without obtaining the aforementioned personal information, and enables name-based aggregation of the acquired data.

According to an aspect of the present invention, values that change for each transmission request requesting data transmission, or for each user approval request identifying the name in each of the plurality of service providing systems are used, and therefore specific risks concerning the aforementioned personal information can be reduced.

BRIEF DESCRIPTION OF THE DRAWINGS

FIG. 8B illustrates a flow chart of a process for executing a data collection contract between each service providing system and each computer assisted name-based aggregation system, and for determining the data providing mode, according to an embodiment of the present invention;

FIG. 11A illustrates a flow chart of a process for acquiring name identified data, according to an embodiment of the present invention;

FIG. 12C illustrates a flow chart of a process for acquiring name identified data, according to an embodiment of the present invention;

DESCRIPTION OF THE PREFERRED EMBODIMENTS

Figure 1:
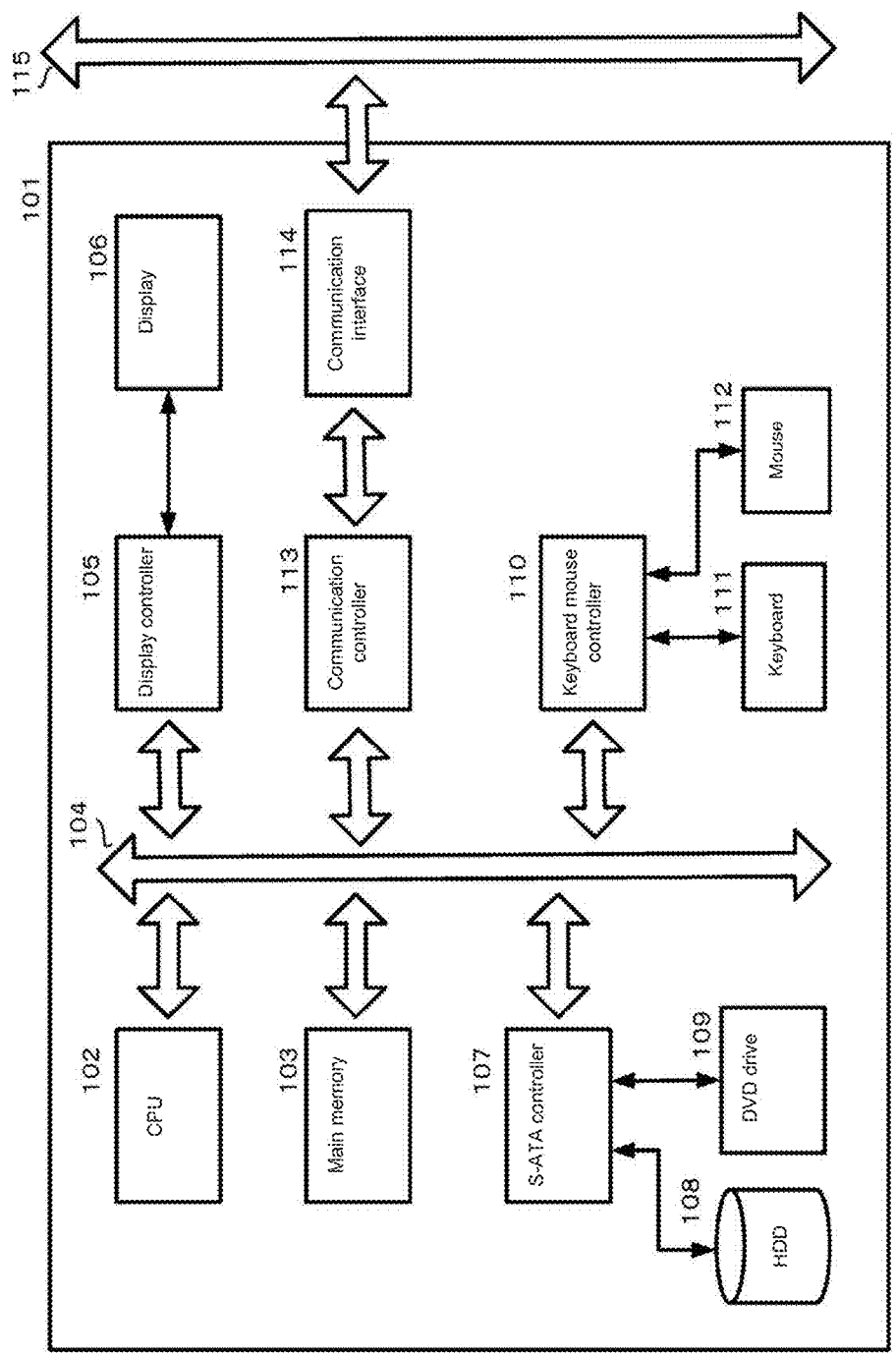
FIG. 1 is a diagram illustrating an example of a computer with a hardware configuration for implementing a data providing entity, a service providing system, a computer assisted name-based aggregation system, and a user system used in an embodiment of the present invention.

An embodiment of the present invention is described while referring to the drawings below. The same reference symbols indicate the same subjects unless otherwise indicated in the following drawings. The embodiments of the present invention describe preferred configurations of the present invention, and are not intended to limit the scope of the present invention to the configurations shown herein.

The aforementioned computer system according to an embodiment of the present invention provides one or a plurality of data providing entities, a plurality of service providing systems, a computer assisted name-based aggregation system, and a user system.

The data providing entity according to an embodiment of the present invention may be a user providing data to the service providing system, or equipment related to the user. For example, the user may directly provide data to a service providing system through a portable recording medium such as a USB memory, SD card, CD, or DVD. The equipment related to the user may provide data to the service providing system through a wired or wireless network for example. The equipment related to the user may be a computer (such as desktop computer or notebook computer), computer peripheral equipment (such as a printer, scanner, combination device), a tablet terminal (such as an Android terminal, Windows (trademark) tablet, or iOS (trademark) terminal), a smartphone, a cell phone, a personal digital assistant (PDA), a medical device terminal, a game terminal, a video camera, a digital camera, a kiosk terminal, a portable navigation system, a car navigation system, a drive recorder, a flight recorder, a point-of-sale system (POS), a wireless network terminal, a copy machine terminal or combination terminal, security equipment, an automotive electronic control unit, an ETC automotive device, consumer electronics (such as television, recorder, stereo, refrigerator, air conditioner, health appliances, heating and cooling equipment, light equipment, bath equipment, laundry equipment, hot water apparatus, cooking equipment), or a home energy management system (HEMS), a building energy management system (BEMS), a factory energy management system (FEMS) or a cluster/community energy management system (CEMS).

The service providing system according to an embodiment of the present invention collects data from one or a plurality of data providing entities, and stores the collected data. Furthermore, the service providing system anonymizes the collected data, and may provide the anonymized data (referred to as "anonymized data" below) to a computer assisted name-based aggregation system. The service providing system may be a computer or more particularly a server computer for example.

The computer assisted name-based aggregation system according to an embodiment of the present invention collects anonymized data from the plurality of service providing systems, identifies the name of the collected anonymized data, thus obtaining name identified data (referred to as "name identified data" below). Furthermore, the computer assisted name-based aggregation system aggregates the aforementioned name identified data, and may provide the aggregate data (referred to as "aggregate data" below) to a user system. The computer assisted name-based aggregation system may be a computer or more particularly a server computer for example.

A user system according to an embodiment of the present invention receives the aforementioned name identified data or the aforementioned aggregate data. The user system may be a computer, a smartphone, a cell phone, or a personal digital assistant (PDA) for example.

The data providing entity and the service providing system may be connected to a client server. Furthermore, the service providing system and the computer assisted name-based aggregation system may be connected to a client server.

The data providing entity may have a service providing system function. Furthermore, the user system may have a data providing system or a service providing system function.

Anonymized refers to removing information related to an individual, in other words, all or part of information that can identify an individual from information that can identify a specific individual due to names, birth dates, other descriptions and the like included in the information, and instead adding a character string (for example, nickname), symbol, or number that does not relate to the person, or removing all or a part of a combination of required information, if the person can be identified by combining information that can be obtained by various registers of names and the like even if certain information cannot identify a specific person from information attached to documents and the like, and thus allowing the person to be unidentified.

As described above, if data is anonymized based on the former method, a character string, symbol, or number that is not related to the person is assigned in place of all or a part of the information that can identify the individual. Therefore, if the computer assisted name-based aggregation system sees the anonymized data for example, the anonymized data is data with a normal value (symbol or number not related to the person).

In an embodiment of the present invention, arbitrary technology known by one skilled in the art may be used as anonymizing technology. Anonymizing technology is disclosed in Non-patent Literatures 2 and 3 for example.

FIG. 1 is a diagram illustrating an example of a computer (101) with a hardware configuration for implementing a data providing entity, a service providing system, a computer assisted name-based aggregation system, and a user system used in an embodiment of the present invention.

The computer (101) provides a CPU (102) and a main memory (103), which are connected to a bus (104). The CPU (102) is preferably based on a 32 bit or 64 bit architecture. The CPU (102) may be an Intel Core i (trademark) series, Core 2 (trademark) series, Atom (trademark) series, Xeon (trademark) series, Pentium (registered trademark) series, or Celeron (registered trademark), an AMD (Advanced Micro Devices) A series, Phenom (trademark) series, Athlon (trademark) series, Turion (trademark) series, or Sempron (trademark), or an International Business Machines Corporation (registered trademark) Power (registered trademark) series for example. Furthermore, if the computer (101) is the data providing entity or the user system, the CPU (102) may be a smartphone, cell phone, or tablet terminal CPU, or an Apple A series (registered trademark) for example.

A display (106), for example a liquid crystal display (LCD) is connected to the bus (104) through a display controller (105). Furthermore, the liquid crystal display (LCD) may also be a touch panel display, or a floating touch display. For example, the display (106) can be used to display information displayed by the operation of programs for the display providing entity, the service providing system, the computer assisted name-based aggregation system, and the user system according to an embodiment of the present invention, as well as to display name identified data provided from a plurality of service providing systems or aggregate data aggregating the name identified data according to an embodiment of the present invention, using an appropriate graphic interface.

A disk (108) such as a hard disk or a solid state drive may be optionally connected to the bus (104) through a SATA or IDE controller (107) for example.

The disk (108) and a drive (109) such as a CD, DVD, or BD drive may be optionally connected to the bus (104) through the SATA or IDE controller (107) for example.

A keyboard (111) and a mouse (112) are optionally connected to the bus (104) through a peripheral device controller (110) such as through a keyboard and mouse controller or USB bus.

Programs providing an operating system such as Windows (registered trademark) OS, UNIX (registered trademark), Mac OS (registered trademark), and Java (registered trademark) processing environment such as J2EE, Java (registered trademark) application, Java (registered trademark) virtual machine (VM), and Java (registered trademark) Just-in-time (JIT) compiler, application programs according to an embodiment of the present invention, and other programs, as well as data can be loadably stored in the main memory (103) on the disk (108). Furthermore, if the computer (101) is the data providing entity or the user system, a smartphone OS (such as Android OS, Windows (registered trademark) Phone OS or Windows (registered trademark) OS, or iOS (registered trademark)) can be loadably stored in the main memory (103) on the disk (108).

The disk (108) can be internally provided within the computer (101), can be connected through a cable such that the disk can be accessed by the computer (101), or can be connected through a wireless or wired network such that the disk can be accessed by the computer (101).

The drive (109) can be used as needed to install a program such as an operating system or application onto the disk (108) from a CD-ROM, DVD-ROM, or BD.

A communication interface (114) follows Ethernet (registered trademark) protocol for example. The interface (114) is connected to the bus (104) through a communication controller (113), assumes the role of connecting the computer (101) to a communication circuit (115) wirelessly or through a wire, and provides a network interface layer for TCP/IP communication protocol of the computer (101) operating system communication function. Note that the communication circuit may be a wireless LAN environment based on a wireless LAN connection standard, a Wi-Fi wireless LAN environment such as IEEE802.11a/b/g/n, or a mobile phone network environment (for example, 3G or 4G) for example.

Figure 2A:
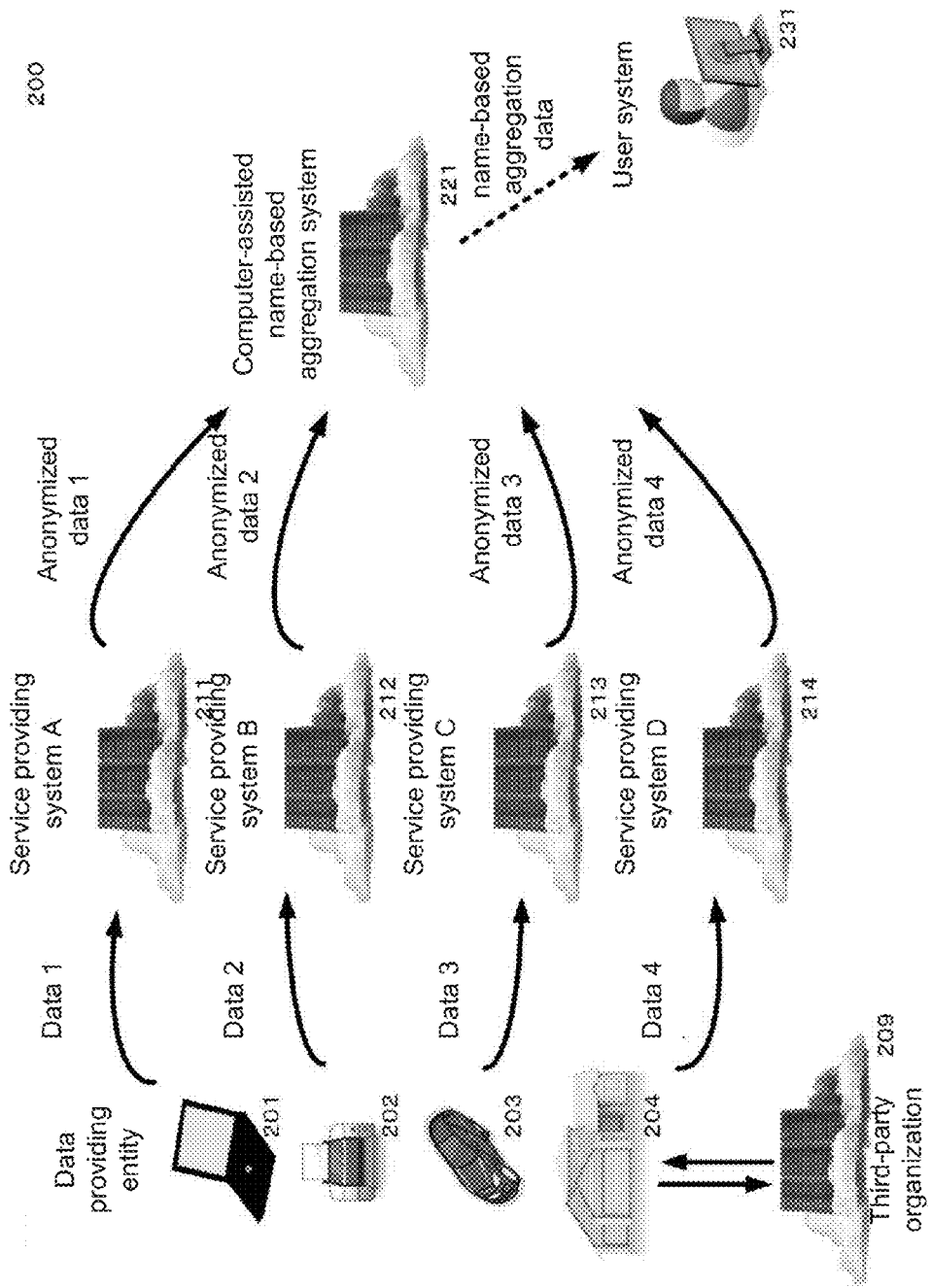
FIG. 2A is a diagram illustrating an example of a computer system for name-based aggregation that may be used in an embodiment of the present invention.

FIG. 2A is a diagram illustrating an example of a computer system (200) for name-based aggregation that may be used in an embodiment of the present invention.

The computer system (200) provides data providing entities (201 through 204), service providing systems (211 through 214), a computer assisted name-based aggregation system (221), and a user system (231). The number of data providing entities can be one or a plurality, and is not limited to the number of data providing entities (201 through 204) as illustrated in FIG. 2A. Similarly, the number of service providing systems is preferably a plurality, and is not limited to the number of service providing systems (211 through 214) as illustrated in FIG. 2A. Furthermore, the user system (231) can be implemented in the same hardware in a data providing entity (for example, 201), or in one of the service providing systems A through D (211 through 214).

The data providing entities (201 through 204) are all owned by person A, for example. Data providing entity (201) is a computer; data providing entity (202) is a peripheral device of the computer; data providing entity (203) is an automotive device; and data entity (204) is a home energy management system (HEMS).

The computer (201) can transmit various data (for example, installed applications, usage time period, or computer location) to the service providing system A (211). The peripheral device (202) can transmit various data (for example, number of copies to be printed, level of ink consumption, or printing properties) to the service providing system B (212). The automotive device (203) can transmit various data (for example, environment data (such as road conditions and traffic conditions), vehicle data (for example, distance travelled, speed, or battery power), or data related to driving (manner of steering, braking, or accelerating)) to the service providing system C (213). The HEMS (204) can transmit various data (for example, hour by hour power consumption of individual or of all consumer electronics in the house, or manufacturer name and model number of electric appliances in use) to the service providing system D (214). Furthermore, the data providing entities (201 through 204) attach an identification number related to user A to each data in conjunction with transmission of the data.

The service providing system A (211) is a server related to the manufacturing company of the computer (201), and can receive the aforementioned various data transmitted from the computer (201). The service providing system B (212) is a server related to the manufacturing company of the peripheral device (202), and can receive the aforementioned various data transmitted from the peripheral device (202). The service providing system C (213) is a server related to the manufacturing company of the automotive device (203), and can receive the aforementioned various data transmitted from the automotive device (203). The service providing system D (214) is a server related to the manufacturing company of the HEMS (204), and can receive the aforementioned various data transmitted from the HEMS (204).

The service providing systems A through D (211 through 214) anonymize the aforementioned various data, and can transmit the various anonymized data (anonymized data) to the computer assisted name-based aggregation system (221). The aforementioned anonymizing can be performed based on the service providing systems receiving the various data from the data providing entities, immediately prior to the service providing systems transmitting the various data to the computer assisted name-based aggregation system, or by utilizing the time where the processing capability of the service providing system is idle.

The computer assisted name-based aggregation system (221) can receive the aforementioned various anonymized data transmitted from each of the service providing systems A through D (211 through 214). The computer assisted name-based aggregation system (221) identifies the name of the aforementioned various anonymized data, and can transmit the name identified data or aggregate data aggregating the name identified data to the user system (231).

The user system (231) can receive the aforementioned name identified data transmitted from the computer assisted name-based aggregation system (221), or the aforementioned aggregate data.

Because the service providing systems A through D (211 through 214) can receive the aforementioned various data transmitted from the data providing entities (201 through 204), and can provide data to the computer assisted name-based aggregation system (221), a contract related to data provision is generally entered in advance between the service providing systems A through D (211 through 214), and the data providing entities (201 through 204). The content of the contract comply with the aforementioned Personal Information Protection Law for example. Similarly, because the computer assisted name-based aggregation system (221) can receive the aforementioned various anonymized data transmitted from the data providing entities (201 through 204), a contract related to data provision is generally entered in advance between the computer assisted name-based aggregation system (221) and the data providing entities (201 through 204). The content of the contract comply with the aforementioned Personal Information Protection Law for example.

Because the aforementioned name identified data or the aforementioned aggregate data is anonymized, the name identified data or the aggregate data cannot specify an individual or equipment related to an individual in the user system (231). However, the user system (231) can obtain comprehensive information in one home, such as a detailed breakdown of the amount of electricity used in the home, the type or preference of owned electric appliances, manufacturer preference of owned electric appliances, or order placement frequency of consumable goods for example, by using the name identified data, or the aggregate data.

A third party organization (249) has a function to assign an identification number unique to each user. Furthermore, the third party organization (249) can issue a self-issued certificate, in other words, a certificate including a public key and a private key to the service providing systems A through D (211 through 214, computer assisted name-based aggregation system (221), and the user system (231). Furthermore, the third party organization (249) can issue a certificate for another person, or in other words, a certificate that includes a public key but does not include a private key to the service providing systems A through D (211 through 214), the computer assisted name-based aggregation system (221), and the user system (231).

Figure 2B:
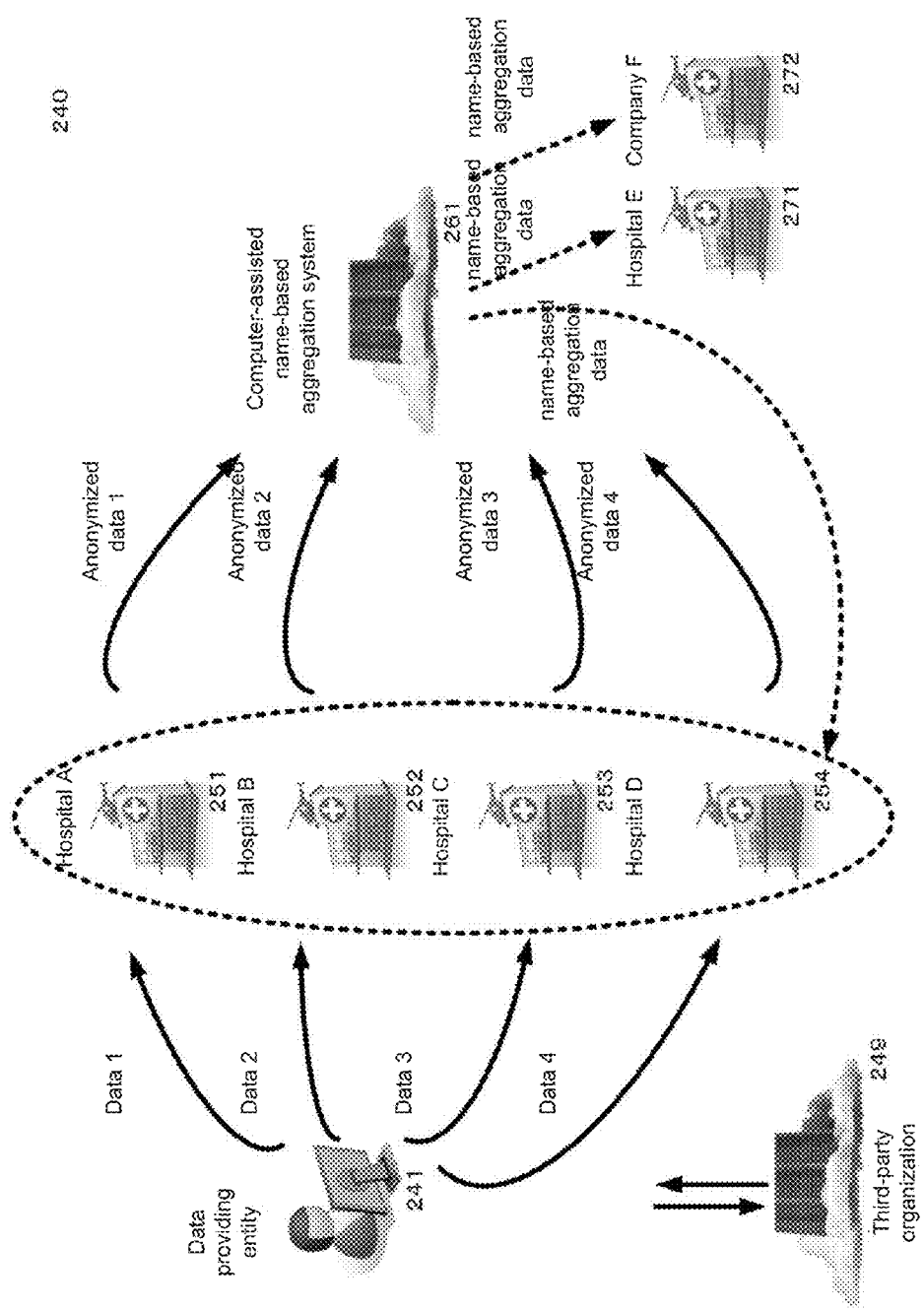
FIG. 2B is a diagram illustrating an example of a computer system for name-based aggregation that may be used in an embodiment of the present invention.

FIG. 2B is a diagram illustrating an example of a computer system (240) for name-based aggregation that may be used in an embodiment of the present invention.

A computer system (240) includes a data providing entity (241), hospitals A through D (251 through 254) which are service providing systems, a computer assisted name-based aggregation system (261), and a hospital E (271), company F (272), or at least one of hospitals A through D (251 through 254) which is the user system. Company F (272) may be a company that uses medical data such as a pharmaceutical company, a manufacturer of medical devices, or a manufacturer of household electric appliances for example.

The data providing entity (241) is Person B who commutes to hospitals A through D (251 through 254).

Hospitals A through D (251 through 254) are each hospitals with different medical subjects for example. The hospitals A through D (251 through 254) respectively perform medical treatments, prescribe medicine, perform physical examinations, and perform treatment for Person B, and record the data on a recording medium related to hospitals A through D (251 through 254) as an electronic medical chart for example. The hospitals A through D (251 through 254) each anonymize the aforementioned data, and can transmit the anonymized data to the computer assisted name-based aggregation system (261).

The computer assisted name-based aggregation system (261) can receive the aforementioned various anonymized data transmitted from each of the hospitals A through D (251 through 254). The computer assisted name-based aggregation system (261) identifies the name of the aforementioned various anonymized data, and can transmit the name identified data or aggregate data aggregating the name identified data to the user systems (271, 272, 251 through 254).

The user systems (271, 272, 251 through 254) can receive the aforementioned name identified data transmitted from the computer assisted name-based aggregation system (261), or the aforementioned aggregate data.

Because the hospitals A through D (251 through 254) can receive the aforementioned various data transmitted from Person B (241), and can provide data to the computer assisted name-based aggregation system (261), a contract related to data provision is generally entered in advance between the hospitals A through D (251 through 254), and Person B (241). The content of the contract complies with the aforementioned Personal Information Protection Law for example. Similarly, because the computer assisted name-based aggregation system (261) can receive the aforementioned various anonymized data transmitted from the hospitals A though D (251 through 254), a contract related to data provision is generally entered in advance between the computer assisted name-based aggregation system (261) and the hospitals A through D (251 through 254). The content of the contract complies with the aforementioned Personal Information Protection Law for example.

Because the aforementioned name identified data or the aforementioned aggregate data is anonymized, the name identified data or the aggregate data cannot specify which patient to whom the data belongs in the user system (271). However, the user systems (271, 272, 251 through 254) can obtain a history of drug administration or conditions of use for a certain illness, or comprehensive medical treatment information for a certain patient such as a change in the patient's condition, by using the aforementioned name identified data or the aforementioned aggregate data. Furthermore, according to an embodiment of the present invention described below, the computer assisted name-based aggregation system (261) can identify the names of anonymized data while remaining anonymized from the hospitals A through D (251 through 254), but on the other hand, the hospitals which are the user systems (251 through 254, and 271) can specify medical examination details from another hospital for a specific patient (in other words, Person B) such as medical examination results, examination details, or medication details, or compiled analysis results or medical examination details from a plurality of medical institutions.

The computer system used in an embodiment of the present invention is not limited to the aforementioned computer systems (200, 240). The computer system used in an embodiment of the present invention can be implemented in Smarter Planet (refer to the aforementioned Non-patent Literature 4), Smarter Planet Appliance, Smarter Mobility, Service Delivery Platform (SDP), or within a health care system for example. Therefore, the name identified data or the aggregate data used in an embodiment of the present invention can be integrated data used in various services such as administrative services, urban services, energy management services, and medical services for example.

Five embodiments of name-based aggregation according to the present invention are illustrated below (FIG. 3A through FIG. 3C, FIG. 4A through FIG. 4D, FIG. 5A through FIG. 5D, FIG. 6A through FIG. 6C, and FIG. 7A through FIG. 7D). In the first embodiment, a computer assisted name-based aggregation system requests transmission of anonymized data to a service providing system, and performs name-based aggregation, based on a request from the computer assisted name-based aggregation system, or a request from a user system. In the second embodiment, a computer assisted name-based aggregation system transmits a user approval request, and then performs name-based aggregation. In the third embodiment, if a user system is also a service providing system, the user system requests anonymized ID to the service providing system, and then the computer assisted name-based aggregation system performs name-based aggregation. In the fourth embodiment, if a user system is also a service providing system, the user system creates a token, and then computer assisted name-based aggregation system performs name-based aggregation. In the fifth embodiment, if a user system is also a service providing system, the user system acquires a salt, and then the computer assisted name-based aggregation system performs name-based aggregation.

Figure 3A:
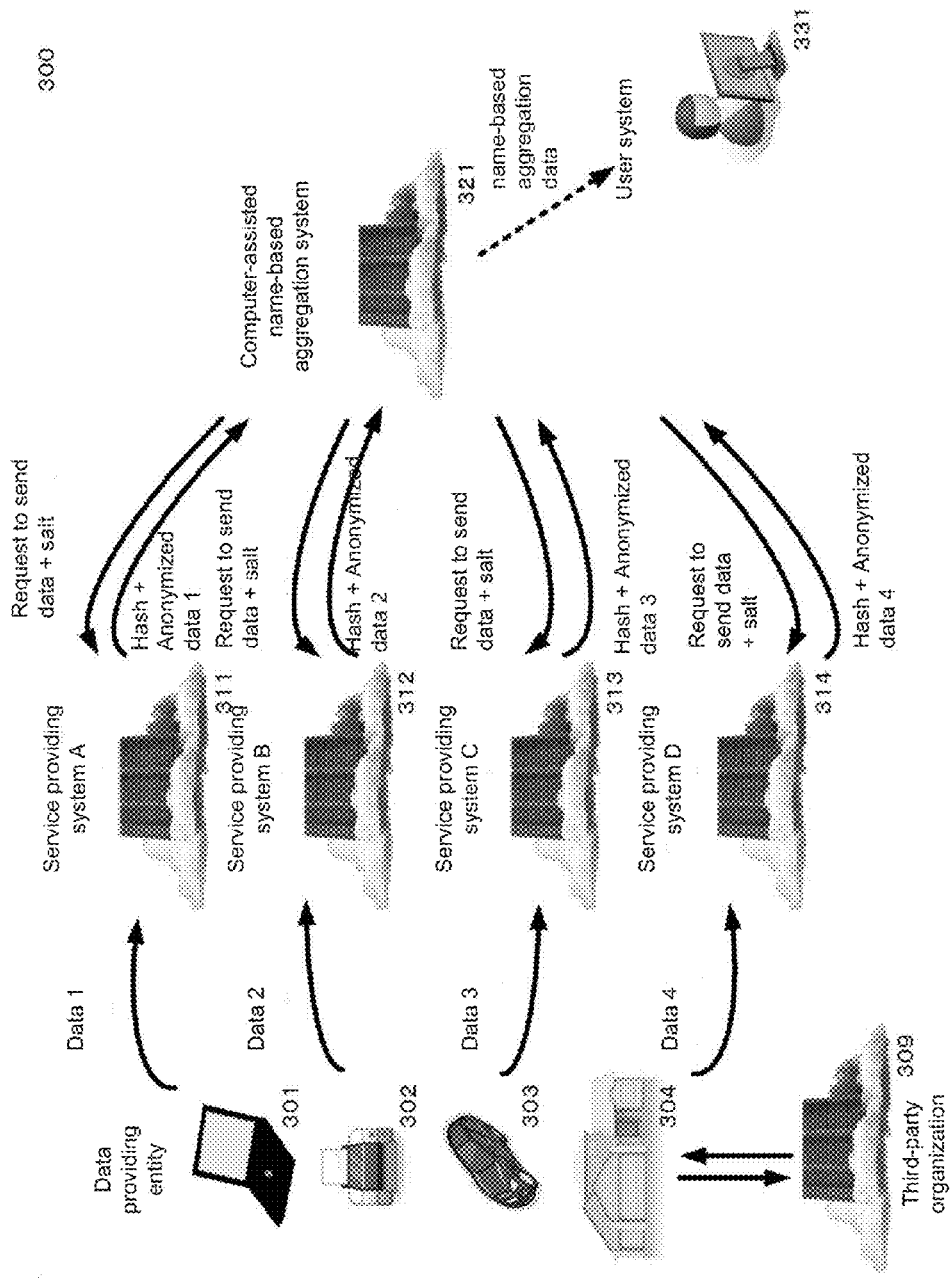
FIG. 3A is a diagram illustrating an example of name-based aggregation which is an embodiment of the present invention.
Figure 3B:
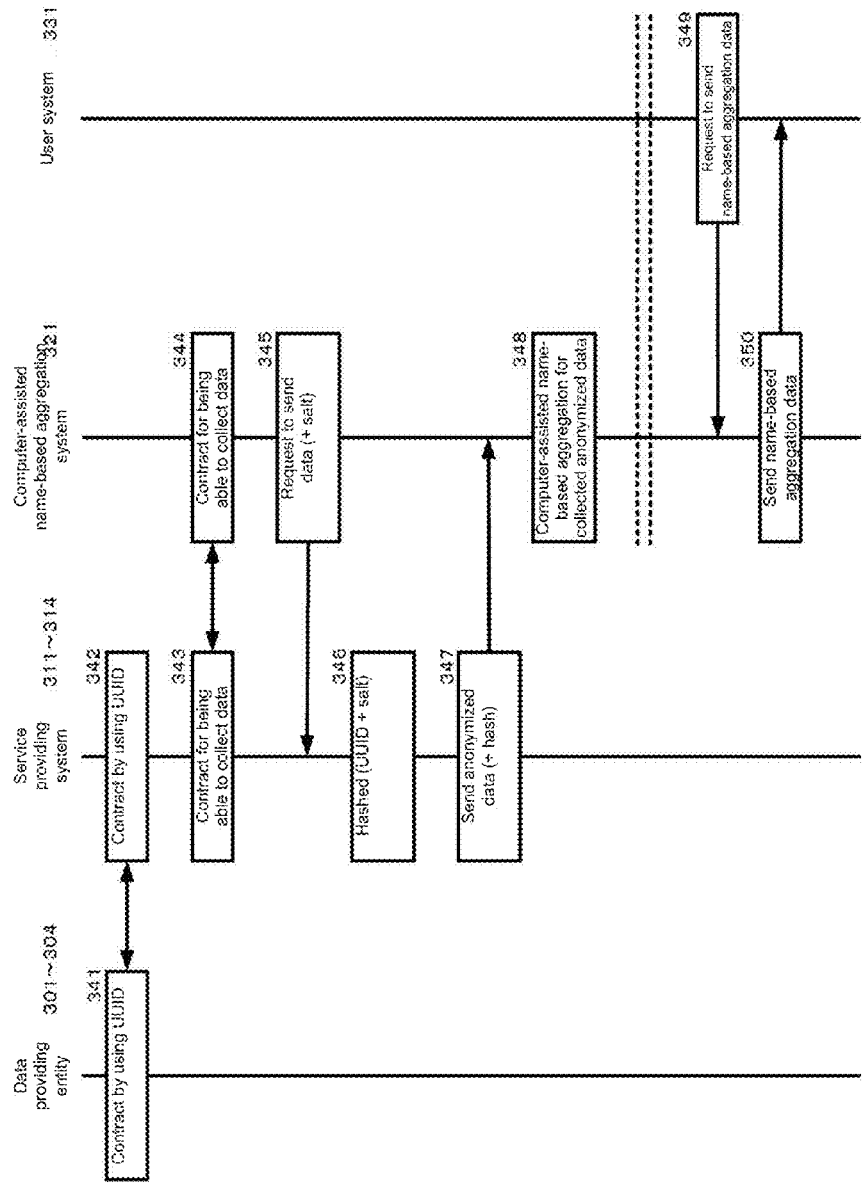
FIG. 3B is a flow chart depicting a process for implementing name-based aggregation as illustrated in FIG. 3A.
Figure 3C:
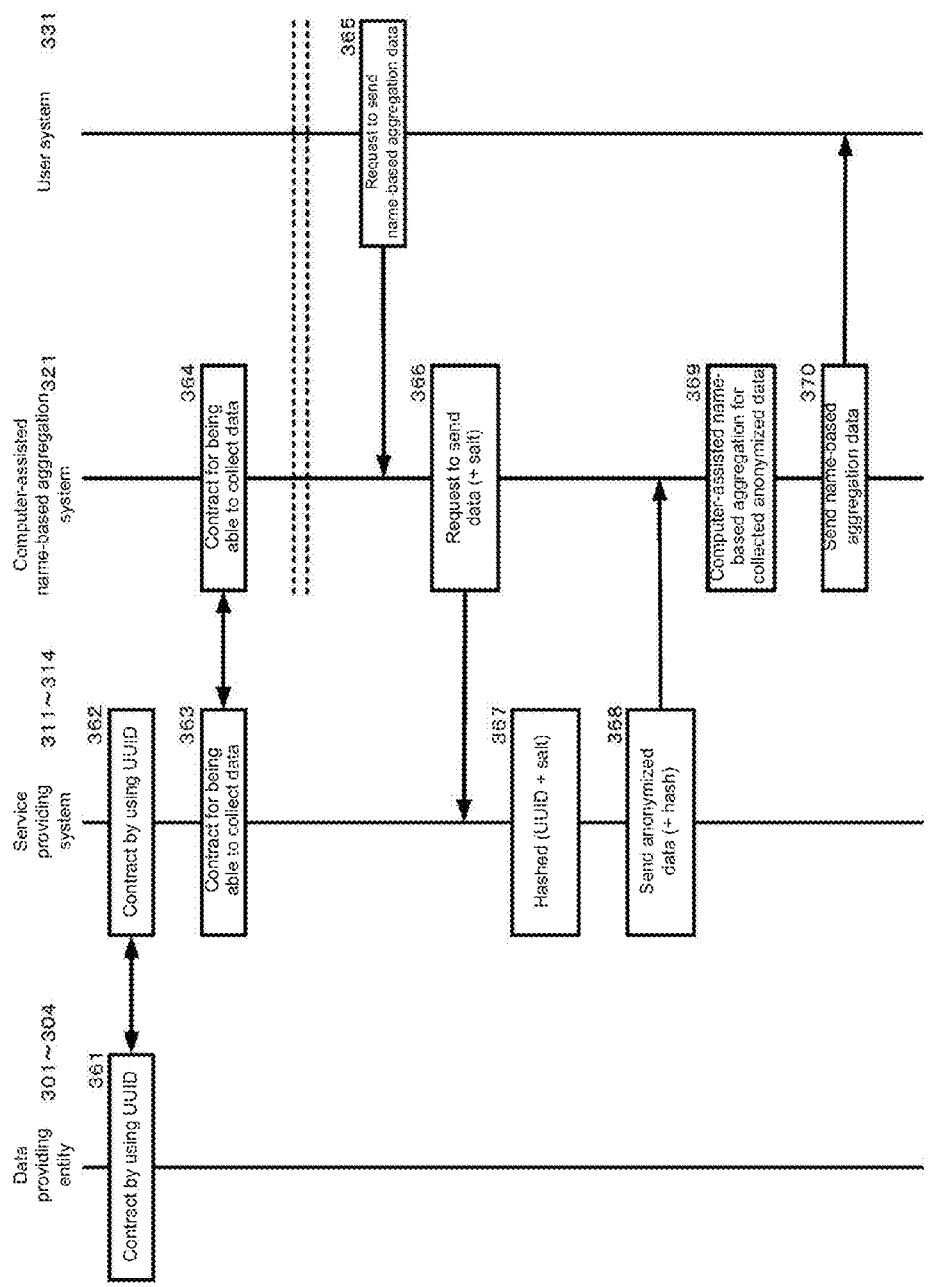
FIG. 3C is a flow chart depicting a process for implementing name-based aggregation as illustrated in FIG. 3A.

FIG. 3A is a diagram illustrating an example of name-based aggregation for the first embodiment according to the present invention. FIG. 3B and FIG. 3C are flow charts based on different embodiments for achieving name-based aggregation as illustrated in FIG. 3A.

The computer system (300) for performing name-based aggregation as illustrated in FIG. 3A, includes data providing entities (301 through 304), service providing systems (311 through 314), a computer assisted name-based aggregation system (321), and a user system (331). Furthermore, Person A owns all of the data providing entities (301 through 304).

FIG. 3B illustrates a flow chart according to the first embodiment, where the computer assisted name-based aggregation system (321) acquires data provided to the user system (331) from the service providing systems (311 through 314) regardless of whether data transmission request has been received from the user system (331), for example at a scheduled time (periodically), and creates the name identified data in advance.

In steps 341 and 342, a contract related to data provision is entered between the data providing entity (301) and the service providing system A (311). The contract covers providing data to the service providing system A (311) by the data providing entity (301), as well as anonymizing data transmitted from the data providing entity (301) by the service providing system A (311), and approval for transmitting the anonymized data to the computer assisted name-based aggregation system (321), and a contract is entered focusing on payment of compensation for providing data, to the user of the data providing entity (301). The data providing entity (301) issues an identification number (for example, UUID (Universally Unique Identifier), customer number, or user ID) for specifying the data providing entity (301) to the third party organization (309). The identification number may be used for controlling the data from the data providing entity (301). In other words, the identification number can specify that the data is provided from the data providing entity (301). Therefore, the identification number can identify an individual or a machine related to the individual. The data providing entity (301) notifies the service providing system A (311) of the aforementioned identification number. The notification may be attached as a contract attribute when entering the aforementioned contract. The notification may be automatically performed by the service providing system A (311) through an agent (such as a browser) of the data providing entity (301), or may be performed by inputting the identification number by a user, and then transmitting to the service providing system A (311), for example.

The data providing entity (301) may provide data to the service providing system A (311) based on completion of the contract. The data has the aforementioned UUID as an attribute value for example. The data providing entity (301) may encrypt the aforementioned data by using a public key of the service providing system A (311), for example. The service providing system A (311) may decode the encrypted data from the data providing entity (301) using a private key that corresponds to the aforementioned public key.

A contract similar to the aforementioned contract may be entered similarly between a data service providing entity (302) and a service providing system B (312), between a data providing entity (303) and a service providing system C (313), and between a data providing entity (304) and a service providing system D (314). Similarly, the data providing entities (302 through 304) may each provide data to the service providing systems B through D (312 through 314) based on completion of the aforementioned contract. Furthermore, Person A owns all of the data providing entities (301 through 304), so the aforementioned identification number that is used between the data providing entity (301) and the service providing system A (311) is used for providing data between the data providing entity (302) and the service providing system B (312), between the data providing entity (303) and the service providing system C (313), and between the data providing entity (304) and the service providing system D (314).

In steps 343 and 344, a contract related to data provision is entered between each of the service providing systems A through D (311 through 314) and the computer assisted name-based aggregation system (321). A contract can be entered providing approval for the service providing systems to provide anonymized data to the computer assisted name-based aggregation system (321), and for the computer assisted name-based aggregation system (321) to transmit name identified data or aggregate data aggregating the name identified data to the user system (331) for example.

Steps 341 and 342, step 343, and step 344 can be performed beforehand. Furthermore, contracts between the data providing entities (301 through 304) and the service providing systems A through D (311 through 313) do not need to be entered simultaneously, and are generally entered at any time or in any order.

Furthermore, although not illustrated in FIG. 3B, a contract is entered for providing name identified data or providing aggregate data aggregating the name identified data, between the computer assisted name-based aggregation system (321) and the user system (331). A contract can be entered for allowing the computer assisted name-based aggregation system (321) to provide name identified data or aggregate data to the user system (331), and for the user system (331) to pay the manager of the computer assisted name-based aggregation system (321) compensation for providing the name identified data or aggregate data.

In step 345, the computer assisted name-based aggregation system (321) transmits the transmission request requesting transmission of data to each of the service providing systems (311 through 314) at arbitrary timing. The computer assisted name-based aggregation system (321) transmits values that change for each of the transmission requests (for example, a salt) to the service providing systems (311 through 314) in conjunction with the transmission requests. Alternatively, the computer assisted name-based aggregation system (321) may transmit the aforementioned transmission request and the aforementioned salt to a specific service providing system if the aforementioned transmission request violates the contract between the computer assisted name-based aggregation system (321) and the service providing system, for example.

In an embodiment of the present invention, the salt is used when hashing the aforementioned identification number, and is a value that changes for each transmission requests. Therefore, the computer assisted name-based aggregation system (321) creates a salt with different values for different transmission requests. The salt is preferably a random value, and may be a date and time (for example, date, hour, minutes, milliseconds) or a hash count. Furthermore, the salt may be a value that combines proprietary information (for example, a MAC address or serial number of the computer assisted name-based aggregation system) or positional information (for example, positional information or network address by a global positioning system (GPS) or a wireless LAN access point) of the computer assisted name-based aggregation system to the aforementioned date and time.

In step 346, each of the service providing systems (311 through 314) receiving the aforementioned transmission request and the aforementioned salt hashes the identification information related to the data (for example, UUID) using the salt from the computer assisted name-based aggregation system (321), and creates a hash value. The hashing technique (for example, algorithm) can be an arbitrary technique known by one skilled in the art. The hash value anonymizes the identification information, so the hash value may also be referred to as anonymized ID.

The service providing systems (311 through 314) each use the same hashing algorithm. So long as the same hashing algorithm can be used in each of the service providing systems (311 through 314), the hashing algorithm that is used can be changed based on a time slot, for example. Because the service providing systems (311 through 314) use the same hashing algorithm, the same hash value (anonymized ID) can be created for the same transmission request between the service providing systems (311 through 314).

Furthermore, each of the service providing systems (311 through 314) that have received the aforementioned transmission request and the aforementioned salt may determine whether the received salt is different from a previously received salt. This is because receiving salt that is the same as a previously received salt violates the concept that a different salt is created for each transmission request. Furthermore, there is a possibility that the received salt was created by a malicious third party.

In step 347, each of the service providing systems (311 through 314) that have received the aforementioned transmission data and the aforementioned salt anonymizes the data specified by the identification number. Furthermore, each of the service providing systems (311 through 314) transmits a set containing the anonymized data and the hash value to the computer assisted name-based aggregation system (321). Because each of the service providing systems (311 through 314) arbitrarily receives compensation for providing data from the manager of the computer assisted name-based aggregation system (321), history of the transaction for each transmission request from the computer assisted name-based aggregation system (321), or of the transmission of the aforementioned anonymized data may be recorded.

In step 348, the computer assisted name-based aggregation system (321) receives the aforementioned set from each of the service providing systems (311 through 314). The computer assisted name-based aggregation system (321) identifies the name of the anonymized data specified by the hash value from the received set, and the acquired name identified data. Data with the same hash value was created from the same identification number. Therefore, the computer assisted name-based aggregation system (321) can identify the name of the anonymized data without the identification number. Furthermore, the computer assisted name-based aggregation system (321) can identify the name of the anonymized data for only the transmission request in step 345. This is because if the transmission request is not a transmission request in step 345, the salt from the computer assisted name-based aggregation system (321) changes, thus changing the hash value.

The computer assisted name-based aggregation system (321) may arbitrarily create aggregate data by aggregating the name identified data. The method of aggregating the name identified data may be any technique known to one skilled in the art.

The computer assisted name-based aggregation system (321) may store the name identified data or the aggregate data on a recording medium that can be accessed by the computer assisted name-based aggregation system (321).

In step 347, each of the service providing systems (311 through 314) may arbitrarily encrypt anonymized data using a public key of the user system (331) for example. Therefore, each of the service providing systems (311 through 314) may transmit a set containing encrypted data and the hash value (non-encrypted) to the computer assisted name-based aggregation system (321). By encrypting the anonymized data, the computer assisted name-based aggregation system (321) cannot view the contents of the anonymized data, but the hash value is not encrypted, so the name of the encrypted anonymized data can be identified. Therefore, not allowing the contents of the anonymized data to become public to the computer assisted name-based aggregation system (321) by encrypting the anonymized data is advantageous.

In step 349, the user system (331) transmits a transmission request for the name identified data or the aggregate data to the computer assisted name-based aggregation system (321) at an arbitrary time.

In step 350, the computer assisted name-based aggregation system (321) transmits the name identified data or the aggregate data stored on the aforementioned recording medium to the user system (331) based on reception of the transmission request. Because the computer assisted name-based aggregation system (321) arbitrarily acquires compensation from the user of the user system (331) for providing the name identified data or aggregate data, history of the transaction of each transaction request from the user system (331), or of the transmission of the anonymized data may be recorded.

The user system (331) receives the name identified data or the aggregate data. The user system (331) may decode the name identified data or the aggregate data encrypted by a private key of the user system (331) that corresponds to the aforementioned public key, if the received name identified data or aggregate data is encrypted.

FIG. 3C illustrates a flow chart according to the first embodiment, where the computer assisted name-based aggregation system (321) acquires data provided to the user system (331) on time from each of the service providing systems (311 through 314), based on reception of the data transmission request from the user system (331), and creates name identified data.

Steps 361 through 364 correspond to steps 341 through 344 illustrated in FIG. 3B, so the description of steps 341 through 344 should be referenced for steps 361 through 364.

In step 365, the user system (331) transmits a transmission request for the name identified data or the aggregate data to the computer assisted name-based aggregation system (321) at an arbitrary time. Step 365 corresponds to step 349 illustrated in FIG. 3B.

In step 366, the computer assisted name-based aggregation system (321) transmits transmission requests requesting data transmission, and values that change for each transmission request (for example, a salt) to each service providing system (311 through 314), based on reception of the transmission request from the user system (331). Step 366 corresponds to step 345 illustrated in FIG. 3B, so the description of step 345 should be referenced for step 365.

Steps 367 through 369 correspond to steps 346 through 348 illustrated in FIG. 3B, so the description of steps 346 through 348 should be referenced for steps 367 through 369.

In step 370, the computer assisted name-based aggregation system (321) transmits the name identified data or the aggregate data to the user system (331) based on the creation of the name identified data or the aggregate data. Step 370 corresponds to step 350 illustrated in FIG. 3B, so the description of step 350 should be referenced for step 370.

The user system (331) receives the name identified data or the aggregate data. The user system (331) may decode the name identified data or the aggregate data encrypted by a private key of the user system (331) that corresponds to the aforementioned public key, if the received name identified data or aggregate data is encrypted.

In the first embodiment according to the present invention, a value that changes for each transmission request is created for each transmission request. In other words, a value that changes for each transmission request is used. This means that a value that changes for each transmission request is used for data originating from the same user. In other words, a hash value that is created by using the value that changes for each transmission request. Therefore, the anonymized data for the transmission requests that originate from the same user, and that are different cannot specify the user even if accumulated or stored in the computer assisted name-based aggregation system (321), and the computer assisted name-based aggregation system (321) can disable name-based aggregation of anonymized data of the same user. Therefore, the first embodiment according to the present invention can be advantageous for preventing identification of the user (in other words, specifying of the individual), and preventing integration by comparing anonymized data collected for the change transmission request for the anonymized data of the same user.

Figure 4A:
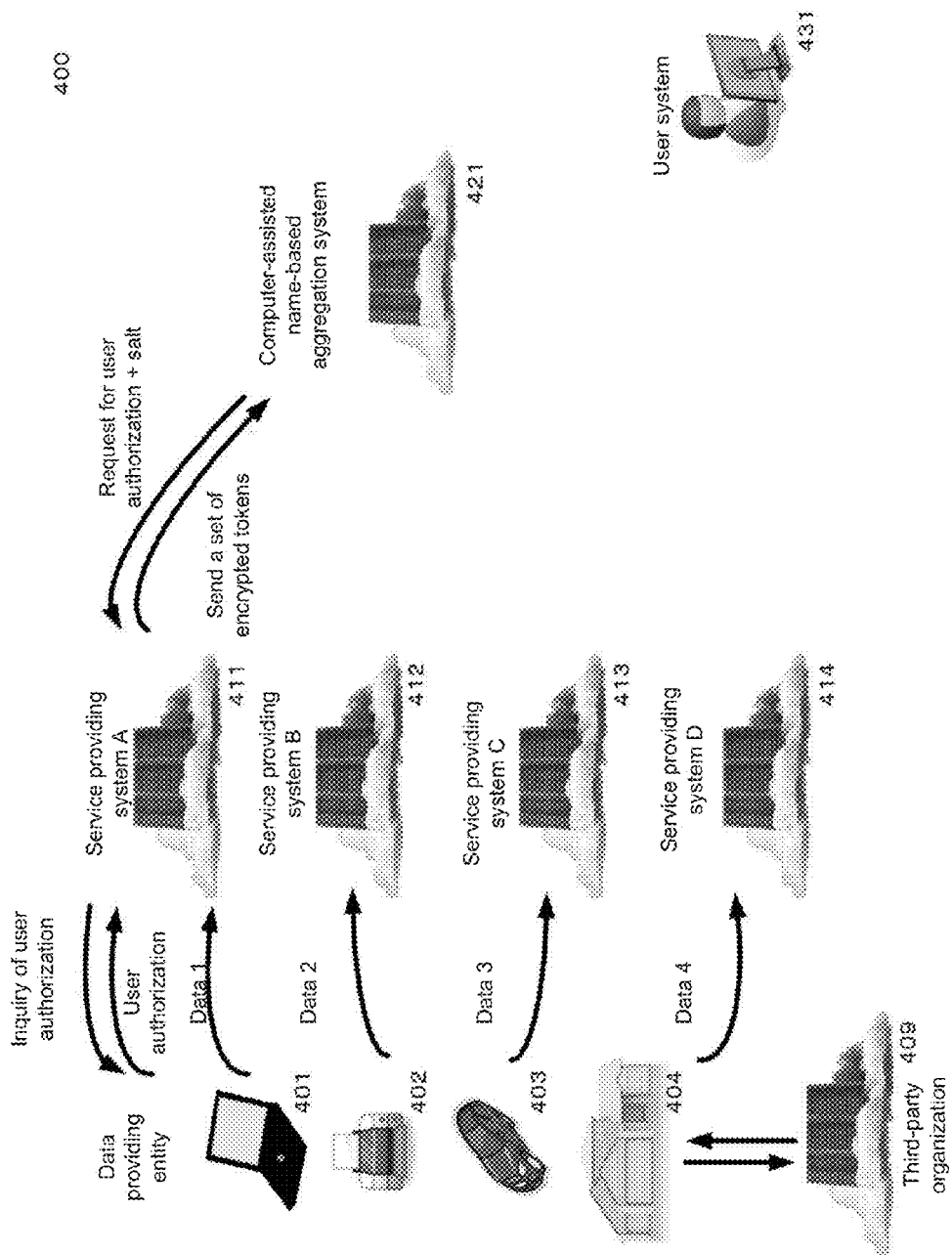
FIG. 4A is a diagram illustrating an example of name-based aggregation which is an embodiment of the present invention.
Figure 4B:
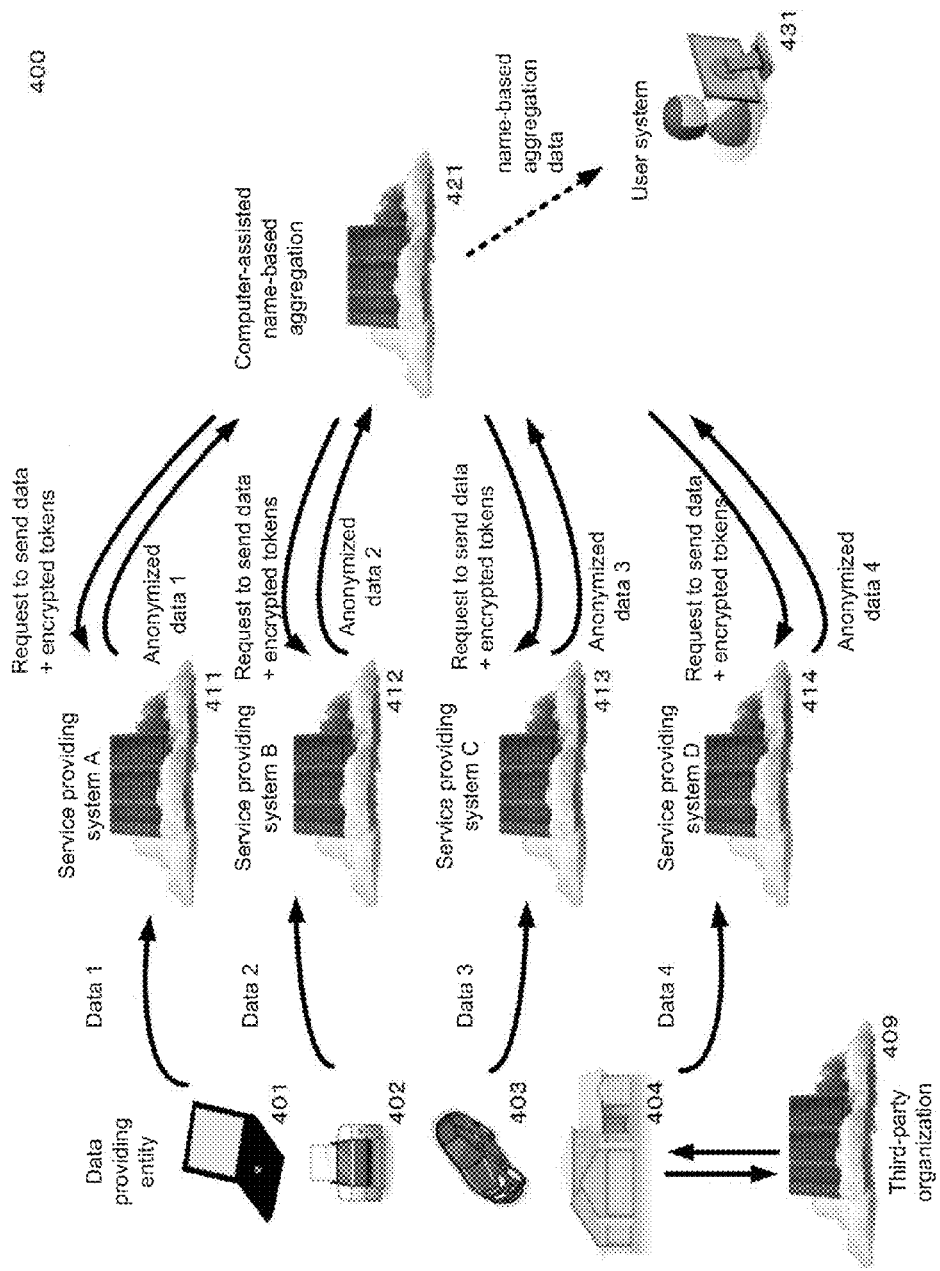
FIG. 4B is a diagram illustrating an example of name-based aggregation which is an embodiment of the present invention.
Figure 4C:
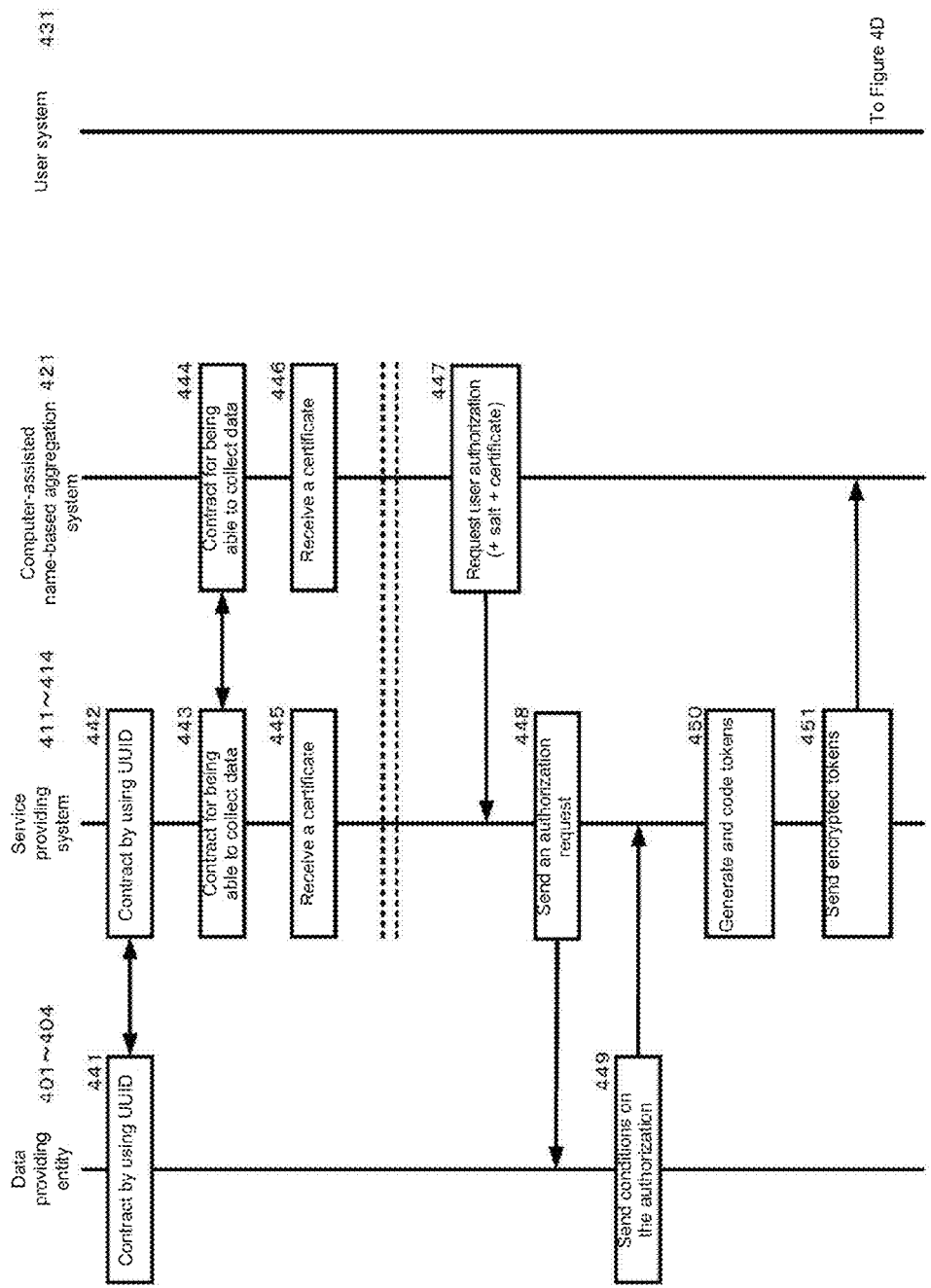
FIG. 4C is a flow chart depicting a process for implementing name-based aggregation as illustrated in FIG. 4A and FIG. 4B.
Figure 4D:
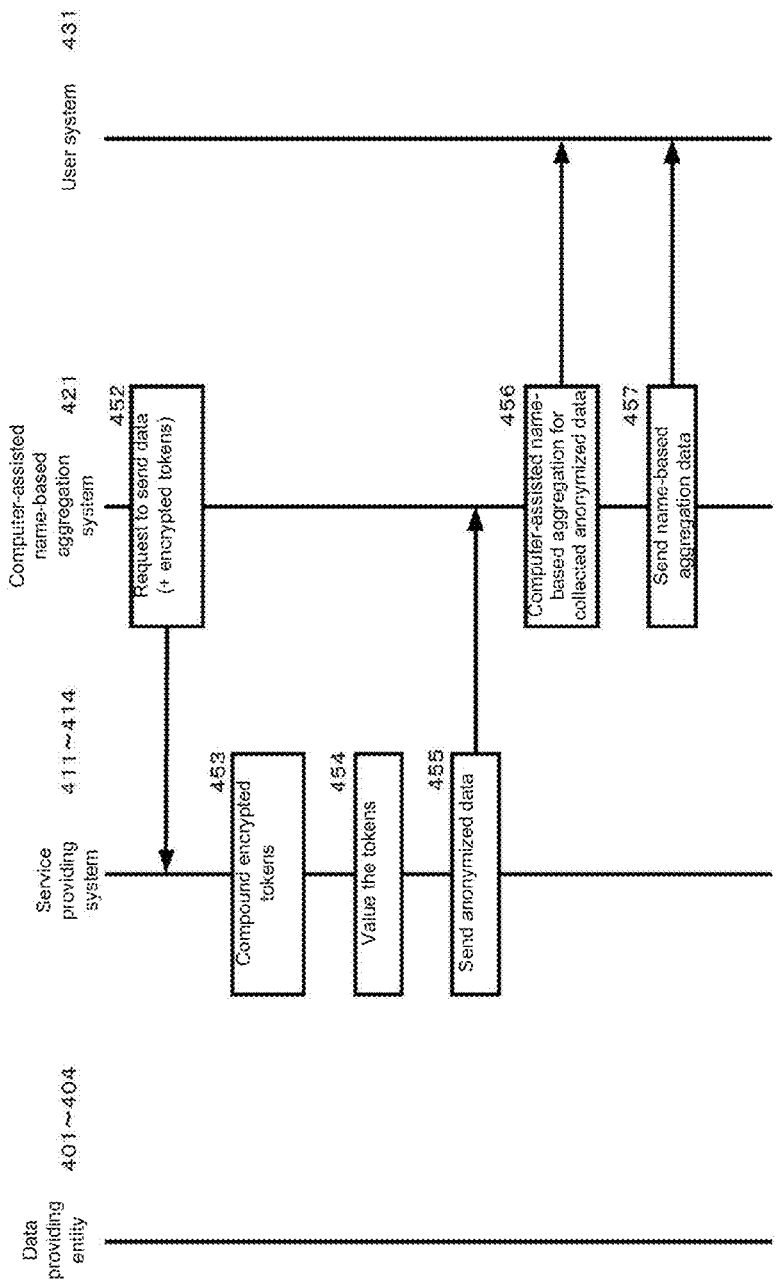
FIG. 4D is a flow chart depicting a process for implementing name-based aggregation as illustrated in FIG. 4A and FIG. 4B.

FIG. 4A and FIG. 4B are diagrams illustrating an example of name-based aggregation according to the second embodiment of the present invention. FIG. 4C and FIG. 4D illustrate a flow chart for performing name-based aggregation as illustrated in FIG. 4A and FIG. 4B.

A computer system (400) for performing name-based aggregation as illustrated in FIG. 4A and FIG. 4B, includes data providing entities (401 through 404), service providing systems (411 through 414), a computer assisted name-based aggregation system (421), and a user system (431). Furthermore, Person B owns all data providing entities (401 through 404).

Steps 441 through 444 correspond to steps 341 through 344 illustrated in FIG. 3B, so the description of steps 341 through 344 should be referenced for steps 441 through 444.

Furthermore, although not illustrated in FIG. 4C, a contract is entered for providing name identified data or providing aggregate data aggregating the name identified data, between the computer assisted name-based aggregation system (421) and the user system (431). A contract can be entered for allowing the computer assisted name-based aggregation system (421) to provide name identified data or aggregate data to the user system (431), and for the user system (431) to pay the manager of the computer assisted name-based aggregation system (421) compensation for providing the name identified data or aggregate data.

In step 445, the service providing systems A through D (411 through 414) request a third party organization (409) to issue a certificate used in communication with the computer assisted name-based aggregation system (421), and receive the certificate from the third party organization (409). The certificate of the service providing system A (411) has a private key of the service providing system A (411) and a public key corresponding to the private key. Each certificate for each of the service providing systems B through D (412 through 414) is the same as the certificate of the service providing system A (411).

In step 446, the computer assisted name-based aggregation requests a third party organization (409) to issue a certificate used in communication with the service providing systems A through D (411 through 414), and receive the certificate from the third party organization (409). The certificate of the computer assisted name-based aggregation system (421) has a private key corresponding to the computer assisted name-based aggregation system (421) and a public key corresponding to the private key. Furthermore, because the service providing systems for acquiring data therefrom are specified, the computer assisted name-based aggregation system (421) requests the third party organization (409) to issue a certificate for each of the service providing systems (411 through 414), and receives the certificate from the third party organization (409). Because each certificate for the service providing systems (411 through 414) is requested from the computer assisted name-based aggregation system (421), each certificate has only a public key for each of the service providing systems (411 through 414).

Note that either step 445 or step 446 may be performed first.

In step 447, the computer assisted name-based aggregation system (421) transmits an approval request seeking approval for name-based aggregation to a user, and a value that changes for each approval request, at an arbitrary timing, for example, at a time scheduled by a manager of the computer assisted name-based aggregation system (421), based on reception of a data transmission request from the user system (431), or regardless of whether the data transmission request has been received from the user system (431); and the computer assisted name-based aggregation system arbitrarily transmits a certificate (including a public key) for a service providing system that is subject to acquire anonymized data from the plurality of service providing systems, and a unique ID related to the computer assisted name-based aggregation system (421) (for example, the MAC address or serial number of the computer assisted name-based aggregation system (421)). In the example illustrated in FIG. 4A, the service providing system that can process the user approval request is service providing system A (411). Note that the system that can process the user approval request can be a system other than the service providing systems (411 through 414), for example, a computer that only specializes in performing a user approval request process.

In step 448, the service providing system A (411) transmits the user approval request to a user (for example, data providing entity (401)) based on reception of the user approval request. The service providing system A (411) may present the user approval conditions to the user when transmitting the aforementioned user approval request. The user approval condition may be a data type or content where data can be provided, a destination for providing data, rejection of data redistribution to the destination for providing data, a data type or content where data cannot be provided, a count of providing data to the computer assisted name-based aggregation system, a count of providing name identified data to the user system, or compensation for providing data for example.

In step 449, the data providing entity (401) may present the content of the aforementioned user approval conditions by displaying on a display. The user may view the content of the approval conditions, and determine whether to approve the presented user approval conditions. Furthermore, the user may add one or a plurality of user approval conditions other than the presented user approval conditions.

In step 450, the service providing system A (411) creates a token based on reception of the user approval conditions from the data providing entity (401). The token may include an identification number related to the user (for example, UUID), and a value that changes for each of the approval requests that are transmitted in step 447, and may arbitrarily include the user approval condition transmitted in step 449. Next, the service providing system A (411) encrypts the token using a public key from each of the service providing systems A through D (411 through 414). The public key is retrieved from the certificates from each of the service providing systems A through D (411 through 414). Service providing system A (411) encrypts the token using the public key from each of the service providing systems A through D (411 through 414), so only the service providing system with a private key corresponding to the public key encrypting the token can decode the encrypted token. Therefore, the computer assisted name-based aggregation system (421) cannot decode the encrypted token, so the system cannot specify the aforementioned identification number within the encrypted token.

The public key used when the service providing system A (411) encrypts the token may be a public key within each certificate transmitted in step 447. Alternatively, the service providing system A (411) can obtain a list of service providing systems receiving the aforementioned encrypted token from the computer assisted name-based aggregation system (421), and acquire a public key of each of the service providing systems within the list from the third party organization (409). The third party organization (409) is a server controlling the public key of each of the service providing systems.

In step 451, the service providing system A (411) transmits all of the encrypted tokens (in other words, set of encrypted tokens) to the computer assisted name-based aggregation system (421).

In step 452, the computer assisted name-based aggregation system (421) transmits a data transmission request to at least one system from the service providing systems A through D (411 through 414), that stores anonymized data subject to name-based aggregation. The computer assisted name-based aggregation system (421) transmits only a token encrypted by the public key from any one of the service providing systems A through D (411 through 414) which are the destinations of transmission, from the set of the encrypted tokens transmitted in step 451, in conjunction with the aforementioned data transmission request, to the service providing system with a private key corresponding to the public key. In order to ensure that the transmission is possible, each token may be transmitted as (KEY=VALUE) information from a pair such as (a subject service providing system):(subject token), for example.

In step 453, each of the service providing systems that have received the data transmission request decodes the encrypted token that was received using that system's private key. The service providing systems that have received the aforementioned data transmission request receive only the aforementioned encrypted token encrypted by the public key corresponding to the private key, and therefore the encrypted token can be decoded using the aforementioned private key.

In step 454, the service providing systems that were able to decode the encrypted token may evaluate the user approval conditions within the token. The evaluation may be performed based on date and time restrictions for providing data or the count thereof, or comparisons with tokens previously decoded for example. The service providing systems that were able to decode the encrypted token may store the decoded token on a recording medium that can be accessed by the service providing systems.

In step 455, the service providing systems that were able to encrypt the token determines whether the anonymized data can be transmitted to the computer assisted name-based aggregation system, in accordance with the user approval condition or the evaluation of the user approval condition. The service providing systems that were able to decode the aforementioned encrypted token anonymize the data specified by the aforementioned identification number, if the anonymized data can be transmitted to the computer assisted name-based aggregation system. Furthermore, the service providing systems that were able to decode the encrypted token may transmit the anonymized data to the computer assisted name-based aggregation system (421). Alternatively, the service providing systems that were able to decode the encrypted token may create a hash value based on the aforementioned identification number and the aforementioned value transmitted in step 447, and transmit the created hash value to the computer assisted name-based aggregation system (421) in conjunction with the anonymized data. The service providing systems that were able to decode the encrypted token use the same hashing algorithm. So long as the same hashing algorithm can be used in each of the service providing systems that were able to decode the encrypted token, the hashing algorithm that is used can be changed according to the time slot for example. Because each of the service providing systems that can decode the encrypted token use the same hashing algorithm, the same hash value (anonymized ID) can be created for the same transmission request between the service providing systems. Because each of the service providing systems arbitrarily receives compensation for providing data from the manager of the computer assisted name-based aggregation system (421), history of the transaction for each transmission request from the computer assisted name-based aggregation system (421), or of the transmission of the aforementioned anonymized data may be recorded.

In step 456, the computer assisted name-based aggregation system (421) may receive the anonymized data from each of the service providing systems that have received the aforementioned anonymized data. Alternatively, the computer assisted name-based aggregation system (421) may receive the anonymized data and the aforementioned hash value from the service providing systems that have received the aforementioned anonymized data. The computer assisted name-based aggregation system (421) may identify the names of the anonymized data specified by the aforementioned token from the anonymized data received from the aforementioned service providing systems. The computer assisted name-based aggregation system (421) can determine what anonymized data corresponds to what name-based aggregation using the aforementioned token. Alternatively, the computer assisted name-based aggregation system (421) may identify the name of the anonymized data specified by the aforementioned hash value from the anonymized data received from each of the aforementioned service providing systems.

The computer assisted name-based aggregation system (421) may arbitrarily create aggregate data by aggregating the name identified data. The method of aggregating the name identified data may be any technique known to one skilled in the art.

The computer assisted name-based aggregation system (421) may store the name identified data or the aggregate data on a recording medium that can be accessed by the computer assisted name-based aggregation system (421).

In step 456, the service providing systems that were able to decode the encrypted token may arbitrarily encrypt the anonymized data using a public key of the user system (431). Therefore, the service providing systems that were able to decode the encrypted data may transmit the encrypted anonymized data to the computer assisted name-based aggregation system (421). By encrypting the anonymized data, the computer assisted name-based aggregation system (421) cannot view the contents of the anonymized data. Therefore, not allowing the contents of the anonymized data to become public to the computer assisted name-based aggregation system (421) by encrypting the anonymized data is advantageous.

In step 457, the computer assisted name-based aggregation system (421) transmits the aforementioned name identified data or the aforementioned aggregate data to the user system (431). Because the computer assisted name-based aggregation system (421) arbitrarily acquires compensation from the user of the user system (431) for providing the name identified data or aggregate data, history of the transaction of each user approval request from the user system (431), or of the transmission of the anonymized data may be recorded.

The user system (431) receives the name identified data or the aggregate data. The user system (431) may decode the name identified data or the aggregate data encrypted by a private key of the user system (431) that corresponds to the aforementioned public key, if the received name identified data or aggregate data is encrypted.

Figure 5A:
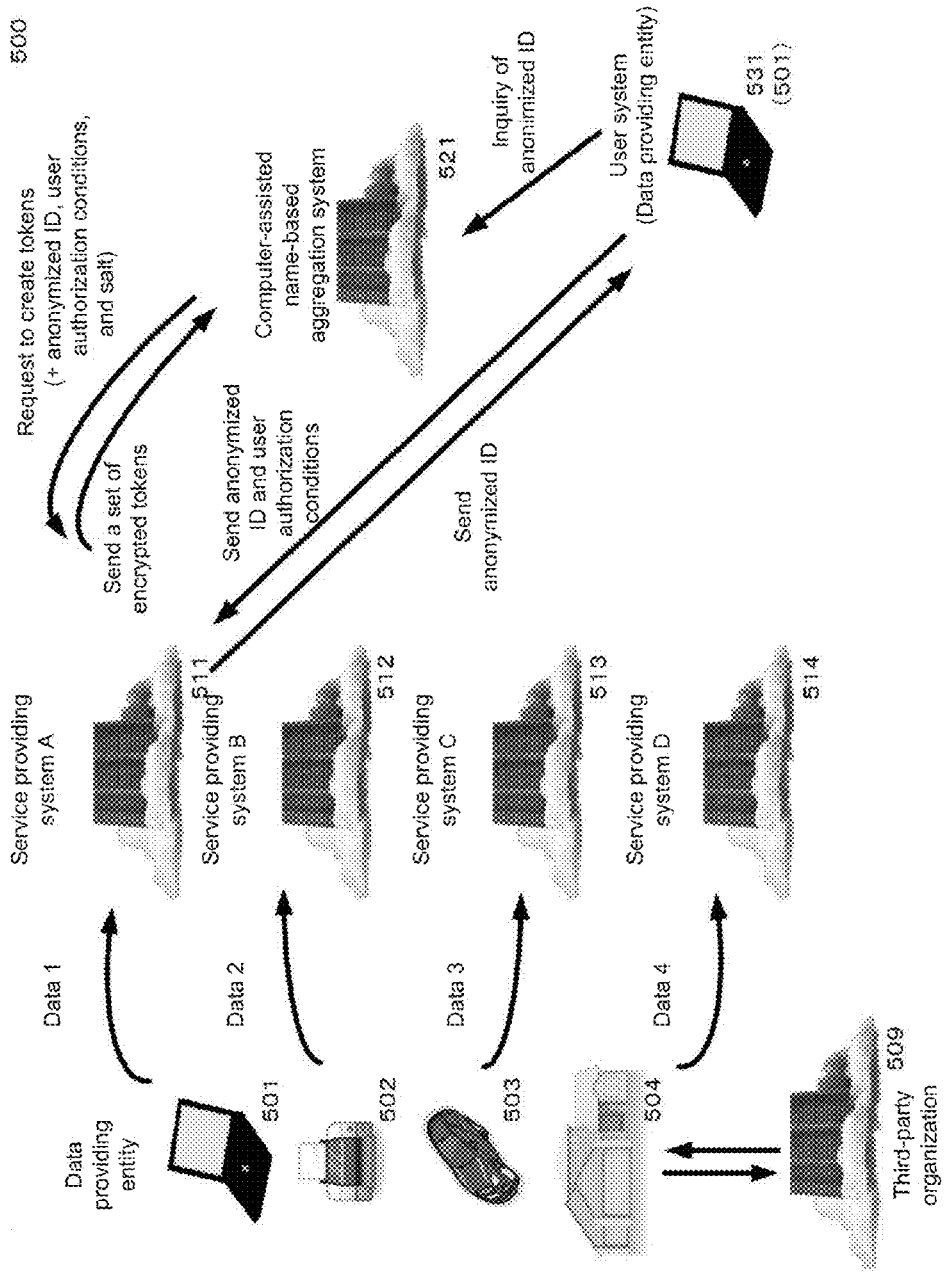
FIG. 5A is a diagram illustrating an example of name-based aggregation which is an embodiment of the present invention.
Figure 5B:
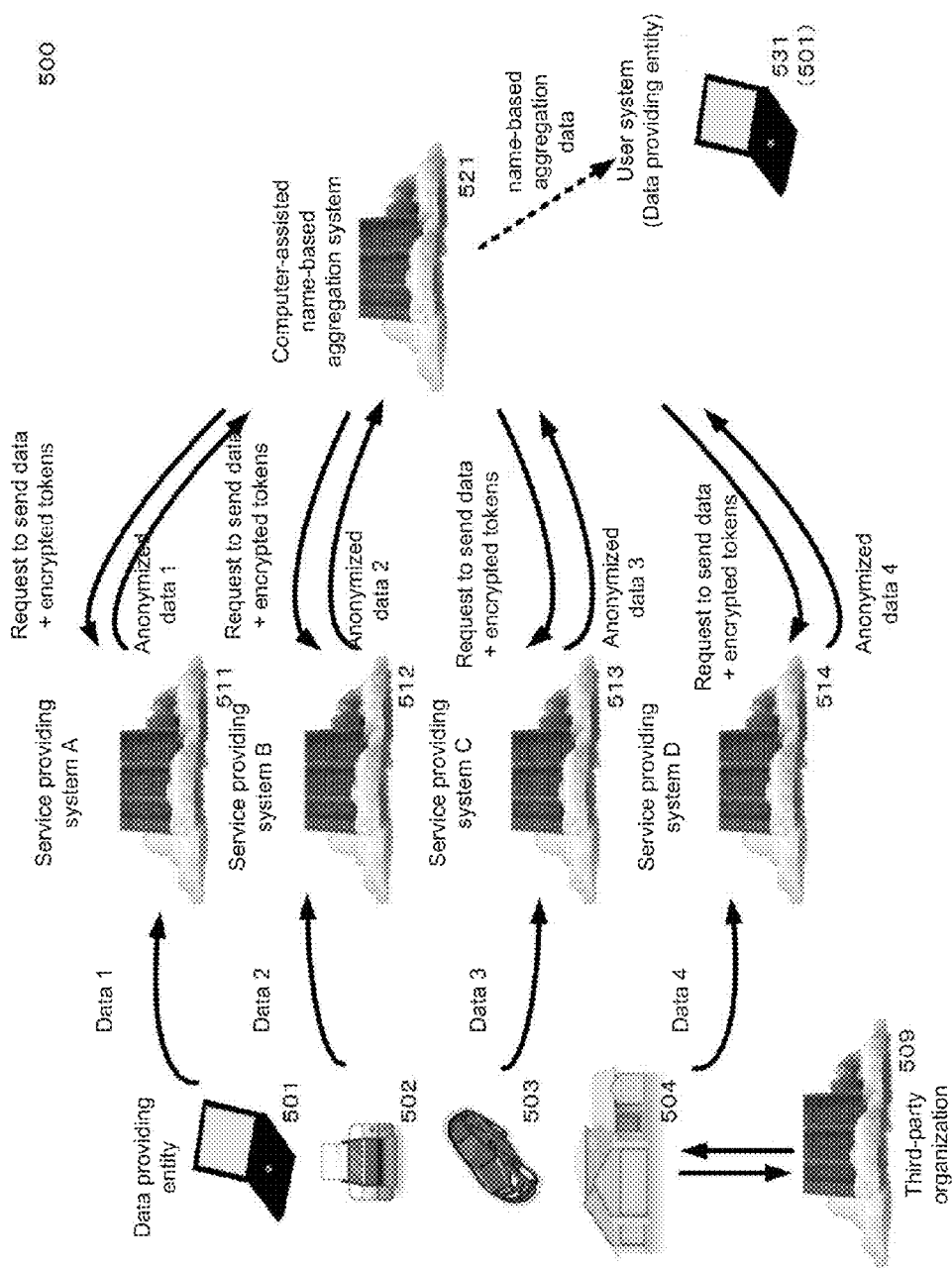
FIG. 5B is a diagram illustrating an example of name-based aggregation which is an embodiment of the present invention.
Figure 5C:
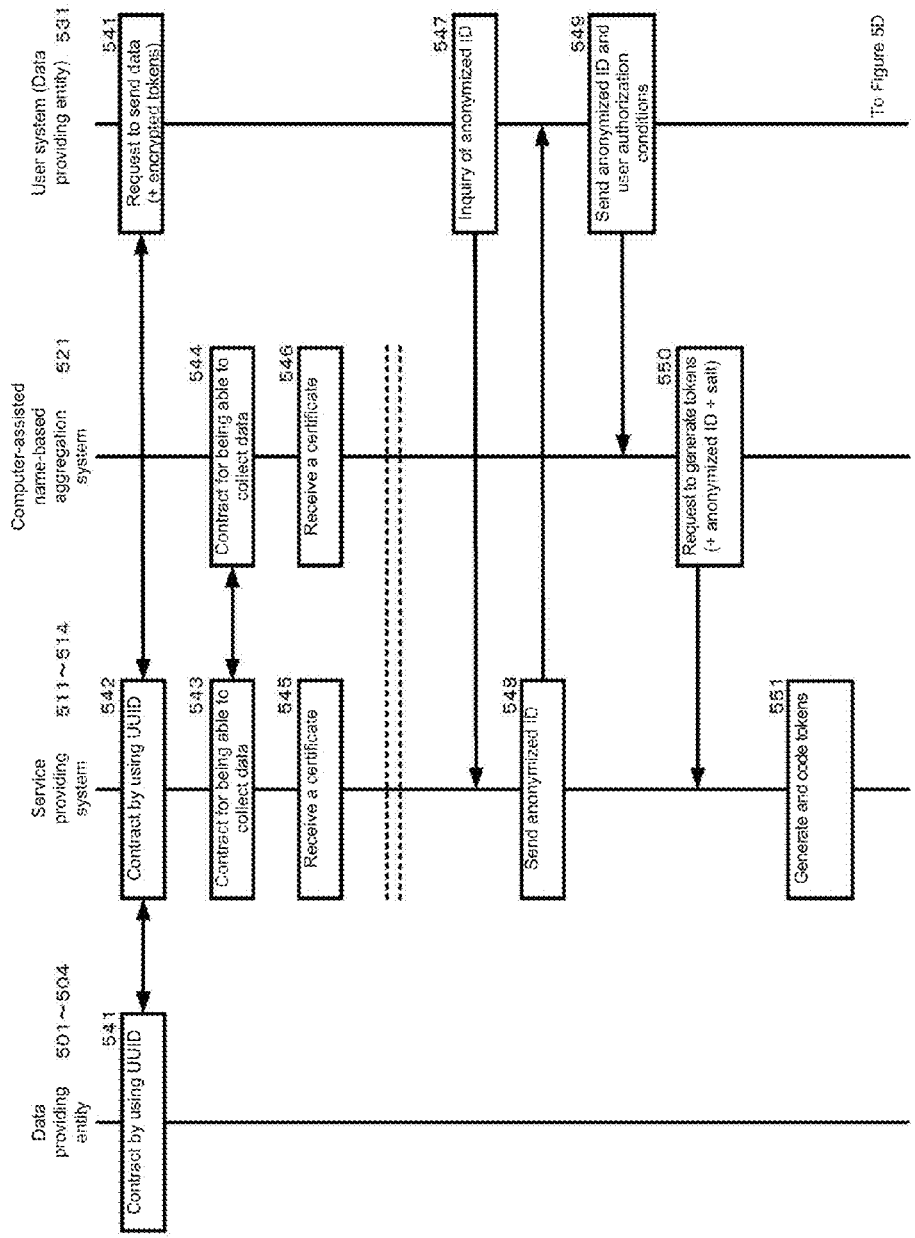
FIG. 5C is a flow chart depicting a process for implementing name-based aggregation as illustrated in FIG. 5A and FIG. 5B.
Figure 5D:
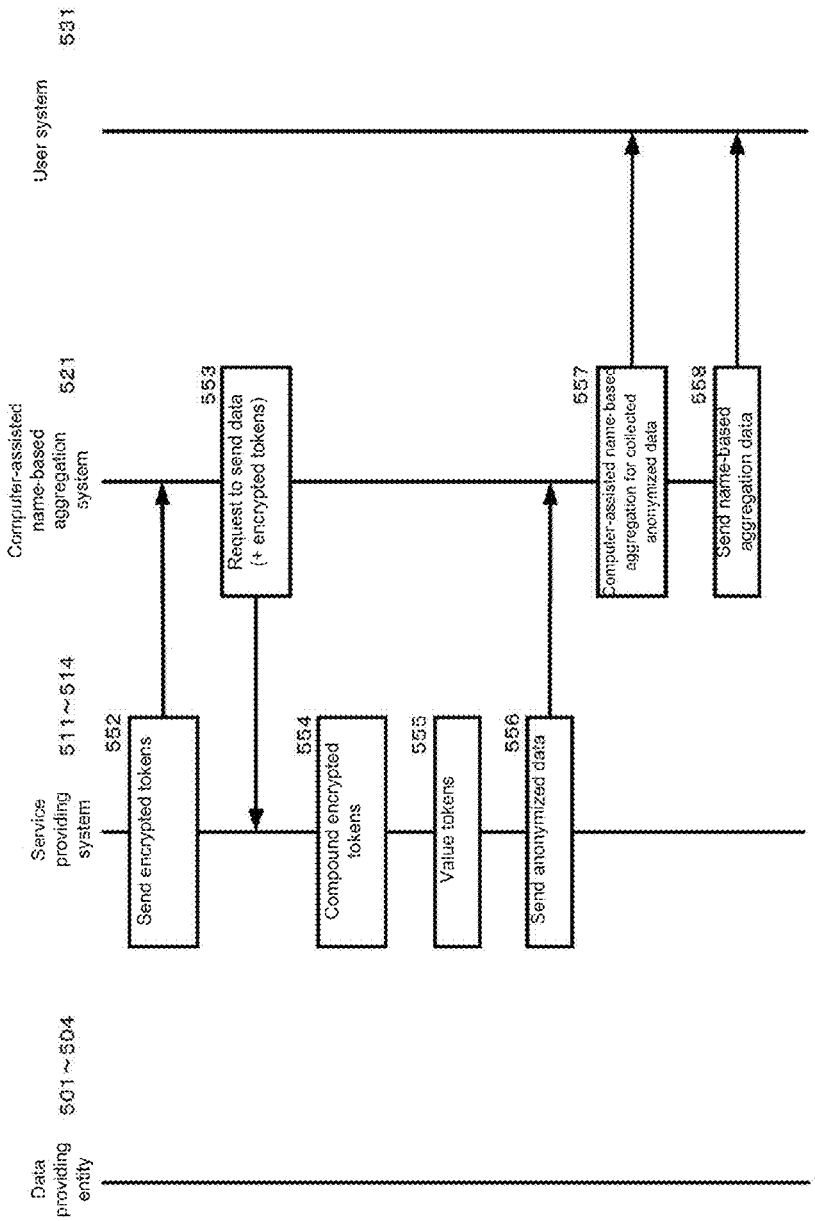
FIG. 5D is a flow chart depicting a process for implementing name-based aggregation as illustrated in FIG. 5A and FIG. 5B.

FIG. 5A and FIG. 5B are diagrams illustrating an example of name-based aggregation according the third embodiment of the present invention. FIG. 5C and FIG. 5D illustrate a flow chart for performing name-based aggregation illustrated in FIG. 5A and FIG. 5B.

A computer system (500) for performing name-based aggregation as illustrated in FIG. 5A and FIG. 5B, includes data providing entities (501 through 504), service providing systems (511 through 514), and a computer assisted name-based aggregation system (521). Furthermore, the data providing entity (501) is also a user system (531). In other words, the user system (531) is provided on the same hardware as the data providing entity (501). Furthermore, Person C owns all of the data providing entities (501 through 504).

Steps 541 through 544 correspond to steps 341 through 344 illustrated in FIG. 3B, so the description of steps 341 through 344 should be referenced for steps 541 through 544.

Steps 545 through 546 correspond to steps 445 through 446 illustrated in FIG. 4C, so the description of steps 445 through 446 should be referenced for steps 545 through 546.

In step 547, the user system (531) (also the data providing entity (501)) combines the anonymized identification number (for example, hash value of UUID) of the user system (531) for the service providing system A (511) at a time scheduled by a user (for example, periodically), based on reception of a data transmission request command from the user of the user system (531), or regardless of whether a data transmission request has been received from the user. The anonymized identification number is stored in each of the service providing systems (511 through 514). Furthermore, the service providing systems (511 through 514) record data that records mapping (for example, a mapping table) of the identification number (non-anonymized) and the anonymized identification number (anonymized ID), on a recording medium that can be accessed by each of the service providing systems (511 through 514).

In step 548, service providing system A (511) searches for the aforementioned mapping data in the aforementioned recording medium, and acquires the encrypted identification number related to the service providing system A (511), based on a combination of the aforementioned anonymized data. Service providing system A (511) transmits the acquired anonymized identification number to the user system (531).

In step 549, the user system (531) transmits the acquired anonymized identification number and the user approval conditions, as well as arbitrarily transmit information (for example, network address) specifying service providing system A (511) to the computer assisted name-based aggregation system (521).

In step 550, the computer assisted name-based aggregation system (521) transmits a creation request for the token to service providing system A (511), based on reception of the anonymized identification number and the user approval conditions. The computer assisted name-based aggregation system (521) transmits a value valid only for the creation request of the token (for example, a salt), as well as the anonymized identification number, and arbitrarily transmits the user approval condition, arbitrarily transmits a certificate (including only a public key) of the service providing system subject to anonymized data acquisition from the plurality of service providing systems, and arbitrarily transmits a unique ID related to the computer assisted name-based aggregation system (521) (for example, a MAC address or serial number of the computer assisted name-based aggregation system (521)), in conjunction with the creation request of the token.

In step 551, service providing system A (511) acquires an identification number (non-anonymized) corresponding to the received anonymized identification number in conjunction with the token creation request by searching for the mapping data in the recording medium. Furthermore, service providing system A (511) creates a token based on reception of the token creation request. The token includes the acquired identification number (for example, UUID), and the salt that was transmitted in step 550, and arbitrarily includes the user approval conditions that were transmitted in step 550. Service providing system A (511) encrypts the token using a public key of each of the service providing systems A through D (511 through 514), and creates a set of encrypted tokens. The public key is retrieved from the certificates from each of the service providing systems A through D (511 through 514). Service providing system A (511) encrypts the token using the public key from each of the service providing systems A through D (511 through 514), so only the service providing system with a private key corresponding to the public key encrypting the token can decode the encrypted token.

In step 552, the service providing system A (511) transmits all of the encrypted tokens (in other words, set of encrypted tokens) to the computer assisted name-based aggregation system (521).

Steps 553 through 558 correspond to steps 452 through 457 illustrated in FIG. 4D, so the description of steps 452 through 457 should be referenced for steps 553 through 558.

Figure 6A:
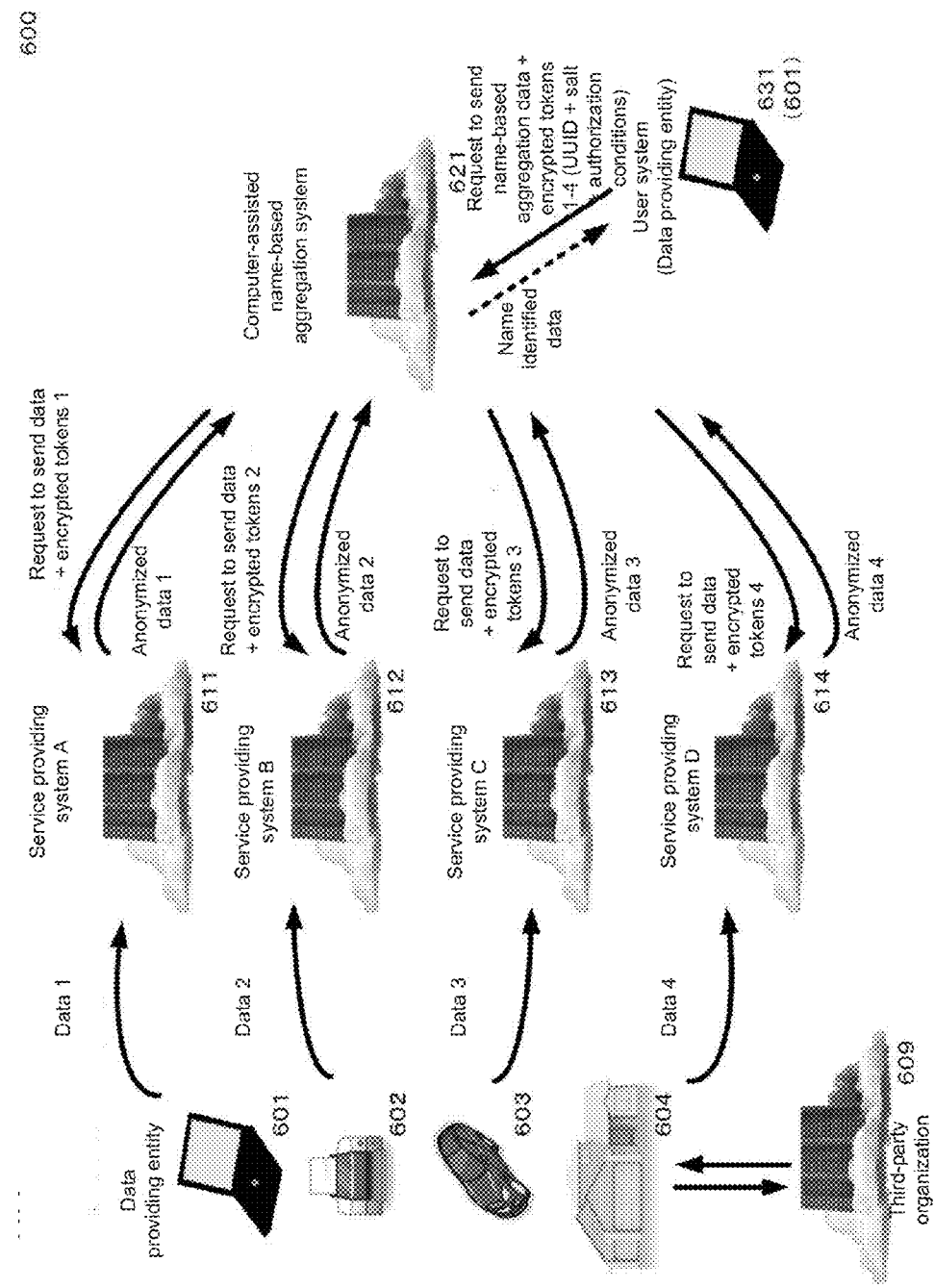
FIG. 6A is a diagram illustrating an example of name-based aggregation which is an embodiment of the present invention.
Figure 6B:
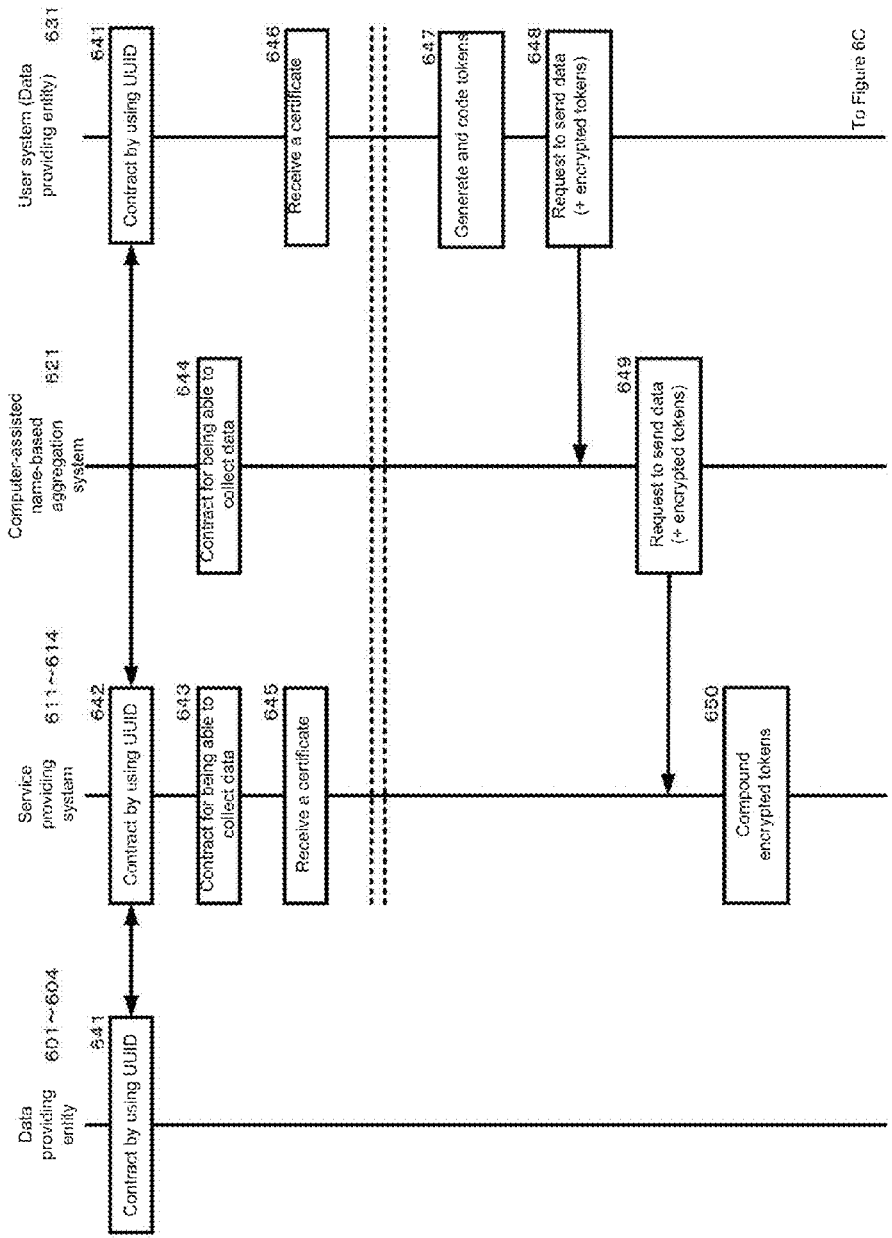
FIG. 6B is a flow chart depicting a process for implementing name-based aggregation as illustrated in FIG. 6A.
Figure 6C:
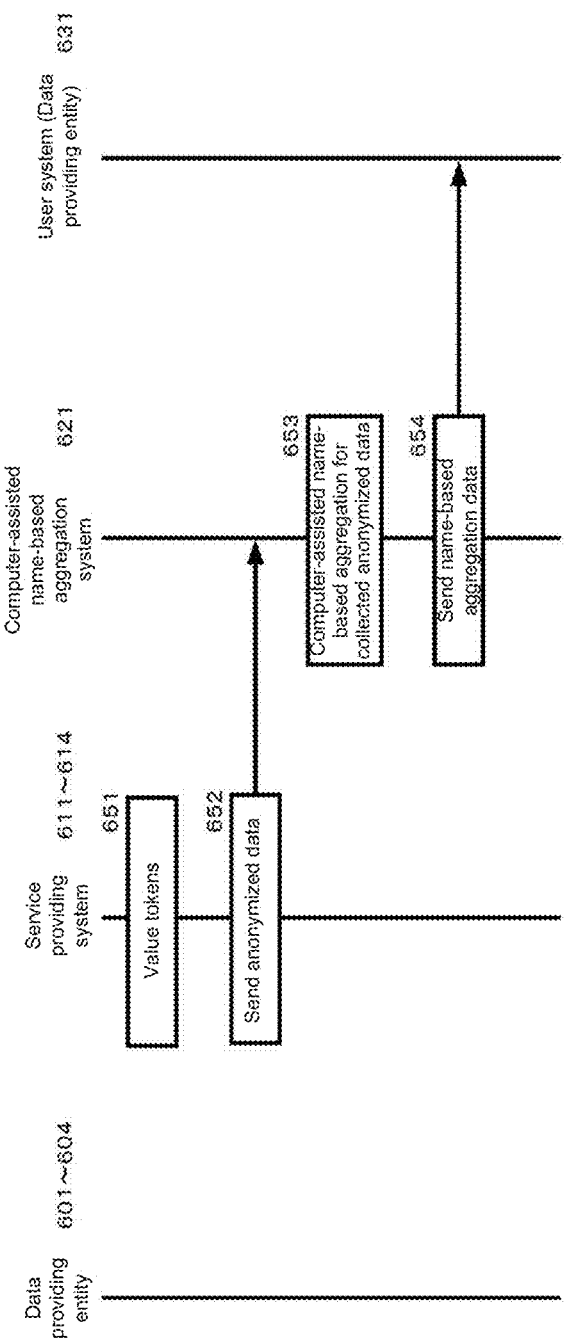
FIG. 6C is a flow chart depicting a process for implementing name-based aggregation as illustrated in FIG. 6A.

FIG. 6A is a diagram illustrating an example of name-based aggregation according to the fourth embodiment of the present invention. FIG. 6B and FIG. 6C illustrate a flow chart for performing name-based aggregation as illustrated in FIG. 6A.

A computer system (600) for performing name-based aggregation as illustrated in FIG. 6A, includes data providing entities (601 through 604), service providing systems (611 through 614), and a computer assisted name-based aggregation system (621). Furthermore, the data providing entity (601) is also a user system (631). In other words, the user system (631) is provided on the same hardware as the data providing entity (601). Furthermore, Person D owns all of the data providing entities (601 through 604).

Steps 641 through 644 correspond to steps 341 through 344 illustrated in FIG. 3B, so the description of steps 341 through 344 should be referenced for steps 641 through 644.

Furthermore, although not illustrated in FIG. 6B, a contract is entered for providing name identified data or providing aggregate data aggregating the name identified data, between the computer assisted name-based aggregation system (621) and the user system (631). A contract can be entered for allowing the computer assisted name-based aggregation system (621) to provide name identified data or aggregate data to the user system (631), and for the user system (631) to pay the manager of the computer assisted name-based aggregation system (621) compensation for providing the name identified data or aggregate data.

In step 645, the service providing systems A through D (611 through 614) request a third party organization (609) to issue a certificate used in communication with the computer assisted name-based aggregation system (621), and receive the certificate from the third party organization (609). The certificate of the service providing system A (611) has a private key of the service providing system A (611) and a public key corresponding to the private key. Each certificate for each of the service providing systems B through D (612 through 614) is the same as the certificate of the service providing system A (611).

In step 646, service providing system (611) that may also be the user system, requests a certificate from another service providing system to the third party organization (609), and receives the certificate from the third party organization (609). Each received certificate from each of the service providing systems is not a self-issued certificate, so the certificates only have a public key.

Note that either step 645 or step 646 may be performed first.

In step 647, the user system (631) (also the data providing entity (601)) requires name identified data or aggregate data aggregating the name identified data at a time scheduled by a user (for example, periodically), based on reception of a data transmission request command from the user of the user system (631), or regardless of whether a data transmission request has been received from the user. The user system (631) creates a token based on the necessity of the data. The token may include a value that changes for each transmission request requesting the data (for example, a salt), and may arbitrarily include the user approval condition. The value may be automatically created by the user system (631), or a creation request for the aforementioned value may be transmitted to the computer assisted name-based aggregation system (621), and the created value received based on the transmission request from the computer assisted name-based aggregation system (621). However, if the user system (631) creates the aforementioned value, the value is preferably unique to the user system (631) (for example, a MAC address or serial number of the user system (631)) such that a value created by another user system is not duplicated. Next, the user system (631) encrypts the token using a public key of each of the service providing systems A through D (611 through 614), and creates a set of encrypted tokens. As described above, the public key is retrieved from the certificate from each of the service providing systems (611 through 614) obtained from the third party organization (609). The user system (611) encrypts the token using the public key from each of the service providing systems A through D (611 through 614), so only the service providing system with a private key corresponding to the public key encrypting the token can decode the encrypted token. Therefore, the computer assisted name-based aggregation system (621) cannot decode the encrypted token, so the system cannot specify the aforementioned identification number within the encrypted token.

In step 648, the user system (631) transmits a transmission request for name identified data or aggregate data. Furthermore, the user system (631) transmits a set of the aforementioned encrypted tokens to the computer assisted name-based aggregation system (621), in conjunction with the transmission request.

Steps 649 through 654 correspond to steps 452 through 457 illustrated in FIG. 4D, so the description of steps 452 through 457 should be referenced for steps 649 through 654.

Figure 7A:
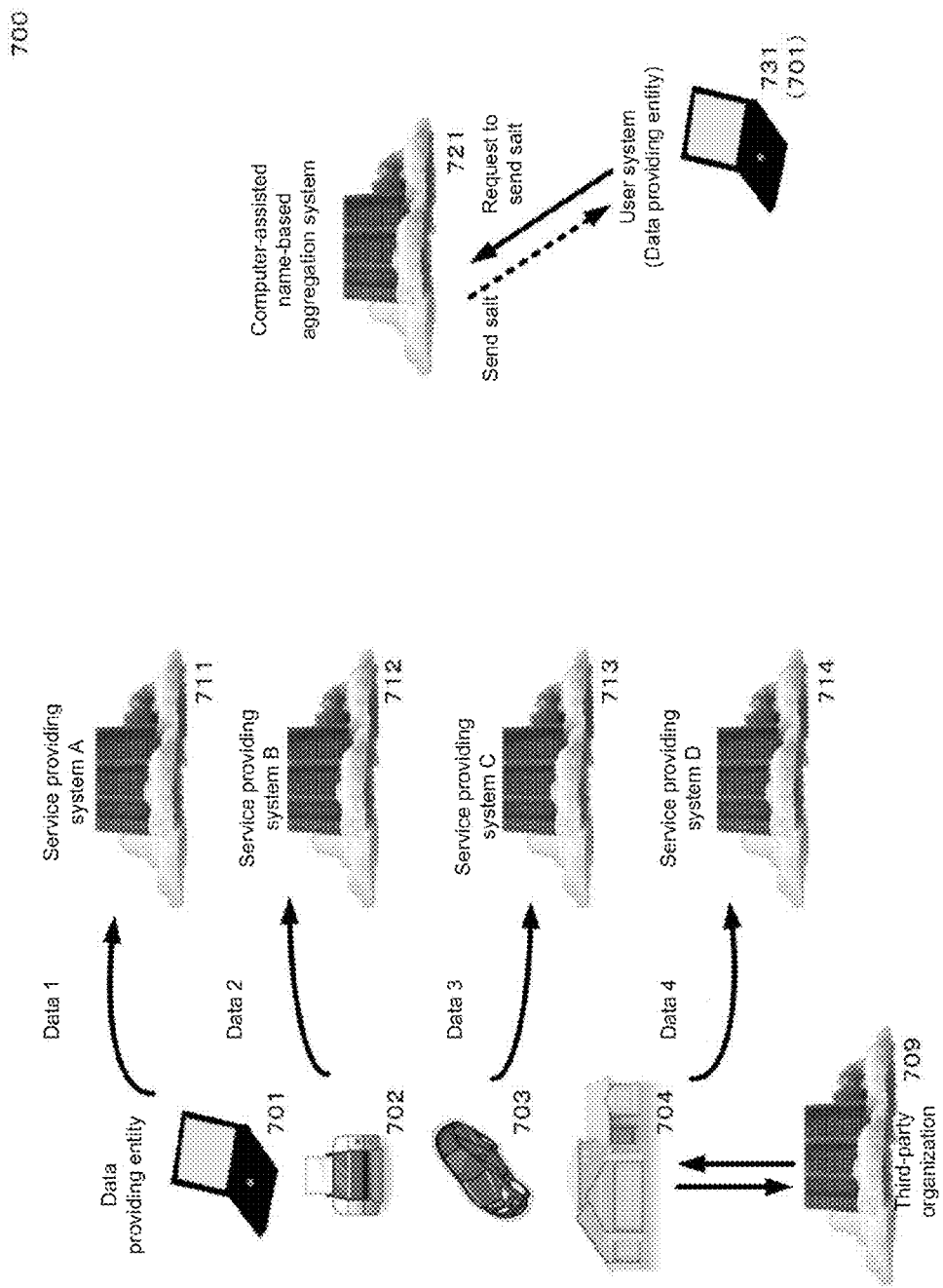
FIG. 7A is a diagram illustrating an example of name-based aggregation which is an embodiment of the present invention.
Figure 7B:
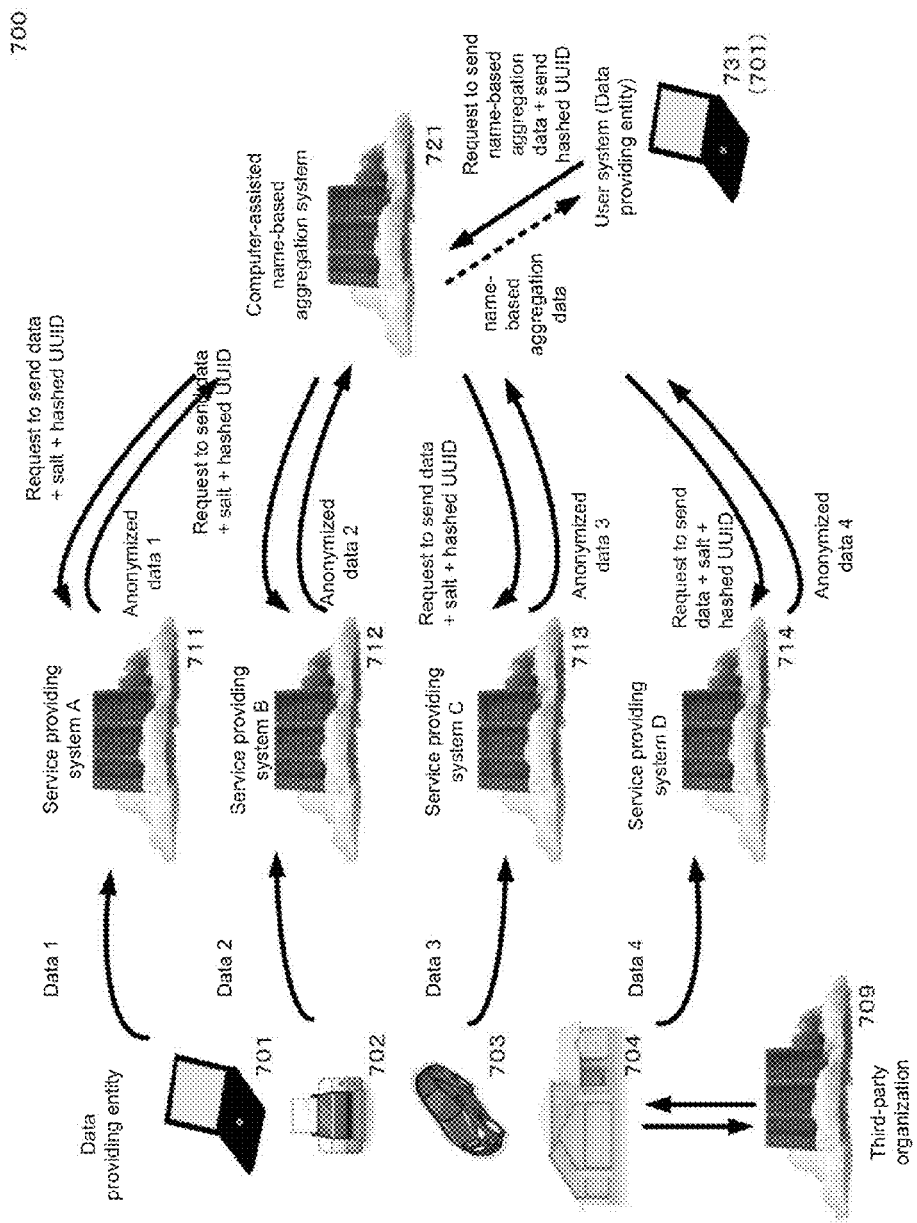
FIG. 7B is a diagram illustrating an example of name-based aggregation which is an embodiment of the present invention.
Figure 7C:
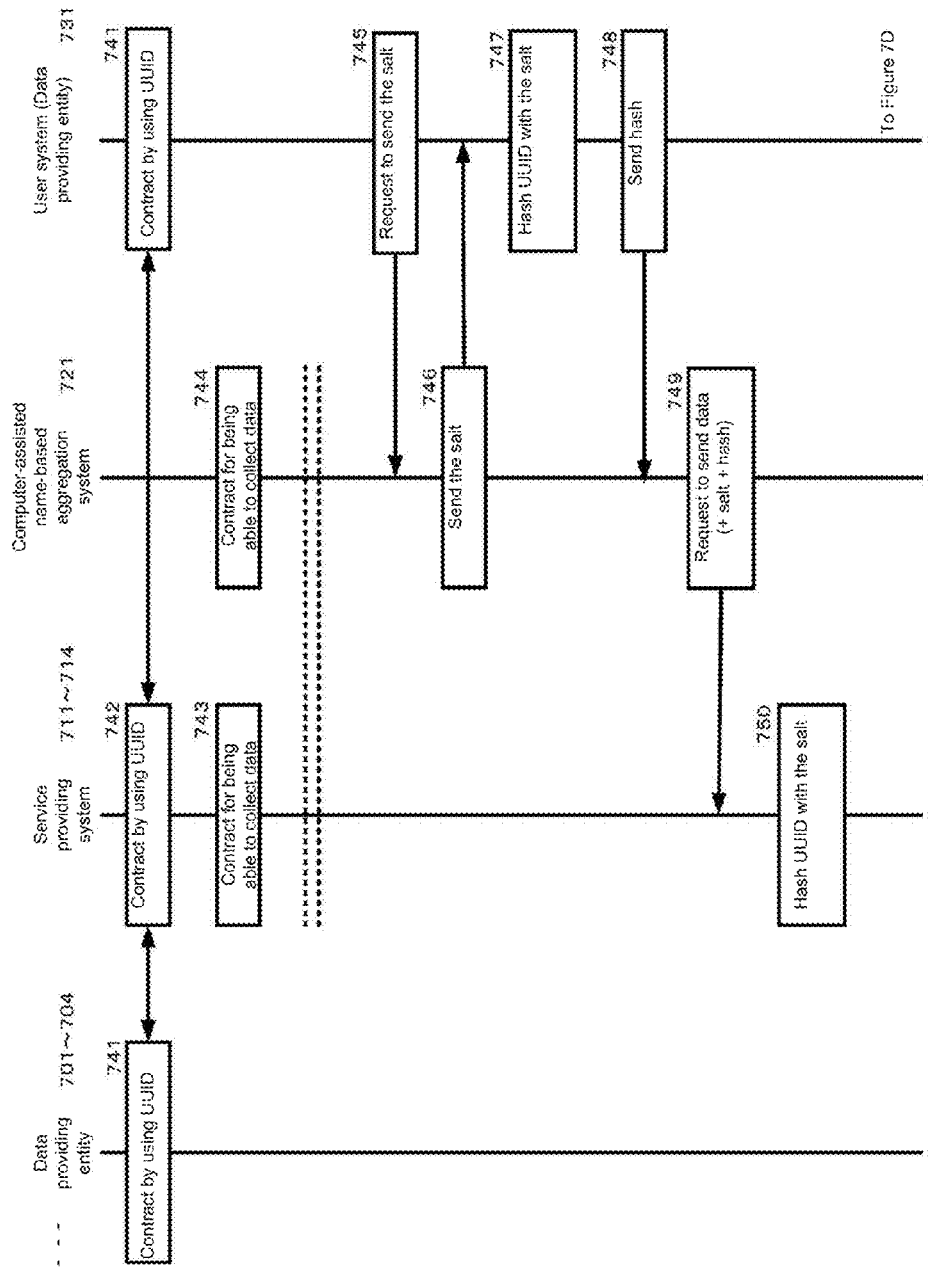
FIG. 7C is a flow chart depicting a process for implementing name-based aggregation as illustrated in FIG. 7A and FIG. 7B.
Figure 7D:
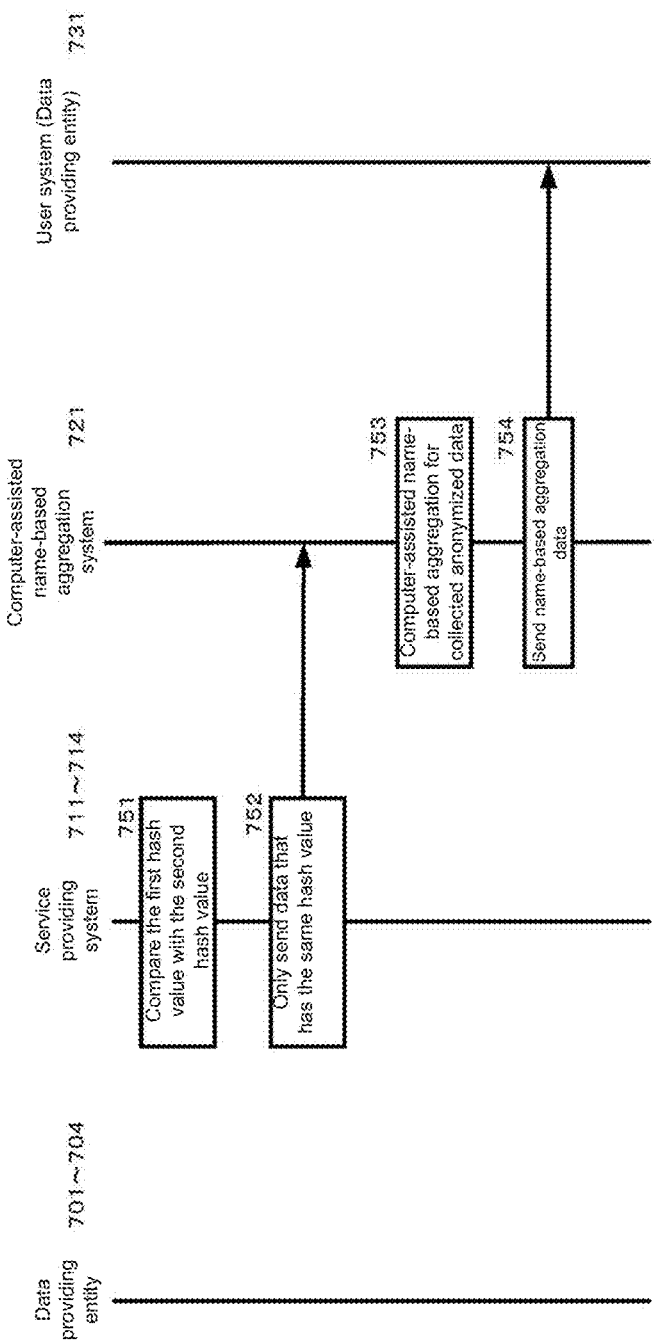
FIG. 7D is a flow chart depicting a process for implementing name-based aggregation as illustrated in FIG. 7A and FIG. 7B.

FIG. 7A and FIG. 7B are diagrams illustrating an example of name-based aggregation according to the fifth embodiment of the present invention. FIG. 7C and FIG. 7D illustrate a flow chart for performing name-based aggregation as illustrated in FIG. 7A and FIG. 7B.

A computer system (700) for performing name-based aggregation as illustrated in FIG. 7A and FIG. 7B, includes data providing entities (701 through 704), service providing systems (711 through 714), and a computer assisted name-based aggregation system (721). Furthermore, the data providing entity (701) is also a user system (731). In other words, the user system (731) is provided on the same hardware as the data providing entity (701). Furthermore, Person E owns all of the data providing entities (701 through 704).

Steps 741 through 744 correspond to steps 341 through 344 illustrated in FIG. 3B, so the description of steps 341 through 344 should be referenced for steps 741 through 744.

Furthermore, although not illustrated in FIG. 7B, a contract is entered for providing name identified data or providing aggregate data aggregating the name identified data, between the computer assisted name-based aggregation system (721) and the user system (731). A contract can be entered for allowing the computer assisted name-based aggregation system (721) to provide name identified data or aggregate data to the user system (731), and for the user system (731) to pay the manager of the computer assisted name-based aggregation system (721) compensation for providing the name identified data or aggregate data.

In step 745, the user system (731) (also the data providing entity (701)) requires name identified data or aggregate data aggregating the name identified data at a time scheduled by a user (for example, periodically), based on reception of a data transmission request command from the user of the user system (731), or regardless of whether a data transmission request has been received from the user. The user system (731) transmits a transmission request requesting transmission of a value (referred to as "value transmission request" below) that changes for each transmission request (for example, a salt) requesting the name identified data or the aggregate data, to the computer assisted name-based aggregation system (721), based on the necessity of name identified data or the aggregate data.

In step 746, the computer assisted name-based aggregation system (721) creates the value for each value transmission request, and transmits the created value to the user system (731), based on reception of the value transmission request.

In step 747, the user system (731) creates a hash value (referred to as first hash value below) based on an identification related to a user (for example UUID), or the received value, based on reception of the received value.

In step 748, the user system (731) transmits the aforementioned first hash value to the computer assisted name-based aggregation system (721).

In step 749, the computer assisted name-based aggregation system (721) transmits the transmission request requesting data transmission to each of the service providing systems (711 through 714), based on reception of the first hash value. Furthermore, the computer assisted name-based aggregation system (721) transmits the aforementioned value transmitted to the user system (731) in step 746, and the aforementioned first hash value to each of the service providing systems (711 through 714), in conjunction with the transmission request.

In step 750, each of the service providing systems (711 through 714) creates a hash value (referred to as second hash value below) based on an identification number related to a user provided by the service providing systems (711 through 714), and on the received value. The service providing systems (711 through 714) perform hashing by using the same hashing algorithm. In other words, the hashing algorithm for creating the first hash value, and the hashing algorithm for creating the second algorithm are the same. The service providing systems (711 through 714) receive the identification number related to the aforementioned user E as an attribute or key of the data, when receiving the data related to user E from each of the data providing entities (701 through 704). The service providing systems (711 through 714) may store or control the received data with the identification number as the key.

In step 751, the service providing systems (711 through 714) compare the first hash value and the second hash value. The service providing systems (711 through 714) transmit the anonymized data with an identification number used when creating the second hash value to the computer assisted name-based aggregation system (721), based on matching of the first hash value and the second hash value.

Steps 753 through 754 correspond to steps 456 through 457 illustrated in FIG. 4D, so the description of steps 456 through 457 should be referenced for steps 753 through 754.

FIG. 8A through FIG. 12C illustrate a flow chart summarizing the steps for various situations that are performed for acquiring name identified data, according to an embodiment of the present invention.

Figure 8A:
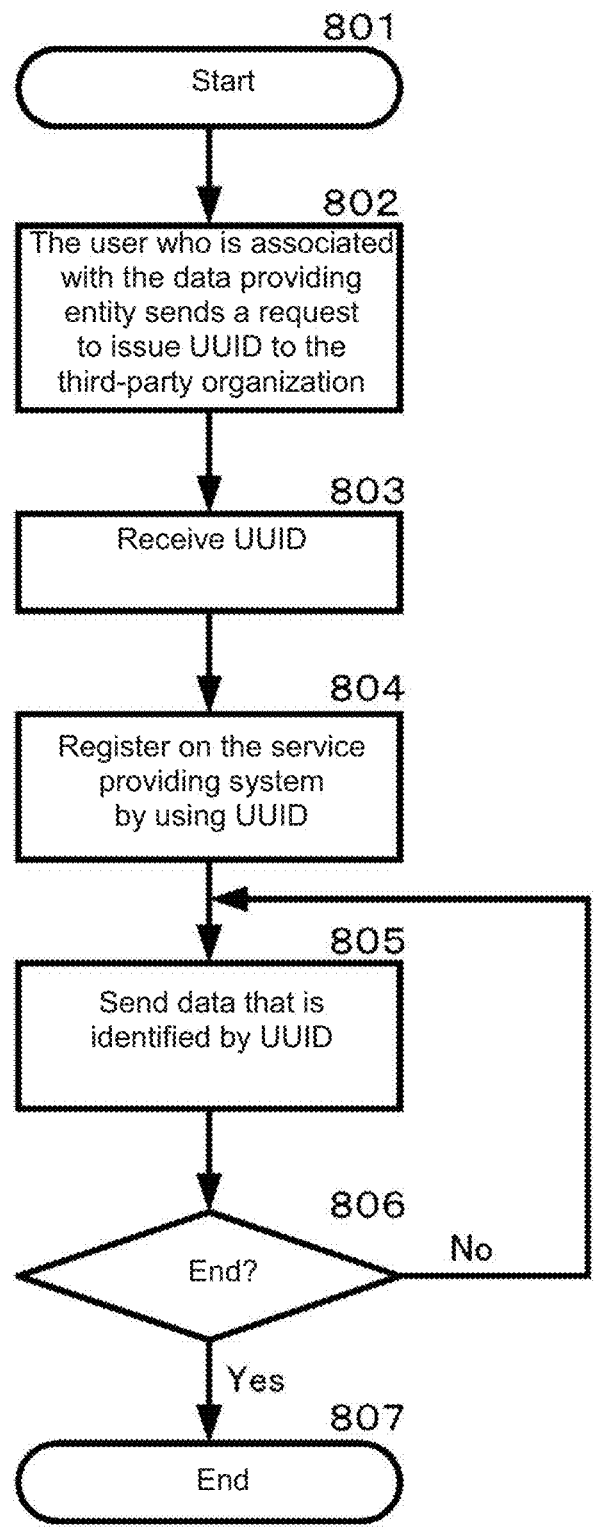
FIG. 8A illustrates a flow chart for a process that enables a user related to the data providing entity to acquire an identification number (for example, UUID), and enables the data providing entity to transmit the anonymized data specified by the identification number to each service providing system, according to an embodiment of the present invention.

FIG. 8A illustrates a flow chart for a process that enables a user related to the data providing entity to acquire an identification number (for example, UUID), and enables the data providing entity to transmit the data specified by the identification number to each service providing system, according to an embodiment of the present invention. In describing the flow chart, the data providing entities (201 through 204), the service providing systems A through D (211 through 214), the computer assisted name-based aggregation system (221), the user system (231) (the above are included in the computer system (200)), and the third party organization (209) in FIG. 2A are used for descriptive purposes.

In step 801, the data providing entity (201) from the data providing entities (201 through 204) begin the aforementioned process for example.

In step 802, the data providing entity (201) transmits an issue request for an identification number (for example, UUID) for solely identifying a user (Person A) related to the data providing systems (201 through 204), to the third party organization (209).

In step 803, the data providing entity (201) receives the aforementioned identification number from the third party organization (209).

In step 804, the data providing entity (201) uses the received identification number, and registers the service providing system that transmits the data, and the identification number to each of the service providing systems A through D (211 through 214). In the registration, the data providing entity (201) and the identification number are registered in service providing system A (211). Similarly, the data providing entity (202) and the identification number are registered in service providing system B (212). Similarly, the data providing entity (203) and the identification number are registered in service providing system C (213). Similarly, the data providing entity (204) and the identification number are registered in service providing system D (214).

Each process in steps 802 and 803 registers that the data providing entities provide data to the service providing systems, and may be performed by a data providing entity that executes an application (such as a registration agent) installed in the data providing entity, for example.

In step 805, the data providing entities (201 through 204) transmit data 1 through 4 (related to the identification number) to each of the service providing systems A through D (211 through 214) at arbitrary timing (for example, based on completion of the contract). Transmission of the data 1 through 4 is not required to be performed simultaneously, and may be performed separately at an arbitrary time. Alternatively, the data providing entities (201 through 204) transmit the data 1 through 4, based on data transmission request from each of the service providing systems A through D (211 through 214). In other words, the data 1 through 4 is collected by each of the service providing systems A through D (211 through 214).

In step 806, the data providing entities (201 through 204) determine whether data transmission to each of the service providing systems A through D (211 through 214) is complete. Based on the completion of transmission, the data providing entities (201 through 204) complete the process and proceed to step 807. If the transmission is not completed, the data providing entities (201 through 204) return to step 805.

In step 807, the data providing entities (201 through 204) complete the aforementioned process.

FIG. 8B illustrates a flow chart of a process for executing a data collection contract between each service providing system and each computer assisted name-based aggregation system, and for determining the data providing mode, according to an embodiment of the present invention.

In step 811, the aforementioned process starts by acquiring a certificate indicated below.

In step 812, the service providing systems (211 through 214) may acquire a self-issued certificate of the service providing system by requesting to the third party organization (209), for example. The self-issued certificate of the service providing system contains a pair including a public key and a private key corresponding to the public key. The public key and the private key are used in data encrypting and decoding. Therefore, if the data is not encrypted, step 812 may be omitted.

In step 813, a data providing contract is entered between the service providing systems (211 through 214) and the computer assisted name-based aggregation system (221).

In step 814, the computer assisted name-based aggregation system (221) may acquire the certificate of each service providing system (211 through 214) by requesting to the third party organization (209) for example. The certificate contains a public key (in other words, there is no private key). The certificate is used in data encryption. Therefore, if the data is not encrypted, step 814 may be omitted.

In step 815, the computer assisted name-based aggregation system (221) determines whether instruction from a user acquiring the name identified data or the aggregate data from the computer assisted name-based aggregation system (221), or a data providing contract with the user is interactive data acquisition. Interactive data acquisition refers to acquiring data provided to the user from the service providing systems (211 through 214) by the computer assisted name-based aggregation system (221) based on reception of a data transmission request from the user system (231) (for example, refer to the flow chart of FIG. 3C). Based on interactive data acquisition, the computer assisted name-based aggregation system (221) proceeds to step 815. On the other hand, if interactive data is not acquired (in other words, asynchronous data acquisition), the computer assisted name-based aggregation system (221) proceeds to step 817. Asynchronous data acquisition refers to a condition where the computer assisted name-based aggregation system (221) acquires data provided to the user system (231) from the service providing systems (211 through 214) regardless of whether a data transmission request has been received from the user system (231), for example, at a scheduled time (periodically) (refer to the flow chart of FIG. 3B). The computer assisted name-based aggregation system (221) enables selection of whether to perform services by interactive data acquisition, or to perform services by asynchronous data acquisition, when entering the data providing contract with the aforementioned user, or enables selection of whether to perform services by interactive data acquisition, or to perform services by asynchronous data acquisition for each type or content of provided data.

In step 816, the computer assisted name-based aggregation system (221) waits for the next instruction while in interactive data acquisition mode (step 816).

In step 817, the computer assisted name-based aggregation system (221) creates a time schedule for data acquisition from each of the service providing systems (211 through 214) if not interactive data acquisition. The data acquisition time may be appropriately set based on type or content of the provided data such as every 24 hours or every week.

In step 818, the computer assisted name-based aggregation system (221) waits for the next instruction while in asynchronous data acquisition mode (step 818).

In step 819, the aforementioned process is completed.

The aforementioned flow chart describes an embodiment where the computer assisted name-based aggregation system (221) waits for the next instruction while in either interactive data acquisition mode, or asynchronous data acquisition mode, based on whether or not interactive data acquisition was selected in step 815. As an alternative embodiment according to the present invention, the computer assisted name-based aggregation system (221) may also wait for the next instruction in both interactive data acquisition mode and asynchronous data acquisition mode.

FIG. 9A illustrates a flow chart of a process for acquiring name identified data, according to an embodiment of the present invention. In describing the flow chart, the data providing entities (201 through 204), the service providing systems A through D (211 through 214), the computer assisted name-based aggregation system (221), the user system (231) (the above are included in the computer system (200)), and the third party organization (209) in FIG. 2A are used for descriptive purposes.

In step 901, the user system (231) or the computer assisted name-based aggregation system (221) start the aforementioned process of acquiring the name identified data.

In step 902, the user system (231) may determine whether the data acquisition request is requesting interactive data acquisition. Because a user can select whether a data acquisition request is made by interactive data acquisition, the user system (231) can also determine whether the data acquisition request is requesting interactive data acquisition. Alternatively, the request menu of the user system (231) changes based on whether or not interactive data acquisition is used, and the user system (231) can also determine whether the data acquisition request is requesting interactive data acquisition. Furthermore, the user system (231) may notify the computer assisted name-based aggregation system (221) of whether or not the data acquisition request is for interactive data acquisition. If the acquisition request is requesting interactive data acquisition, the user system (231) proceeds to step 904. On the other hand, if the acquisition request is not requesting interactive data acquisition, the user system (231) proceeds to step 903. Alternatively, in step 902, the computer assisted name-based aggregation system (221) may determine whether the acquisition request is requesting interactive data acquisition. Whether the acquisition request is requesting interactive data acquisition may be determined by referring to agreement items in the data providing contract between the computer assisted name-based aggregation system (221) and the user system (231). The agreement items may include the data of whether or not the data acquisition request is for interactive data acquisition. The acquisition request may also be a transmission request where the user system (231) requests transmission of name identified data or aggregate data to the computer assisted name-based aggregation system (221). If the acquisition request is requesting interactive data acquisition, the computer assisted name-based aggregation system (221) proceeds to step 904. On the other hand, if the acquisition request is not requesting interactive data acquisition, the computer assisted name-based aggregation system (221) proceeds to step 903.

In step 903, the user system (231) may also determine whether or not the user system is a data provider (in other words, a data providing entity). Because the user system (231) enables a user to select whether the user is a data provider, the user system (231) can also determine whether the user system is a data provider. Alternatively, the request menu of the user system (231) changes based on whether or not the user system is a data provider, and the user system (231) can also determine whether the user system is a data provider. The user system (231) proceeds to step 904 if the user system is a data providing entity. On the other hand, the user system (231) completes the process and proceeds to step 915 if the user system is not a data providing entity. Alternatively, in step 903, the computer assisted name-based aggregation system (221) determines whether the acquisition request is requesting asynchronous data acquisition. The acquisition request may also follow the schedule set in step 817 of FIG. 8B for example. If the acquisition request is requesting asynchronous data acquisition, the computer assisted name-based aggregation system (221) proceeds to step 904. On the other hand, if the acquisition request is not requesting asynchronous data acquisition, the computer assisted name-based aggregation system (221) completes the process and proceeds to step 915.

In step 904, the computer assisted name-based aggregation system (221) creates a value that is valid only for the transmission request of the data (for example, a salt).

In step 905, the computer assisted name-based aggregation system (221) transmits the data request to a part of a service providing system from the plurality of service providing systems, to a specific group of service providing systems, or to all service providing systems that have entered a contract related to providing data with the computer assisted name-based aggregation system (221). Furthermore, the computer assisted name-based aggregation system (221) transmits the aforementioned value to the service providing system, in conjunction with the transmission request.

In step 906, the service providing systems specify the data satisfying the user conditions, and anonymize the specified data for example. Next, the service providing systems create a hash value based on the identification number for controlling the data, and on the aforementioned value. For example, the service providing systems hash the identification number using the aforementioned value. Note that the service providing systems include the same hashing algorithm.

In step 907, the service providing systems transmit the anonymized data and the hash value to the computer assisted name-based aggregation system (221).

[201] In step 908, the computer assisted name-based aggregation system (221) identifies the name of the anonymized data specified by the hash value from the anonymized data received from the service providing systems, and acquires name identified data.

In step 909, the computer assisted name-based aggregation system (221) determines whether the data transmission request from the user system (231) is a transmission request for aggregate data further aggregating the name identified data. The computer assisted name-based aggregation system (221) proceeds to step 911 if the transmission request is not for aggregate data. The computer assisted name-based aggregation system (221) proceeds to step 911 if the transmission request is for aggregate data.

In step 910, the computer assisted name-based aggregation system (221) determines whether the transmission request for the aforementioned data is for a interactive data acquisition, if the transmission request for the data is not an aggregate data transmission request. The computer assisted name-based aggregation system (221) proceeds to step 912 if the transmission request of the data is requesting interactive data acquisition. On the other hand, the computer assisted name-based aggregation system (221) proceeds to step 913 if the transmission request is not requesting interactive data acquisition.

In step 911, the computer assisted name-based aggregation system (221) aggregates the name identified data in accordance with a predetermined method if the transmission request is a transmission request for aggregate data.

In step 912, the computer assisted name-based aggregation system (221) notifies the user system (231) that the name identified data has been created if the transmission request is for interactive data acquisition, and transmits the name identified data or the aggregate data based on the data transmission request from the user system.

In step 913, the computer assisted name-based aggregation system (221) stores the name identified data or the aggregate data on a recording medium that can be accessed by the computer assisted name-based aggregation system (221), if interactive data acquisition is not requested.

In step 914, the computer assisted name-based aggregation system (221) transmits the name identified data or the aggregate data stored on the aforementioned recording medium at arbitrary timing (for example, based on reception of the data transmission request from the user system (221)). Furthermore, the user system (221) receives the transmitted name identified or the aggregate data asynchronous to the computer assisted name-based aggregation system (221) receiving from the service providing systems.

In step 915, the computer assisted name-based aggregation system (221) completes the aforementioned process.

Figure 10A:
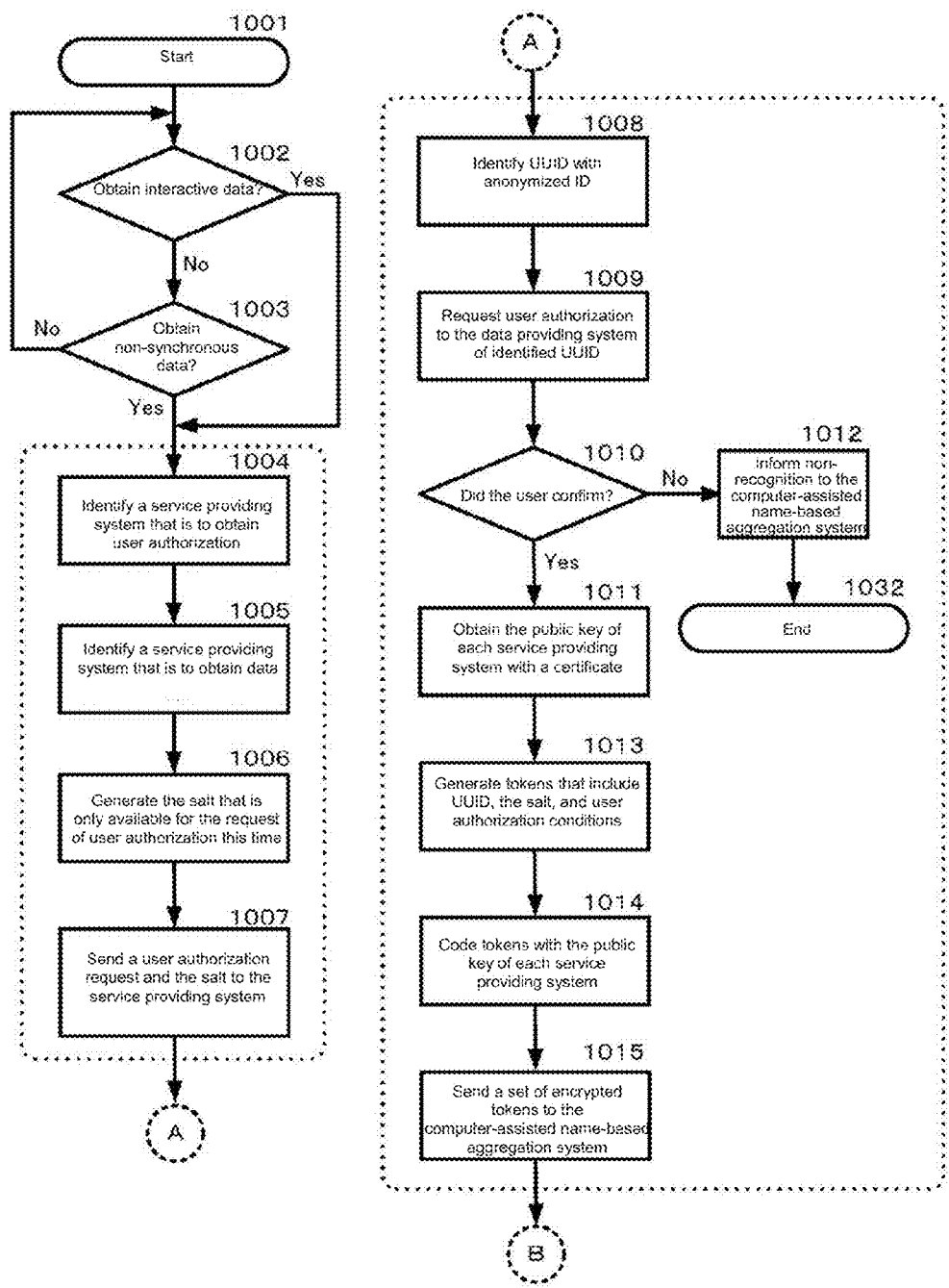
FIG. 10A illustrates a flow chart of a process for acquiring name identified data, according to an embodiment of the present invention.
Figure 10B:
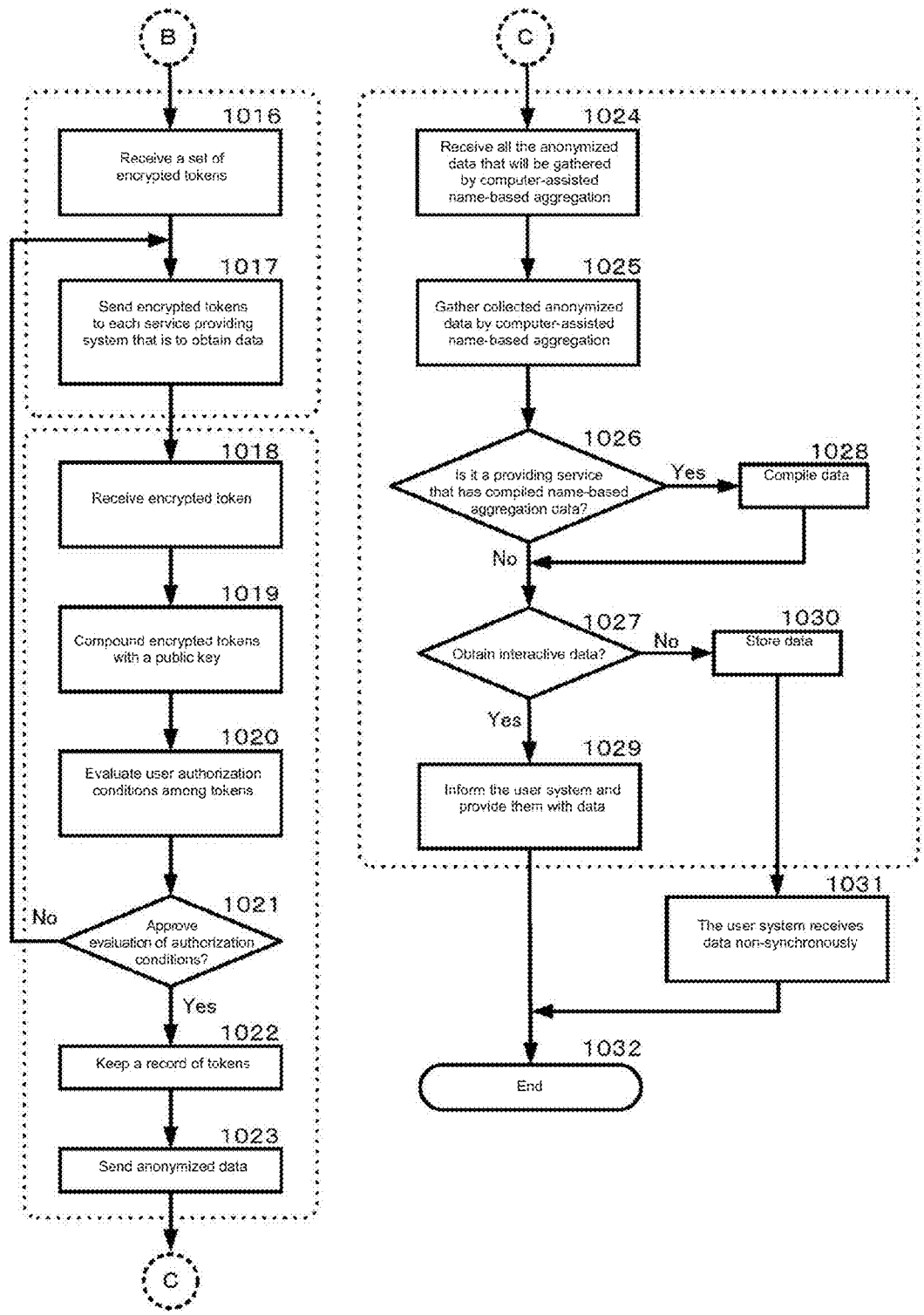
FIG. 10B illustrates a flow chart of a process for acquiring name identified data, according to an embodiment of the present invention.

FIG. 10A and FIG. 10B illustrate a flow chart of a process for acquiring name identified data, according to an embodiment of the present invention. The flow chart includes similar or duplicate steps as the first embodiment illustrated in FIG. 3A through FIG. 3C, the second embodiment illustrated in FIG. 4A through FIG. 4D, and the fifth embodiment illustrated in FIG. 7A through FIG. 7D, but it should be noted that the flow chart does not include all steps described in the first, second, and fifth embodiments, nor exclude each step described in the first, second, or fifth embodiments. Furthermore, in describing the flow chart, the data providing entities (201 through 204), the service providing systems A through D (211 through 214), the computer assisted name-based aggregation system (221), the user system (231) (the above are included in the computer system (200)), and the third party organization (209) in FIG. 2A are used for descriptive purposes.

In step 1001, the computer assisted name-based aggregation system (221) starts the aforementioned processing of acquiring name identified data.

Figure 9:
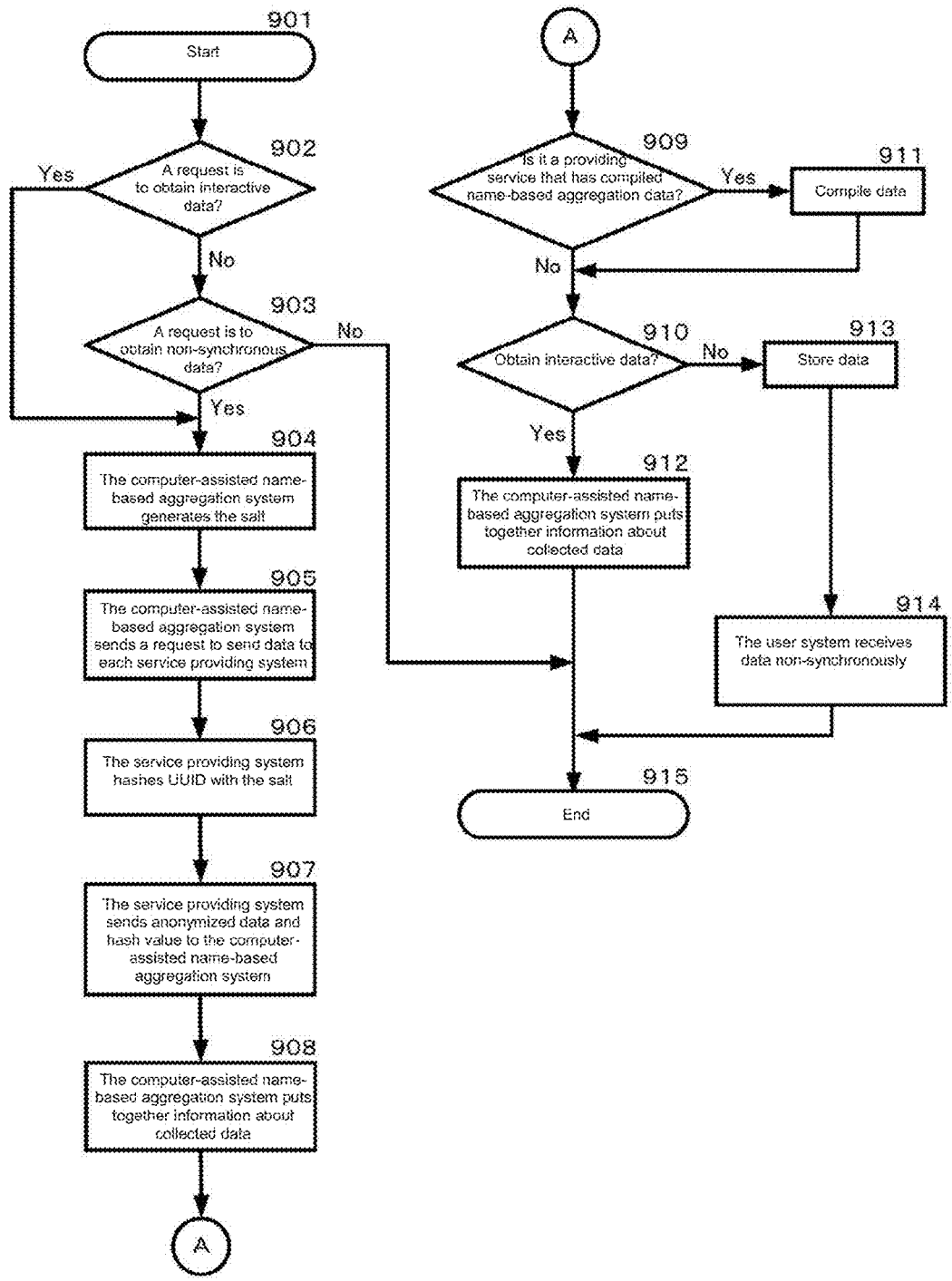
FIG. 9 illustrates a flow chart of a process for acquiring name identified data, according to an embodiment of the present invention.

Steps 1002 to 1003 corresponds to steps 902 to 903 illustrated in FIG. 9, so the description of steps 902 to 903 should be referenced for steps 1002 to 1003.

In step 1004, the computer assisted name-based aggregation system (221) specifies a service providing system that can process the user approval request (in other words, a service providing system for obtaining user approval), from the plurality of service providing systems A through D (211 through 214). A service providing system that can process the user approval request can be specified by the computer assisted name-based aggregation system (221) and the service providing systems agreeing as to which system should process the user approval request from the plurality of service providing systems A through D (211 through 214). Note that for descriptive purposes when describing the flow chart, service providing system A (211) is the system that can process the user approval request.

In step 1005, the computer assisted name-based aggregation system (221) may specify the service providing system that may provide anonymized data for name-based aggregation, from the plurality of service providing systems A through D (211 through 214). The service providing system that may provide the anonymized data for name-based aggregation may be specified by the computer assisted name-based aggregation system (221) and the service providing system for example agreeing as to which system should provide the anonymized data from the plurality of service providing systems A through D (211 through 214). Note that for descriptive purposes when describing the flow chart, all of the service providing systems A through D (211 through 214) are systems that can process the user approval request.

In step 1006, the computer assisted name-based aggregation system (221) creates a value (for example, a salt) that is valid only for the user approval in step 1004 (in other words, the present user approval). The value is created to be a value that changes for each different user approval request.

In step 1007, the computer assisted name-based aggregation system (221) transmits the user approval request and the aforementioned value, as well as an encrypted identification number (for example, UUID) related to the user requesting the user approval request, to service providing system A (211) specified in step 1004. Furthermore, the computer assisted name-based aggregation system (221) may arbitrarily transmit a certificate (including a public key only) of the service providing system that may provide anonymized data for name-based aggregation to service providing system A (211) together with the user approval request, the aforementioned value, and the aforementioned encrypted identification number (anonymized ID). Note that for descriptive purposes while describing the flow chart, the data providing entity (201) is the system related to the user that determines whether to approve the user approval request.

Figure 14:
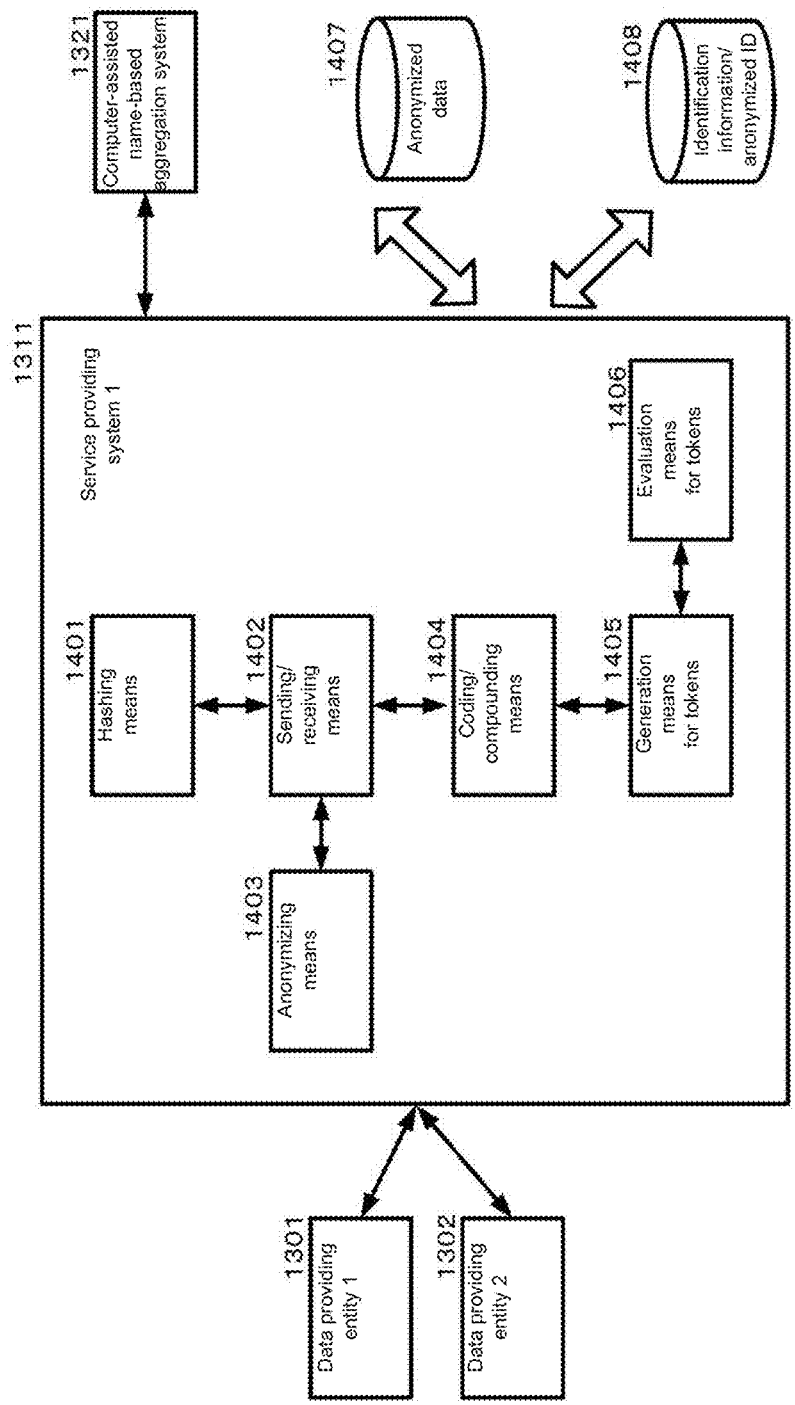
FIG. 14 is a diagram illustrating an example of a functional block diagram of a service providing system according to an embodiment of the present invention, preferably having a hardware configuration in accordance with FIG. 1.

In step 1008, service providing system A (211) uses a mapping table (refer to recording means (1408) of FIG. 14)

of the identification number and the encrypted identification number, and specifies the original, non-encrypted identification number based on the aforementioned encrypted identification number.

In step 1009, service providing system A (211) transmits the user approval request of step 1007 to the data providing entity (201) controlling the identification number specified in step 1008. The data providing entity (201) displays the contents of the user approval request on a screen, for example, to the user of the data providing entity (201) (referred to as data provider below), based on reception of the user approval request. Furthermore, the data providing entity (201) may display on a screen the user interface that enables the data provider to add approval conditions other than those which are displayed, or to correct the approval conditions. The data providing entity (201) transmits result data showing whether or not the data provider approved the aforementioned user approval request, to service providing system A (211).

In step 1010, service providing system A (211) determines whether the result data shows that the user approval request has been approved. Service providing system A (211) proceeds to step 1011 if the result data indicates approval. On the other hand, service providing system A (211) proceeds to step 1012 if the result data does not indicate approval.

In step 1011, service providing system A (211) acquires a public key of each service providing system from the certificate of each service providing system received in step 1007, or in the certificate of each service providing system acquired from the third party organization (209).

In step 1012, service providing system A (211) transmits a notification that approval was not obtained to the computer assisted name-based aggregation system (221), based on the whether or not approval has been obtained. Service providing system A (211) proceeds to step 1032 based on transmission of the notification.

In step 1013, service providing system A (211) creates a token with the identification number specified in step 1008, the received value, and the approval condition.

In step 1014, service providing system A (211) encrypts the token created in step 1013, using the public keys of the service providing systems acquired in step 1011, and creates a set of encrypted tokens.

In step 1015, service providing system A (211) transmits the set of encrypted tokens to the computer assisted name-based aggregation system (221).

In step 1016, the computer assisted name-based aggregation system (221) receives the set of encrypted tokens.

In step 1017, the computer assisted name-based aggregation system (221) transmits one encrypted token from the set of encrypted tokens to the service providing systems specified in step 1005. The computer assisted name-based aggregation system (221) may determine whether to read the information of KEY=VALUE from a pair such as (a subject service providing system):(subject token) from the encrypted token for example, and to transmit the encrypted token to the service providing systems.

In step 1018, the service providing systems A through D (211 through 214) each receive the one encrypted token transmitted in step 1017.

In step 1019, the service providing systems A through D (211 through 214) decodes the encrypted token using the private key of that service providing system.

In step 1020, the service providing systems A through D (211 through 214) evaluate the user approval conditions in the encrypted token.

In step 1021, the service providing systems A through D (211 through 214) proceed to step 1022 if the results of evaluating the user approval conditions are that approval is possible. In the other hand, the service providing systems A through D (211 through 214) proceed to step 1017 if the results of evaluating the user approval conditions are that approval is not possible.

In step 1022, the service providing systems A through D (211 through 214) store the token decoded in step 1019 on a recording medium that can be accessed by the service providing systems A through D (211 through 214). The token is stored for use in subsequent evaluations of the user approval conditions.

In step 1023, the service providing systems A through D (211 through 214) transmit anonymized data related to the identification number in the decoded token to the computer assisted name-based aggregation system (221).

In step 1024, the computer assisted name-based aggregation system (221) receives the anonymized data from each of the service providing systems A through D (211 through 214).

In step 1025, the computer assisted name-based aggregation system (221) identifies the name of the anonymized data specified by the token from the received anonymized data, and acquires name identified data.

Steps 1026 to 1031 corresponds to steps 909 to 914 illustrated in FIG. 9, so the description of steps 909 to 914 should be referenced for steps 1026 to 1031.

Figure 11B:
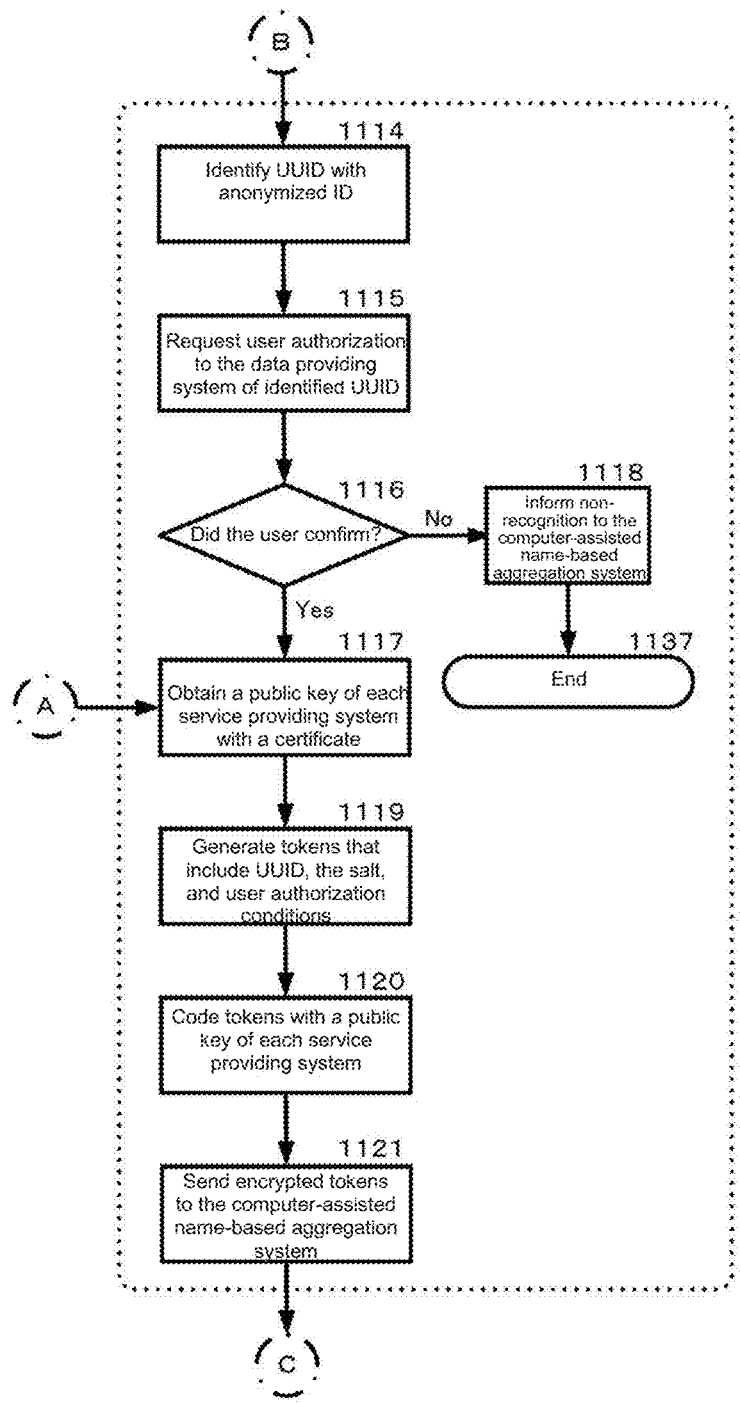
FIG. 11B illustrates a flow chart of a process for acquiring name identified data, according to an embodiment of the present invention.
Figure 11C:
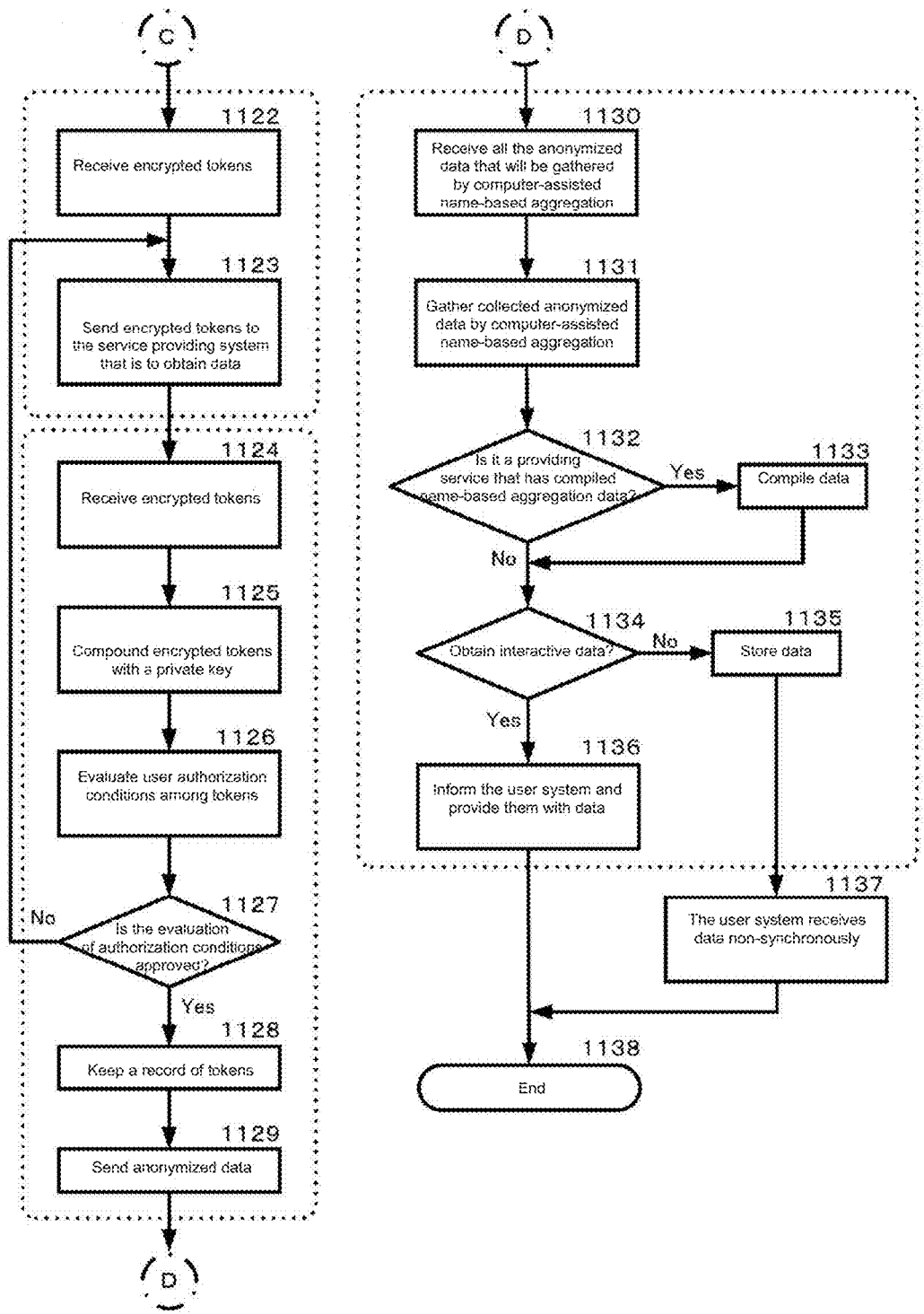
FIG. 11C illustrates a flow chart of a process for acquiring name identified data, according to an embodiment of the present invention.

FIG. 11A through FIG. 11C illustrate a flow chart of a process for acquiring name identified data, according to an embodiment of the present invention. The flow chart includes similar or duplicate steps as the third embodiment illustrated in FIG. 5A through FIG. 5D, but it should be noted that the flow chart does not include all steps described in the third embodiment, nor exclude each step described in the third embodiments. Furthermore, in describing the flow chart, the data providing entities (501 through 504), the service providing systems A through D (511 through 514), the computer assisted name-based aggregation system (521), the user system (531) (the above are included in the computer system (500)), and the third party organization (509) in FIG. 5A are used for descriptive purposes.

In step 1101, the user system (531) or the computer assisted name-based aggregation system (521) start the aforementioned process of acquiring the name identified data.

In step 1102, the user system (531) may determine whether the data acquisition request is requesting interactive data acquisition. Because a user can select whether a data acquisition request is made by interactive data acquisition, the user system (531) can also determine whether the data acquisition request is requesting interactive data acquisition. Alternatively, the request menu of the user system (531) changes based on whether or not interactive data acquisition is used, and the user system (531) can also determine whether the data acquisition request is requesting interactive data acquisition. Furthermore, the user system (531) may notify the computer assisted name-based aggregation system (521) of whether or not the data acquisition request is for interactive data acquisition. If the acquisition request is requesting interactive data acquisition, the user system (531) proceeds to step 1103. On the other hand, if the aforementioned acquisition request is requesting interactive data acquisition, the user system (531) proceeds to step 903 shown in FIG. 9, or to step 1003 shown in FIG. 10A. Alternatively, in step 1102, the computer assisted name-based aggregation system (521) may determine whether the acquisition request is requesting interactive data acquisition. Whether the acquisition request is requesting interactive data acquisition may be determined by referring to agreement items in the data providing contract between the computer assisted name-based aggregation system (521) and the user system (531). The agreement items may include the data of whether or not the data acquisition request is for interactive data acquisition. The acquisition request may also be a transmission request where the user system (531) requests transmission of name identified data or aggregate data to the computer assisted name-based aggregation system (521). If the acquisition request is requesting interactive data acquisition, the computer assisted name-based aggregation system (521) proceeds to step 1103. On the other hand, if the aforementioned acquisition request is requesting interactive data acquisition, the computer assisted name-based aggregation system (521) proceeds to step 903 shown in FIG. 9, or to step 1003 shown in FIG. 10A.

In step 1103, the user system (531) may also determine whether or not the user system is a data provider (in other words, a data providing entity). Because the user system (531) enables a user to select whether the user is a data provider, the user system (531) can also determine whether the user system is a data provider. Alternatively, the request menu of the user system (531) changes based on whether or not the user system is a data provider, and the user system (531) can also determine whether the user system is a data provider. The user system (531) proceeds to step 1104 if the user system is a data providing entity. On the other hand, the user system (531) and proceeds to step 1109 if the user system is not a data providing entity. Alternatively, in step 1103, the computer assisted name-based aggregation system (521) may determine whether the user system (531) is the same as the data providing entity. If the user system (531) and the data providing entity are the same, the computer assisted name-based aggregation system (521) proceeds to step 1104. On the other hand, the computer assisted name-based aggregation system (521) proceeds to step 1109 if the user system (531) and the data providing entity are not the same.

In step 1104, the user system (531) queries the anonymized ID to service providing system A (511) related to the identification number (also for controlling data) of that user system (531), if the user system (531) and the data providing entity are the same. Service providing system A (511) returns the anonymized ID to the user system (531) based on the query. The user system (531) receives the anonymized ID from service providing system A (511).

In step 1105, the user system (531) specifies the computer assisted name-based aggregation system requesting transmission of name identified data or collected data. As an example, the computer assisted name-based aggregation system illustrated in FIG. 5A is specified. The user system (531) transmits the anonymized identification number and the user approval condition to the computer assisted name-based aggregation system (521), and arbitrarily transmits information specifying service providing system A (511) to the computer assisted name-based aggregation system (521).

In step 1106, the computer assisted name-based aggregation system (521) specifies a service providing system that can process the user approval request, from the plurality of service providing systems A through D (511 through 514). Note that for descriptive purposes when describing the flow chart, service providing system A (511) is the system that can process the user approval request.

In step 1107, the computer assisted name-based aggregation system (521) creates a value that is valid only for the creation request of the present token (for example, a salt). The value is created to be a value that changes for each token creation request.

In step 1108, the computer assisted name-based aggregation system (521) transmits the value created in step 1107 as well as the anonymized identification number, and arbitrarily transmits the user approval condition, arbitrarily transmits a certificate (including only a public key) of the service providing system subject to anonymized data acquisition from the plurality of service providing systems, and arbitrarily transmits a unique ID related to the computer assisted name-based aggregation system (521) (for example, a MAC address or serial number of the computer assisted name-based aggregation system (521)), in conjunction with the creation request of the token.

In step 1109, the user system (531) transmits the transmission request where the user system (531) requests transmission of the name identified data to the computer assisted name-based aggregation system (521), to the computer assisted name-based aggregation system (521), for the collected data, if the user system (531) is not the data providing entity.

Steps 1110 to 1116 correspond to steps 1004 to 1010 illustrated in FIG. 10A, so the description of steps 1004 to 1010 should be referenced for steps 1110 to 1116.

In step 1117, service providing system A (511) acquires a public key of each service providing system from each certificate from the computer assisted name-based aggregation system (521).

Step 1118 corresponds to step 1012 illustrated in FIG. 10A, so the description of step 1012 should be referenced for step 1118.

In step 1119, service providing system A (511) creates an identification number (non-anonymized) and the aforementioned value, and arbitrarily creates a token with the user approval condition.

Steps 1120 to 1138 correspond to steps 1014 to 1032 illustrated in FIG. 10A, so the description of steps 1014 to 1032 should be referenced for steps 1120 to 1138.

Figure 12A:
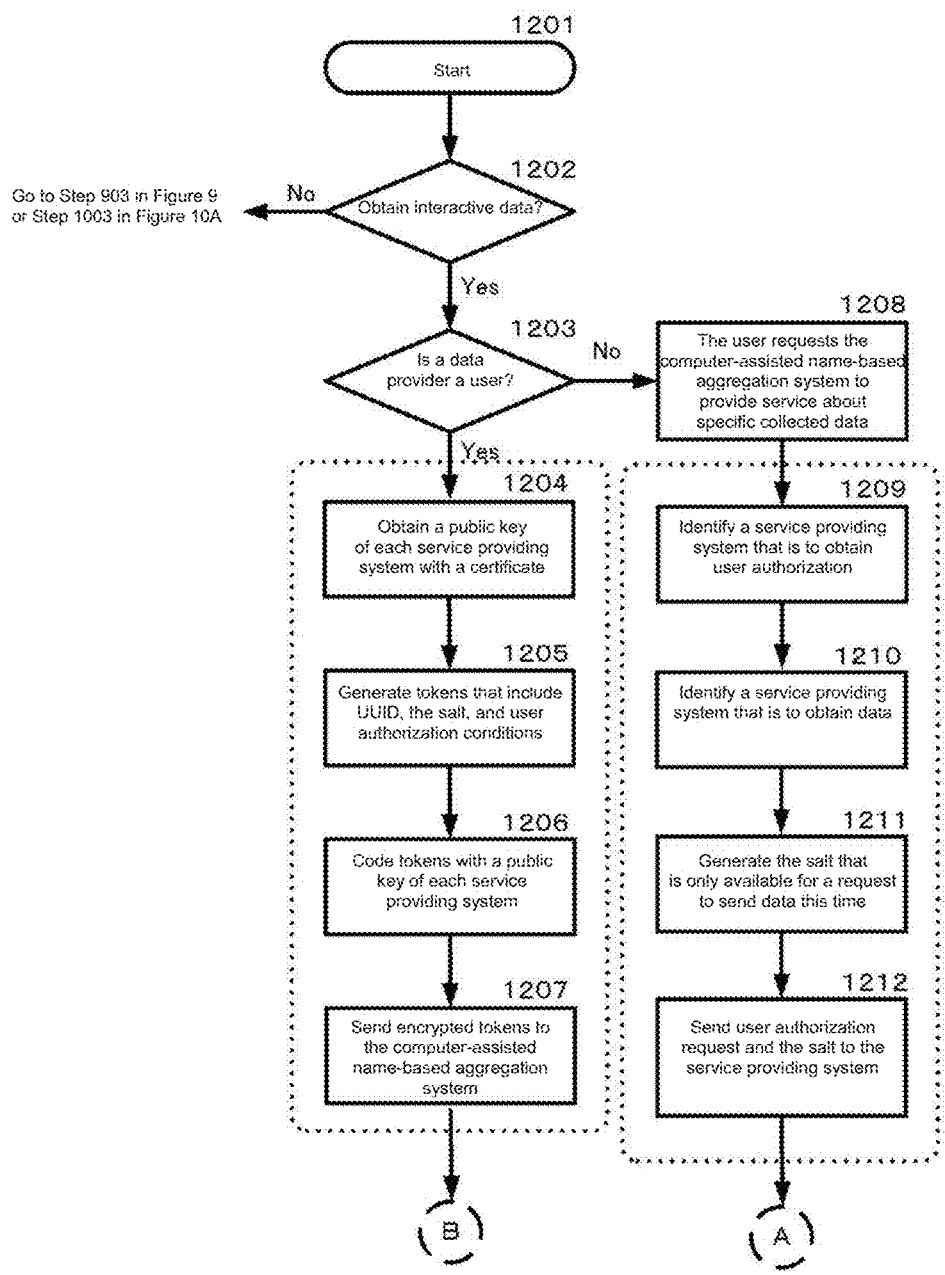
FIG. 12A illustrates a flow chart of a process for acquiring name identified data, according to an embodiment of the present invention.
Figure 12B:
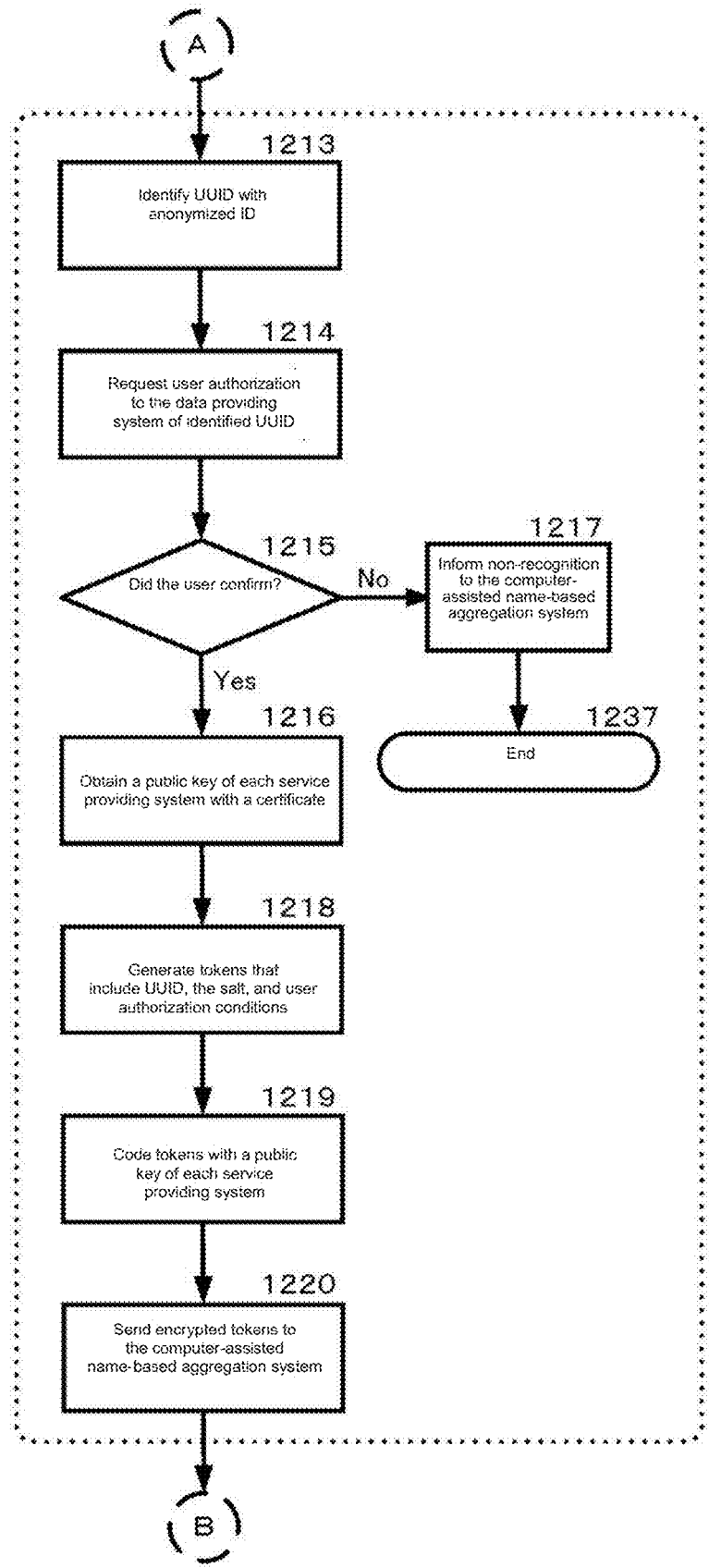
FIG. 12B illustrates a flow chart of a process for acquiring name identified data, according to an embodiment of the present invention.

FIG. 12A through FIG. 12C illustrate a flow chart of a process for acquiring name identified data, according to an embodiment of the present invention. Note that the flow chart includes similar or duplicate steps as the fourth embodiment illustrated in FIG. 6A through FIG. 6C, but it should be noted that the flow chart does not include all steps described in the fourth embodiment, nor exclude each step described in the fourth embodiment. Furthermore, in describing the flow chart, the data providing entities (601 through 604), the service providing systems A through D (611 through 614), the computer assisted name-based aggregation system (621), the user system (631) (the above are included in the computer system (600)), and the third party organization (609) in FIG. 6A are used for descriptive purposes.

In step 1201, the user system (631) or the computer assisted name-based aggregation system (621) start the aforementioned process of acquiring the name identified data.

Steps 1202 and 1203 corresponds to steps 1102 and 1103 illustrated in FIG. 11A, so the description of steps 1102 and 1103 should be referenced for steps 1202 and 1203.

However, in the aforementioned step 1203 differs from 1103 in that in step 1203, the user system (631) or the computer assisted name-based aggregation system (621) moves the process to step 1204 (acquiring a public key of the service providing systems from the certificate), if the user system (631) and the data providing entities are the same, as compared to step 1103, where the user system (631) or the computer assisted name-based aggregation system (621) moves the process to step 1104 (acquiring anonymized ID from the service providing systems).

In step 1204, the user system (631) acquires a public key of each service providing system from each certificate stored by that user system, if the user system (631) and the data providing entity are the same. The user system (631) can obtain the certificate from the third party organization (609) for example.

In step 1205, the user system (631) creates an identification number (non-anonymized) and a value that changes for each transmission request (for example, a salt) requesting name identified data or aggregate data, as well as arbitrarily creates a token with the user approval request.

In step 1206, the user system (631) encrypts the token created in step 1205, using the public keys of the service providing systems acquired in step 1204, and creates a set of encrypted tokens.

In step 1207, the user system (631) transmits the set of encrypted tokens to the computer assisted name-based aggregation system (621).

Steps 1218 and 1215 corresponds to steps 1109 through 1116 illustrated in FIG. 11A and FIG. 11B, so the description of steps 1109 through 1116 should be referenced for steps 1218 and 1215.

In step 1216, service providing system A (511) acquires a public key of each service providing system from each certificate from the computer assisted name-based aggregation system (621).

Step 1217 corresponds to step 1118 illustrated in FIG. 11B, so the description of step 1118 should be referenced for step 1217.

Steps 1221 to 1237 corresponds to steps 1122 to 1138 illustrated in FIG. 11C, so the description of steps 1122 to 1138 should be referenced for steps 1221 to 1237.

Figure 13:
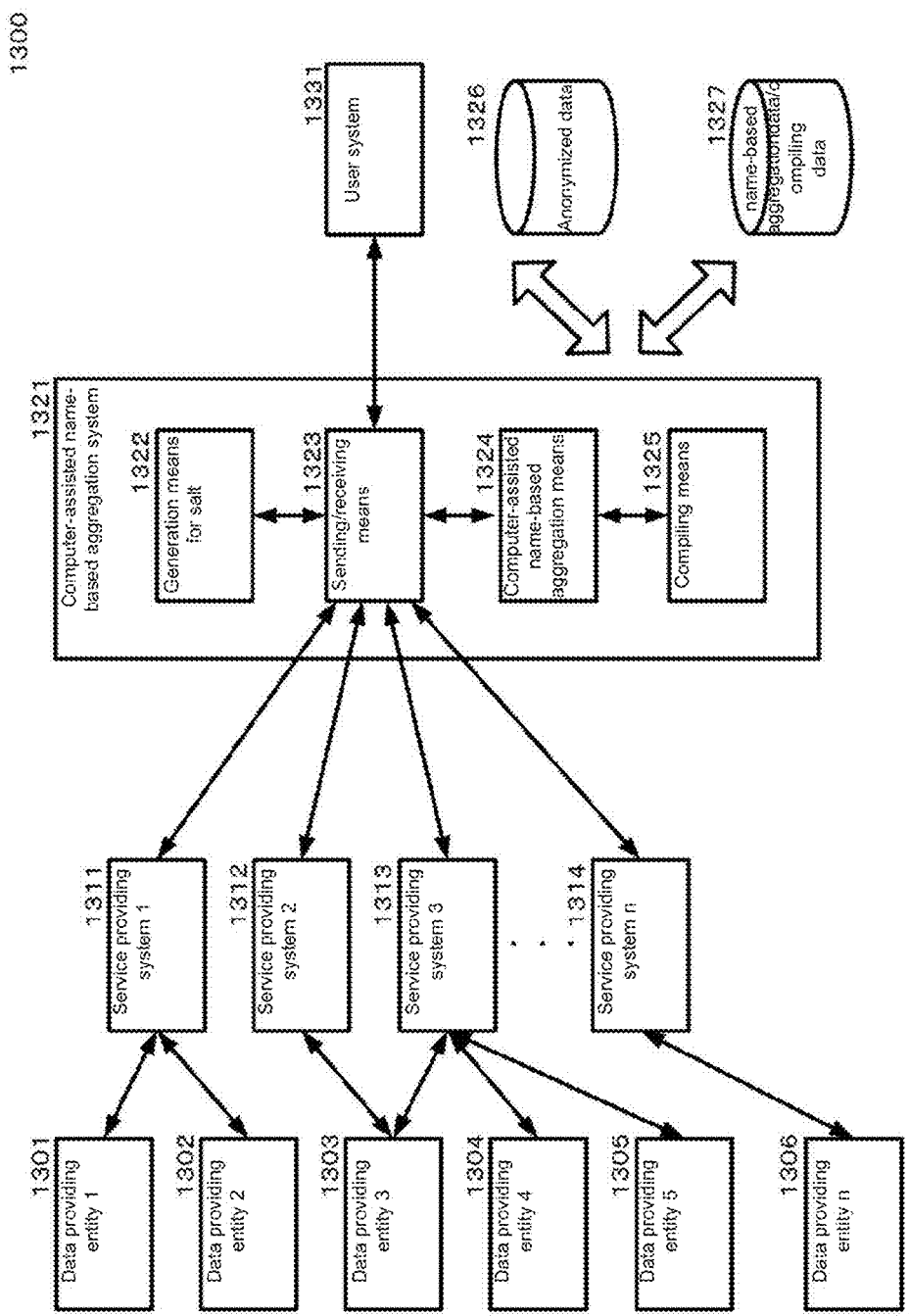
FIG. 13 is a diagram illustrating an example of a functional block diagram of a computer assisted name-based aggregation system according to an embodiment of the present invention, preferably having a hardware configuration in accordance with FIG. 1.

FIG. 13 is a diagram illustrating an example of a functional block diagram of a computer assisted name-based aggregation system according to an embodiment of the present invention, preferably having a hardware configuration in accordance with FIG. 1.

A computer system (1300) for name-based aggregation provides data entities 1 through n (1301 through 1306), service providing systems 1 through n (1311 through 1314) connected through a network to one or a plurality of the data providing entities, a computer assisted name-based aggregation system (1321) connected through a network to a plurality of the service providing systems, and a user system (1331) connected through a network to the computer assisted name-based aggregation system.

The computer assisted name-based aggregation system (1321) provides salt creating means (1322), transmitting/receiving means (1323), name identifying means (1324), and aggregating means (1325). Furthermore, the computer assisted name-based aggregation system (1321) can either provide access recording means (1326) for recording anonymized data, and recording means (1327) for recording name identified data and/or aggregate data, or can access the recording means (1326, 1327) through a cable or through a network.

The salt creating means (1322) may create a value that changes for each transmission request requesting transmission of data. Furthermore, the salt creating means (1322) may create a value that changes for each user approval request for name-based aggregation to the plurality of service providing systems.

The transmitting/receiving means (1323) may transmit and receive various data (for example, anonymized data, name identified data, and aggregate data), salt, a hash value, and various certificates that are shown in the computer assisted name-based aggregation system (321, 421, 521, 621, and 721) in FIG. 3B and FIG. 3C, FIG. 4C and FIG. 4D, FIG. 5C and FIG. 5D, FIG. 6C and FIG. 6D, and FIG. 7C and FIG. 7D, with the service providing systems 1 through n (1311 through 1324) or the user system (1331).

The computer assisted name-based aggregation system (1324) receives anonymized data from each of the plurality of service providing systems, identifies the name of the received anonymized data, and acquires name identified data. The name-based aggregation may be performed by identifying the name of the anonymized data specified by a hash value, or by identifying the name of the anonymized data specified by a token, from the anonymized data received from each of the plurality of service providing systems.

The aggregating means (1325) aggregates the name identified data using an arbitrary aggregating method, and creates aggregate data.

The recording means (1326) records the anonymized data transmitted from each of the service providing systems 1 through n (1311 through 1314). The recording means (1326) may be formed from a recording device which contains one or a plurality of physical media.

The recording means (1327) records the name identified data acquired by the name identifying means (1324), and/or the aggregate data created by the aggregating means (1325). The recording means (1327) may be formed from a recording device which contains one or a plurality of physical media.

Recording means (1326) and recording means (1327) can also be achieved by one physical recording medium (for example, the recording medium of FIG. 1).

FIG. 14 is a diagram illustrating an example of a functional block diagram of a service providing system according to an embodiment of the present invention, preferably having a hardware configuration in accordance with FIG. 1.

Service providing system 1 (1311) provides hashing means (1401), transmitting/receiving means (1402), anonymizing means (1403), encrypting/decoding means (1404), token creating means (1405), and token evaluating means (1406). Furthermore, service providing system 1 (1311) can either provide recording means (1407) for recording anonymized data, as well as recording means (1408) for recording identification information and/or an anonymized identification number (anonymized ID), and/or a mapping table thereof, or can access the recording means (1407, 1408) through a cable or through a network.

The hashing means (1401) creates a hash value by hashing the identification number (for example, UUID) using the salt.

The transmitting/receiving means (1402) may transmit and receive various data (for example, data subject to name-based aggregation, anonymized data), a salt, a hash value, a token, or various certificates that are shown for the service providing systems (311 through 314, 411 through 414, 511 through 514, 611 through 614, and 711 through 714) in FIG. 3B and FIG. 3C, FIG. 4C and FIG. 4D, FIG. 5C and FIG. 5D, FIG. 6C and FIG. 6D, and FIG. 7C and FIG. 7D, with the data providing entities 1 through n (1301 through 1306) or the computer assisted name-based aggregation system (1321).

The anonymizing means (1403) anonymizes data collected from the service providing systems 1 through n (1301 through 1306).

The encrypting/decoding means (1404) encrypts or decodes various data (for example, anonymized data). Furthermore, a token created by the token creating means (1405) is encrypted to create an encrypted token.

The token creating means (1405) creates a value that changes for each user approval request for name-based aggregation to the plurality of service providing systems, as well as arbitrarily creates a token with the user approval conditions.

Token evaluating means (1406) evaluates the user approval conditions in the token. Furthermore, the token evaluating means (1406) determines whether the tokens are the same.

Recording means (1407) records the anonymized data anonymized by anonymizing means (1403).

Recording means (1408) records identification information and/or the anonymized identification number (anonymized ID), and or the mapping table thereof.

Recording means (1407) and recording means (1408) can also be achieved by one physical recording medium (for example, the recording medium of FIG. 1).

Figure 15:
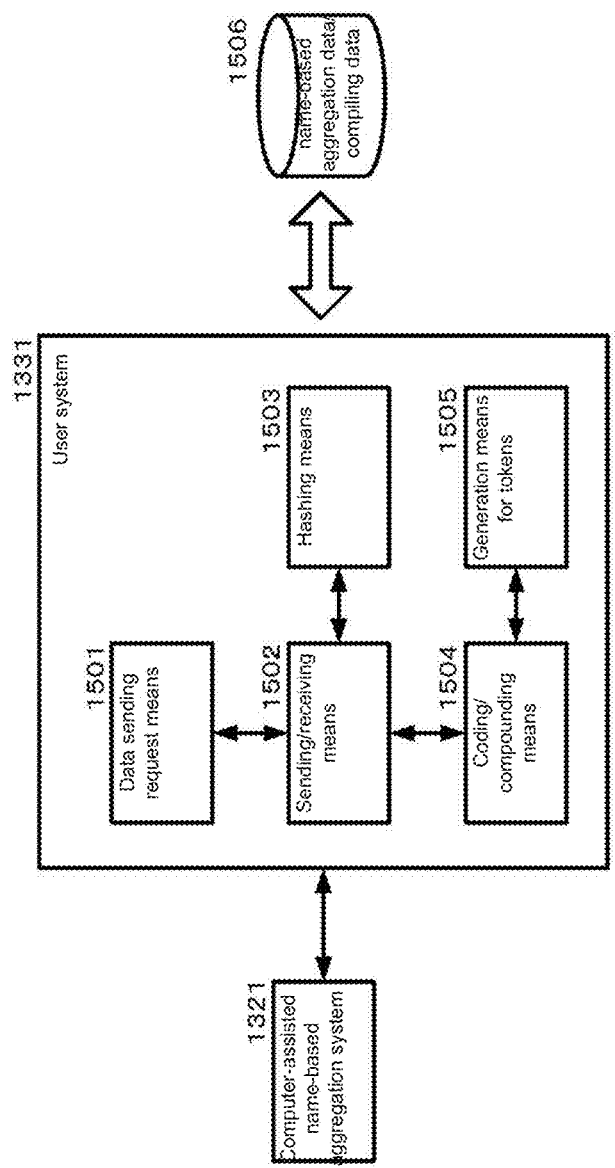
FIG. 15 is a diagram illustrating an example of a functional block diagram of a user system according to an embodiment of the present invention, preferably having a hardware configuration in accordance with FIG. 1.

FIG. 15 is a diagram illustrating an example of a functional block diagram of a user system according to an embodiment of the present invention, preferably having a hardware configuration in accordance with FIG. 1.

The user system (1331) provides data transmission requesting means (1501), transmitting/receiving means (1502), hashing means (1503), encrypting/decoding means (1504), and token creating means (1505). Furthermore, the user system (1331) either can provide recording means (1506) for recording name identified data and/or aggregate data, or can access the recording means (1506) through a cable or through a network.

The data transmission requesting means (1501) transmits a transmission request requesting transmission of name identified data or aggregate data to the computer assisted name-based aggregation system (1321).

The transmitting/receiving means (1502) may transmit and receive various data (for example, name identified data, and aggregate data), the encrypted token, or the hash value that are shown in the user system (331, 431, 531, 631, and 731) in FIG. 3B and FIG. 3C, FIG. 4C and FIG. 4D, FIG. 5C and FIG. 5D, FIG. 6C and FIG. 6D, and FIG. 7C and FIG. 7D, with the computer assisted name system (1321).

The hashing means (1503) creates a hash value by hashing the identification number (for example, UUID) using the salt.

The encrypting/decoding means (1504) decodes the encrypted name identified data or the aggregate data. Furthermore, a token created by the token creating means (1505) is encrypted to create an encrypted token.

The token creating means (1505) creates a value that changes for each transmission request requesting an identification number and data, and arbitrarily creates a token with user approval conditions.

The recording means (1506) records the name identified data and/or the aggregate data.

Figure 16:
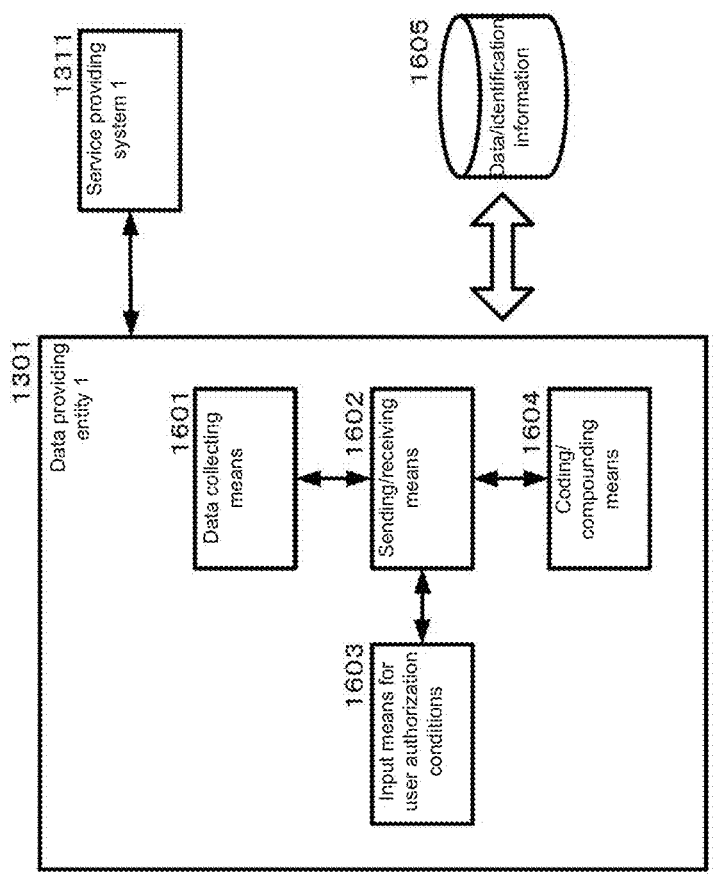
FIG. 16 is a diagram illustrating an example of a functional block diagram of a data providing entity according to an embodiment of the present invention, preferably having a hardware configuration in accordance with FIG. 1.

FIG. 16 is a diagram illustrating an example of a functional block diagram of a data providing entity according to an embodiment of the present invention, preferably having a hardware configuration in accordance with FIG. 1.

Data providing entity 1 (1301) provides data collecting means (1601), transmitting/receiving means (1602), user approval condition input means (1603), and encrypting/decoding means (1604). Furthermore, data providing entity 1 (1301) either can provide recording means (1605) for recording data and identification information to provide to service providing system 1 (1311), or can access the recording means (1605) through a cable or through a network.

The data collecting means (1601) collects data to provide to service providing system 1 (1311), and stores the collected data in the recording means (1605).

The transmitting/receiving means (1602) may transmit and receive various data (for example, data subject to name-based aggregation, original data) that are shown for the data providing entities (301 through 304, 401 through 404, 501 through 504, 601 through 604, and 701 through 704) in FIG. 3B and FIG. 3C, FIG. 4C and FIG. 4D, FIG. 5C and FIG. 5D, FIG. 6C and FIG. 6D, and FIG. 7C and FIG. 7D, with service providing systems 1 (1311). More specifically, the transmitting/receiving means (1602) receives data to provide to service providing system 1 (1311) such as from peripheral equipment provided in service providing system 1 (1311), and transmits the data stored in the recording means (1605) to service providing system 1 (1311).

User approval condition inputting means (1603) requests approval for the user approval condition from the user of data providing entity 1 (1301), and based on need, can input additional user approval conditions.

The encrypting/decoding means (1604) encrypts data to provide to service providing system 1 (1311).

The recording means (1605) records data and identification information to provide to service providing system 1 (1311).

Figure 17:
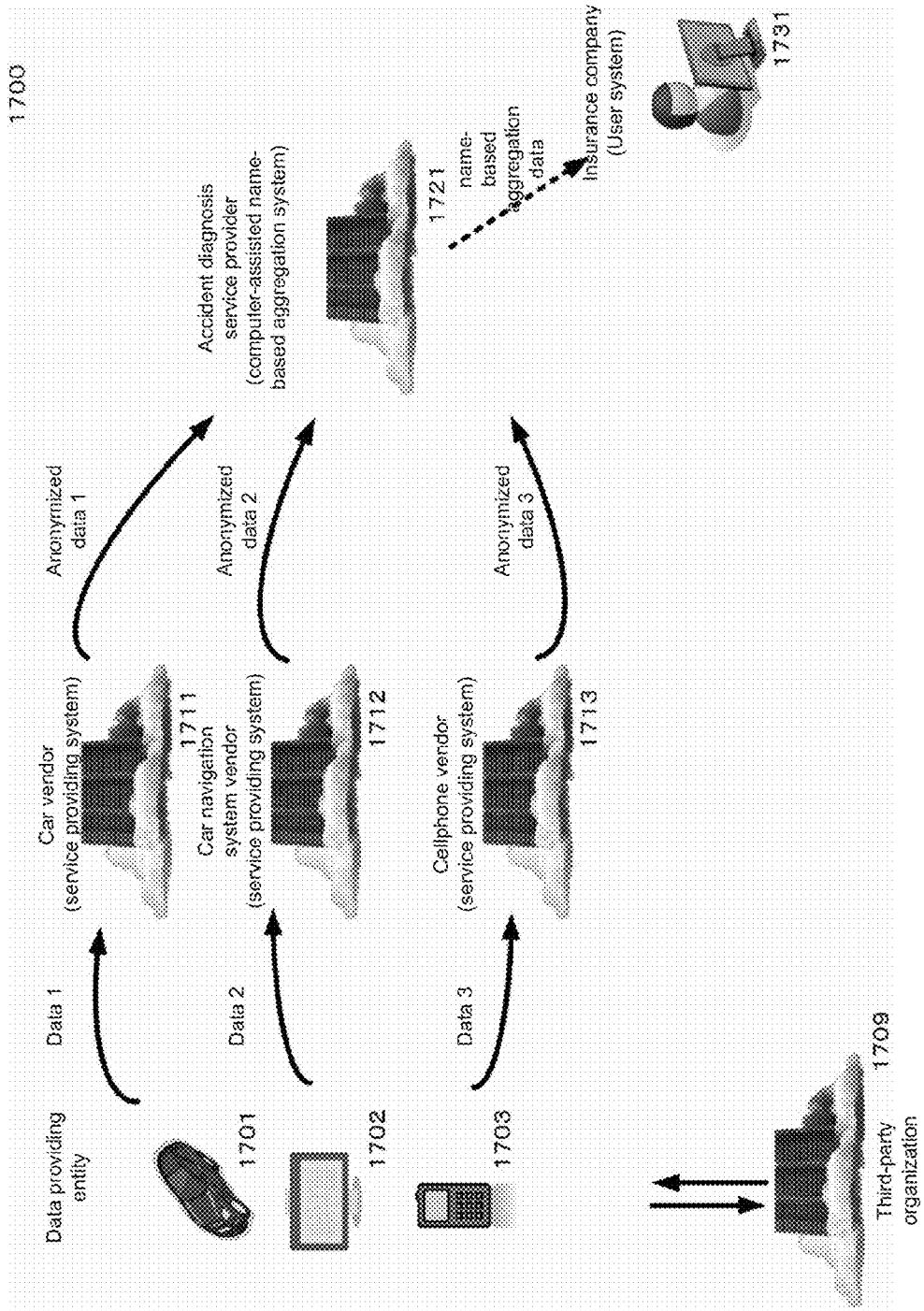
FIG. 17 illustrates an example of a process for acquiring name identified data, according to an embodiment of the present invention.
Figure 18:
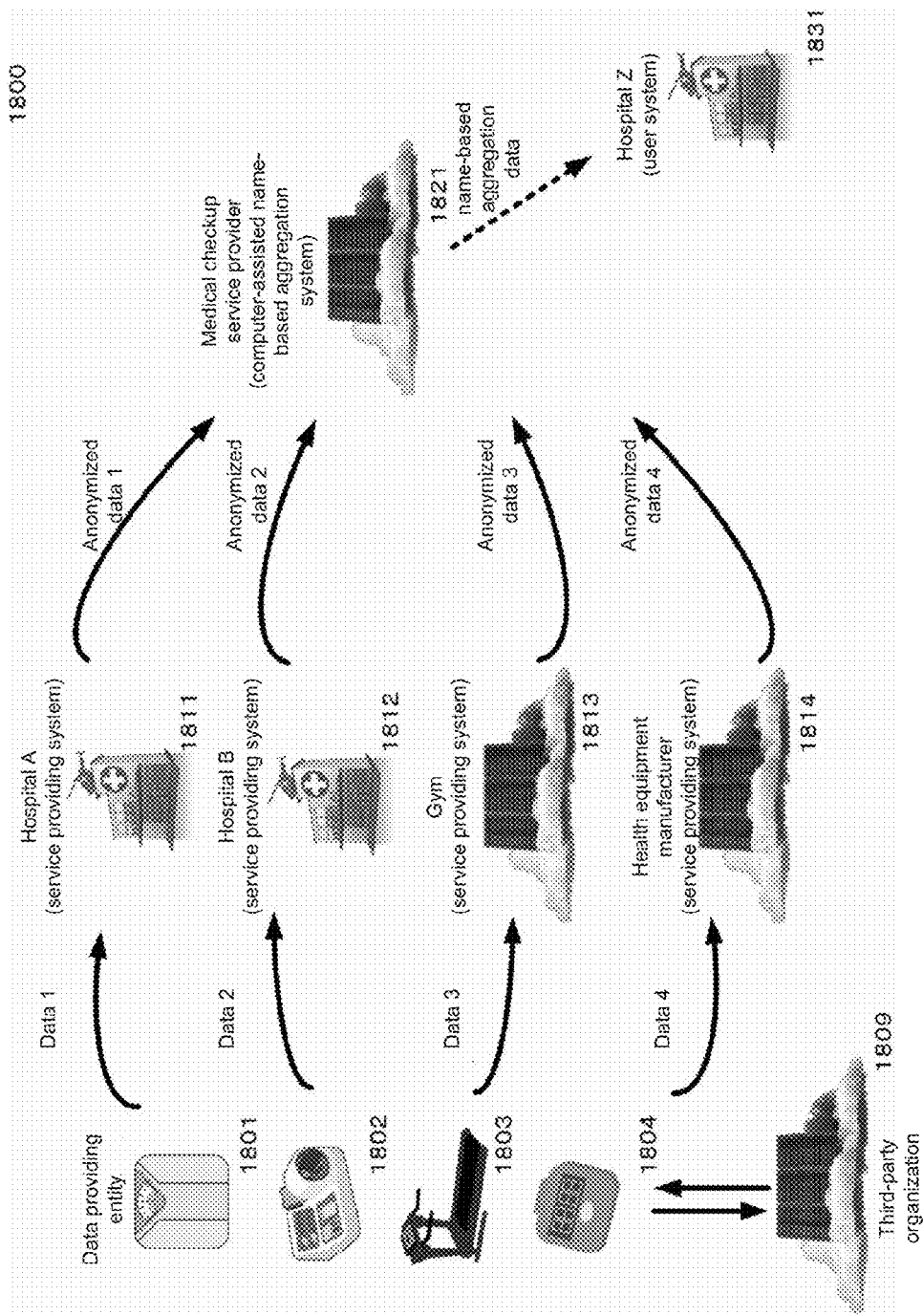
FIG. 18 illustrates an example of a process for acquiring name identified data, according to an embodiment of the present invention.
Figure 19:
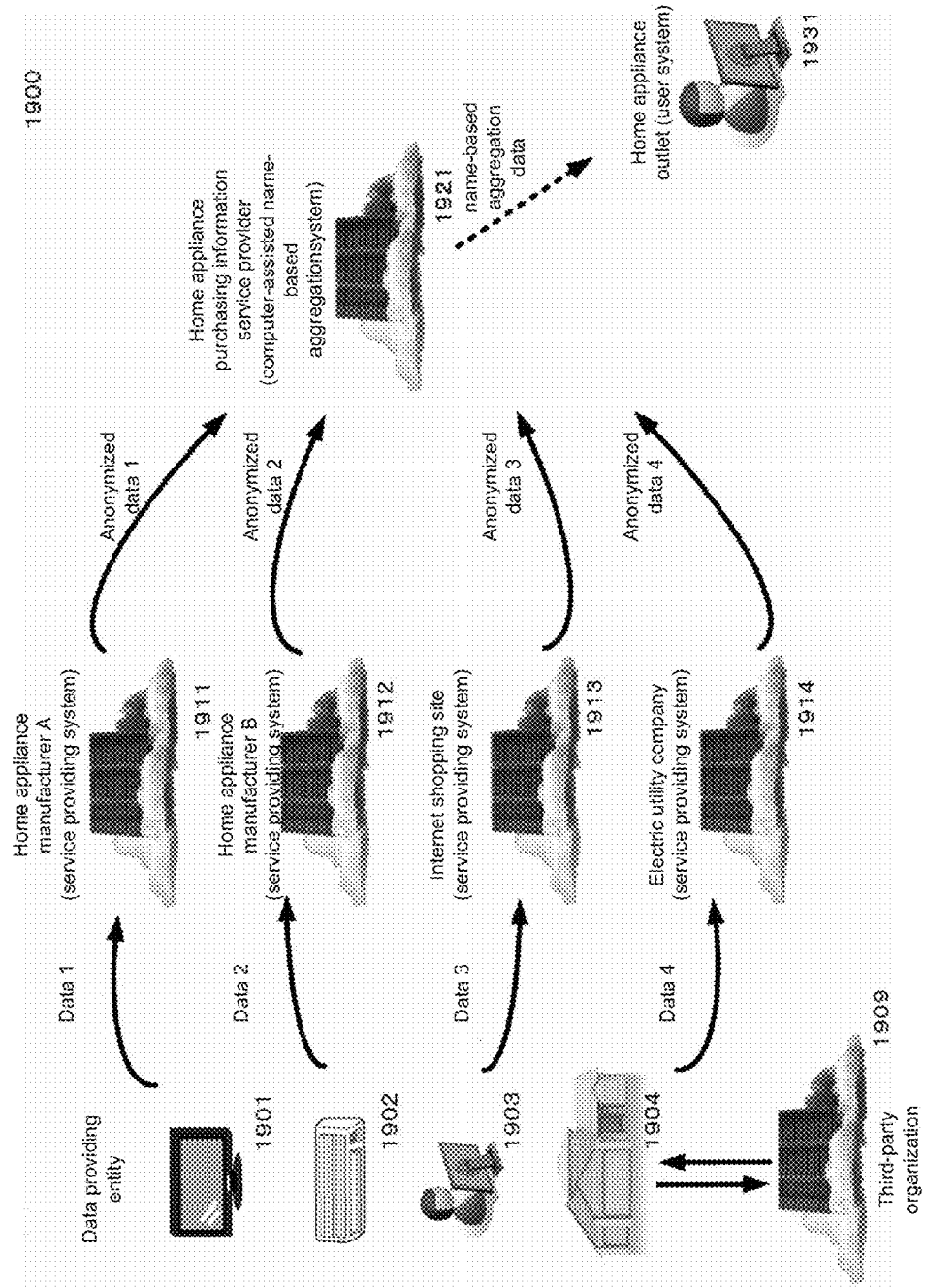
FIG. 19 illustrates an example of a process for acquiring name identified data, according to an embodiment of the present invention.

FIG. 17 through FIG. 19 illustrate an example of a process for acquiring name identified data, according to an embodiment of the present invention.

FIG. 17 illustrates an example where an accident diagnosis service providing company (1721) acquires name identified data from various data providing entities (1701 through 1703), and provides information such as a specific cause of an accident, analysis of situations that lead to accidents, relevance of mobile phone operation while driving, and the like.

Data provider X receives an identification ID (UUID) from a third party organization (1709). Data provider X has an automotive device (1701), a car navigation system (1702), and a mobile phone (1703), which are data providing entities.

Data provider X enters a contract with a server system of the car vendor (service providing system) (referred to simply as "car vendor" below) (1711) by using the identification ID, allowing collection of various information such as driving data (such as driving operation), location, speed information, oil level, and the like, and providing other various aggregate information, from an automotive electronic control unit (1701) owned by data provider X. The automotive electronic control unit (1701) transmits the various information periodically or at an arbitrary time to the car vendor (1711), or based on a data transmission request from the car vendor (1711), in accordance with the contract.

Similarly, data provider X enters a contract with a server system of the car navigation system vendor (service providing system) (referred to simply as "car navigation system vendor" below) (1712) by using the identification ID, allowing collection of various information such as weather, traffic information, traffic signals in the area, emergency vehicle information, road-to-vehicle information, and the like, and providing other various aggregate information, from the car navigation system (1702) owned by data provider X. The car navigation system (1702) transmits the various information periodically or at an arbitrary time to the car navigation system vendor (1712), or based on a data transmission request from the car navigation system vendor (1712), in accordance with the contract.

Similarly, data provider X enters a contract with a server system of the mobile phone vendor (service providing system) (referred to simply as "mobile phone vendor" below) (1713) by using the identification ID, allowing collection of various information such as operating record, acceleration information, positional information, and the like, and providing other various aggregate information, from the mobile phone (1703) owned by data provider X. The mobile phone (1703) transmits the various information periodically or at an arbitrary time to the mobile phone vendor (1713), or based on a data transmission request from the mobile phone vendor (1713), in accordance with the contract.

The accident diagnosis service providing company (a computer assisted name-based aggregation system) (1721) enters a contract with the car vendor (1711), the car navigation system vendor (1712), and the mobile phone vendor (1713), allowing collection of anonymized data, and providing the collected anonymized data or aggregate data thereof. The accident diagnosis service providing company (1721) uses the information collected in accordance with the contract with a plurality of data providers, aggregates various information per car such as average driving time or distance, correlation between the weather and driving (for example, date and time or by section of road), or car navigation usage conditions, and provides aggregate services. Furthermore, the accident diagnosis service providing system (1721) uses the information collected in accordance with the contract with a plurality of data providers, and provides accident diagnosis services.

An insurance company (a user system) (1731) enters a contract with the accident diagnosis service providing company (1721) for providing name identified data or aggregate data.

The insurance company (1731) knows that data provider X was involved in a car accident based on the driving data.

The insurance company (1731) transmits an analysis request for the accident data of data provider X to the accident diagnosis service providing company (1721). Alternatively, because the insurance company (1731) has registered for analysis of the accident data in advance to the accident diagnosis service providing company (1721), the accident diagnosis service providing company (1721) can automatically perform analysis of the accident data.

The accident diagnosis service providing company (1721) transmits data from the car vendor (1711), data of the car navigation system vendor (1712) and mobile phone vendor (1713), a user approval request for name-based aggregation, and a salt valid only for the approval request, to the car vendor (1711) that can process the user approval request. The user approval request may be a request for identifying the name of data from the car vendor (1711), and data of the car navigation system vendor (1712), and the mobile phone vendor (1713). Furthermore, the accident diagnosis service providing company (1721) transmits the anonymized ID of data provider X, as well as the certificates (including public keys) of the car navigation system vendor (1712) and the mobile phone vendor (1713) to the car vendor (1711).

The car vendor (1711) specifies the UUID from the received anonymized ID. Furthermore, the car vendor (1711) transmits the user approval request to data provider X related to the UUID (for example, mobile phone of data provider X). The mobile phone of data provider X displays a user interface of whether to approve the user approval request, based on reception of the user approval request. The mobile phone of data provider X transmits a message that the user approval request has been approved to the car vendor (1711), based on approval of the user approval request. On the other hand, the mobile phone of data provider X transmits a message that the user approval request has not been approved to the car vendor (1711), if the user approval request is not approved.

The car vendor (1711) creates a token from the UUID, the approval request, and the salt. Furthermore, the car vendor (1711) may arbitrarily acquire a public key of the car vendor (1711) from the aforementioned certificate, or from a certificate in a recording medium storing the certificate of the car vendor, and may encrypt the aforementioned token using the acquired public key. The car vendor (1711) acquires a public key for the car navigation system vendor (1712) from the aforementioned certificate, and encrypts the token using the acquired key. Similarly, the car vendor (1711) acquires a public key for the mobile phone vendor (1713) from the aforementioned certificate, and encrypts the token using the acquired key. In other words, the car vendor (1711) creates a set (referred to as "set 1 of encrypted tokens" below) containing an encrypted token encrypted by the public key of the car vendor (1711) (referred to as encrypted token A below), an encrypted token encrypted by a public key of the car navigation system vendor (1712) (referred to as encrypted token B below), and an encrypted token encrypted by a public key of the mobile phone vendor (1713) (referred to as encrypted token C below), or a set (referred to as "set 2 of encrypted tokens" below) containing the encrypted token encrypted by the public key of the car navigation system vendor (1712) (referred to as encrypted token B below), and the encrypted token encrypted by the public key of the mobile phone vendor (1713) (referred to as encrypted token C below).

The car vendor (1711) transmits set 1 or 2 of the encrypted tokens to the accident diagnosis service providing company (1721).

If set 1 of the encrypted tokens have been received, the accident diagnosis service providing company (1721) may transmit encrypted token A from set 1 to the car vendor (1711), transmit encrypted token B from set 11 to the car navigation system vendor (1712), and transmit the encrypted token C from set 1 to the mobile phone vendor (1713). Furthermore, if set 1 of the encrypted tokens have been received, the accident diagnosis service providing company (1721) may transmit encrypted token B from set 2 to the car navigation system vendor (1712), and transmit the encrypted token C from set 2 to the mobile phone vendor (1713). The accident diagnosis service providing company (1721) controls the encrypted tokens as ID. In the case of the former example where the accident diagnosis service providing company (1721) transmits the encrypted token A to the car vendor (1711), the car vendor (1711) has the encrypted token A even if the encrypted token A is not already received from the accident diagnosis service providing company (1721), so the latter example where the accident diagnosis service providing company (1721) does not transmit the encrypted token A to the car vendor (1711) is more useful as an encrypted token process without being redundant.

The car navigation system vendor (1712) receives the encrypted token B from set 1 or 2 of the encrypted tokens, decodes the received encrypted token B using a private key of the car navigation system vendor (1712), and acquired token B. The mobile phone vendor (1713) receives the encrypted token C from set 1 or 2 of the encrypted tokens, decodes the received encrypted token C using a private key of the mobile phone vendor (1713), and acquired token C.

Similarly, the car vendor (1711) evaluates the approval conditions in token A. Furthermore, the car vendor (1711) anonymizes the data (various data from a car) specified by the UUID, and transmits the anonymized data with token A to the accident diagnosis service providing company (1721), if the approval request is satisfied. The car navigation vendor (1712) evaluates the approval conditions in decoded token B. Furthermore, the car navigation system vendor (1712) anonymizes the data (various data from a car navigation system) specified by the UUID, and transmits the anonymized data with token B to the accident diagnosis service providing company (1721), if the approval request is satisfied. Similarly, the mobile phone vendor (1713) evaluates the approval conditions in decoded token C. Furthermore, the mobile phone vendor (1713) anonymizes the data (various data from a mobile phone) specified by the UUID, and transmits the anonymized data with token C to the accident diagnosis service providing company (1721), if the approval request is satisfied.

The accident diagnosis service providing company (1721) name identifies and aggregates the anonymized data from the car vendor (1711), the car navigation system vendor (1712), and the mobile phone vendor (1713), and creates aggregate data. The aggregate data may include information such as a specific cause of an accident, analysis of situations that lead to accidents (weather, traffic, or route), relevance of mobile phone operation while driving, and the like.

The accident diagnosis service providing company (1712) transmits the aggregate data to the insurance company (1731).

The insurance company (1731) uses the aggregate data for calculating the insurance payout for the automobile accident involving data provider X.

FIG. 18 illustrates an example where a medical examination service providing company (1821) acquires name identified data from various data entities (1801 through 1804), and provides information such as the correlation of a diagnosis at hospital A (1811) and a diagnosis at hospital B (1812), diagnosis of a disease based on a trend or based on both diagnosis records, analysis of relation to normal exercise records, or the like.

Data provider Y receives an identification ID (UUID) from a third party organization (1809). Data provider Y has pedometer (1804) which is a data providing entity (may be included in an application using a smartphone, or a portable computer terminal).

Data provider Y enters a contract with a server system of the hospital A (service providing system) (referred to simply as "hospital A" below) (1811) by using the identification ID, allowing hospital A (1811) to provide another hospital with diagnosis records of data provider Y at hospital (for example, data collected from the data providing entity (1801)). The data providing entity (1801) transmits the various information periodically or at an arbitrary time to the hospital A (1811), or based on a data transmission request from the hospital A (1811), in accordance with the contract.

Data provider Y enters a contract with a server system of the hospital B (service providing system) (referred to simply as "hospital B" below) (1812) by using the identification ID, allowing hospital B (1812) to provide another hospital with diagnosis records of data provider Y at hospital B (for example, data collected from the data providing entity (1802)). The data providing entity (1802) transmits the various information periodically or at an arbitrary time to the hospital B (1812), or based on a data transmission request from the hospital B (1812), in accordance with the contract.

Similarly, data provider Y enters a contract with from a server system of the gym (service providing system) (referred to simply as the "gym" below) (1813) by using the identification ID, allowing a gym (1813) to provide that gym or other gyms with exercise records of data provider Y at the gym (for example, data collected from the data providing entity (1803)). The data providing entity (1803) transmits the various information periodically or at an arbitrary time to the gym (1813), or based on a data transmission request from the gym (1813), in accordance with the contract.

Similarly, data provider Y enters a contract with a server system of the healthcare equipment manufacturer (service providing system) (referred to simply as "healthcare equipment manufacturer" below) (1814) by using the identification ID, thereby allowing exercise information from the pedometer (1804) owned by data provider Y to be provided to that or to another healthcare equipment manufacturer. The data providing entity (1804) transmits the various information periodically or at an arbitrary time to the healthcare equipment manufacturer (1814), or based on a data transmission request from the healthcare equipment manufacturer (1814), in accordance with the contract.

A medical examination service providing company (a computer assisted name-based aggregation system) (1821) enters a contract with hospital A (1811), hospital B (1812), the gym (1813), and the healthcare equipment manufacturer (1814), allowing collection of anonymized data, and providing the collected anonymized data or aggregate data to the other entities. The medical examination service providing company (1821) uses the information collected from the contract with the plurality of data providers, and provides information such as the correlation of a diagnosis at hospital A and a diagnosis at hospital B, diagnosis of a disease based on a trend or based on both diagnosis records, analysis of relation to normal exercise records, or the like. Furthermore, the medical examination service providing system (1821) uses the information collected in accordance with the contract with a plurality of data providers, and provides medical examination services.

Hospital Z (a user system) enters a contract with the medication examination service providing company (1821) to provide statistical record such as exercise, lifestyle habits, relation to other diseases, or the like, for a patient with a certain disease.

Hospital Z (1831) requests the latest statistical data to the medical examination service providing company (1821). Alternatively, because hospital Z (1831) has registered for collection of the statistical data in advance to the medical examination service providing company (1821), the medical examination service providing company (1821) can automatically perform analysis of the statistical data.

The medical examination service providing company (1821) creates a salt that is valid only for the this transmission request requesting transmission of information related to data provider Y, and transmits the salt to hospital A (1811), hospital B (1812), the gym (1813), and the healthcare equipment manufacturer (1814), with the transmission request.

Hospital A (1811), hospital B (1812), the gym (1813), and the healthcare equipment manufacturer (1814) each hash the UUID of data provider Y, and create a hash value, based on reception of the transmission request. Hospital A (1811), hospital B (1812), the gym (1813), and the healthcare equipment manufacturer (1814) each anonymize the data with the aforementioned UUID, create anonymized data, and transmit a set containing the anonymized data and the hash value to the medical examination service providing company (1821).

The medical examination service providing company (1821) receives the set containing the anonymized data and the hash value from hospital A (1811), hospital B (1812), the gym (1813), and the healthcare equipment manufacturer (1814). The medical examination service providing company (1821) identifies the name of the anonymized data specified by the hash value from the anonymized data received from the plurality of service providing systems (1811, 1812, 1813, and 1814), and acquires name identified data. The medical examination service providing company (1821) performs the following analysis for the name identified data for example, and creates aggregate data related to data provider Y.

—For a person with a certain disease:
  a relationship to having another disease, or having previous history of another disease;
  a relationship to exercise data, or to the distance walked each day; and
  a relationship to age or other information.
  a calculation of the probability of the aforementioned disease based on exercise data or walking data.

The medical examination service providing company (1812) transmits the aggregate data to hospital Z (1831).

Hospital Z (1831) receives the aforementioned aggregate data, and can provide diagnosis for patient Y considering medical examination or medication status at other hospitals, as well as exercise or the like.

FIG. 19 illustrates an example where a consumer electronics purchase information service providing company (1921) acquires name identified data from various data providing entities (1901 through 1904), and provides information such as the ratio or correlation of a house having both consumer electronic A and consumer electronic B, grasp of consumer preference, recommendation service, or the like.

Data provider Z receives an identification ID (UUID) from a third party organization (1909). Data provider Z has consumer electronic A (1901), consumer electronic B (1902), an internet shopping computer terminal (1903), and a home energy management system (HEMS) (1904), which are data providing entities.

Data provider Z enters a contract with a server system of the consumer electronics manufacturer A (service providing system) (referred to simply as "consumer electronics manufacturer A" below) (1911) by using the identification ID, allowing usage records (various information such as viewing channel, viewing time, or connected peripheral devices) to be collected, and other various aggregate information to be provided to other manufacturers, from consumer electronic A (1901) owned by data provider Z. Consumer electronic A (1901) transmits the various information periodically or at an arbitrary time to the consumer electronics manufacturer A (1911), or based on a data transmission request from consumer electronics manufacturer A (1911), in accordance with the contract.

Data provider Z enters a contract with a server system of the consumer electronics manufacturer B (service providing system) (referred to simply as "consumer electronics manufacturer B" below) (1912) by using the identification ID, allowing usage records (various information such as set temperature, operating time, wind speed, wear of replaceable parts, cleaning status, operating status such as cooling or heating) to be collected, and other various aggregate information to be provided to other manufacturers, from consumer electronic B (1902) owned by data provider Z. Consumer electronic B (1902) transmits the various information periodically or at an arbitrary time to the consumer electronics manufacturer B (1912), or based on a data transmission request from consumer electronics manufacturer B (1912), in accordance with the contract.

Data provider Z enters a contract with a server system of an internet shop (service providing system) (referred to simply as "internet shop" below) (1913) by using the identification ID, allowing usage records (various information such as ordered products, order amount, order frequency, categories with purchasing interest, and financial information) to be collected, and other various aggregate information to be provided to other manufacturers, from an internet shopping terminal (1903) owned by data provider Z. The internet shopping terminal (1903) transmits the various information periodically or at an arbitrary time to the internet shop (1912), or based on a data transmission request from internet shop (1912), in accordance with the contract.

Data provider Z enters a contract with a server system of a power company (service providing system) (referred to simply as the "power company" below) (1914) by using the identification ID, allowing usage records (various information such as power consumption, accumulated power, electricity purchases, amount of power used during a time band, amount of electricity generated at night, and information related to when which appliances are used) to be collected, and other various aggregate information to be provided to other manufacturers, from HEMS (1904) owned by data provider Z. HEMS (1904) transmits the various information periodically or at an arbitrary time to the power company (1914), or based on a data transmission request from the power company (1914), in accordance with the contract.

A consumer electronics purchase information service providing company (a computer assisted name-based aggregation system) (1921) enters a contract with consumer electronics manufacturer A (1911), consumer electronics manufacturer B (1912), the internet shop (1913), and the power company (1914), allowing collection of anonymized data, and providing the collected anonymized data or aggregate data to the other entities. Furthermore, the consumer electronics purchase information providing system (1921) uses the information collected in accordance with the contract with a plurality of data providers, and provides consumer electronics purchase information services.

A consumer electronics dealer (a user system) (1931) enters a contract with the consumer electronics purchase information service providing company (1921) for providing name identified data or aggregate data.

The consumer electronics dealer (1931) wants information on what sales activity to take for consumer electronic R with regards to what kind of consumer and where.

The consumer electronics dealer (1931) transmits a transmission request for wanted information on the consumer electronic R to the consumer electronics purchase information service providing company (1921), in conjunction with information specifying consumer electronic R.

The consumer electronics purchase information service providing company (1921) creates a salt that is valid only for the this transmission request requesting transmission of information related to consumer electronic R, and transmits the salt to consumer electronics manufacturer A (1911), consumer electronics manufacturer B (1912), the internet shop (1913), and the power company (1914), with the transmission request.

Consumer electronics manufacturer A (1911), consumer electronics manufacturer B (1912), the internet shop (1913), and the power company (1914) each hash the UUID of data provider Z, and create a hash value, based on reception of the transmission request. Similarly, the UUID of the data provider is hashed by the salt even for data providers other than data provider Z, and a hash value is created. Consumer electronics manufacturer A (1911), consumer electronics manufacturer B (1912), the internet shop (1913), and the power company (1914) each anonymize each data with UUID's of data provider Z and other data providers, and creates anonymized data. Furthermore, consumer electronics manufacturer A (1911), consumer electronics manufacturer B (1912), the internet shop (1913), and the power company (1914) each transmit a set containing the anonymized data and the hash value related to the anonymized data to the consumer electronics purchase information service providing company (1921).

The consumer electronics purchase information service providing company (1921) receives the set containing the anonymized data and the hash value from the consumer electronics manufacturer A (1911), the consumer electronics manufacturer B (1912), the internet shop (1913), and the power company (1914). The consumer electronics purchase information service providing company (1921) identifies the name of the anonymized data specified by the hash value from the anonymized data received from the plurality of service providing systems (1911, 1912, 1913, and 1914), and acquires name identified data. Consumer electronics manufacturer A (1911), consumer electronics manufacturer B (1912), the internet shop (1913), and the power company (1914) perform the following analysis for the name identified data, and create aggregate data related to consumer electronic R.

—Trends and correlations of appliance in a home: for example
   What other appliance are owned in the home;
   Use of appliances and power;
   Ratio of purchases through internet; and
   Age, level, and type of data provider.
—Trends and correlations for homes that do not have consumer electronic R (for example, potential buyers).

The consumer electronics purchase information service providing company (1921) transmits the aggregate data to the consumer electronics dealer (1931).

The consumer electronics dealer (1931) can send advertisements suitable for sales promotion of consumer electronic R, transmit direct mail to purchasers with high demand for consumer electronic R, or perform appropriate merchandise layout of consumer electronic R (for example, a display line of other merchandise) for example.

The invention claimed is:

1. A method for computer assisted name-based aggregation of anonymized data transmitted from a plurality of service providing systems, the method comprising:
   transmitting, from a computer assisted name-based aggregation system, a transmission request that requests transmission of data, and a value that changes for each transmission request to the plurality of service providing systems, wherein the value that changes for each transmission request is used for data originating from a same user;
   receiving, by the computer assisted name-based aggregation system, a set of data containing hash values created based on an identification number for controlling data and the value thereof, and the anonymized data specified by the identification number, from the plurality of service providing systems, wherein the hash values are created using a same hashing algorithm in each of the plurality of service providing systems, and wherein the identification number for controlling data identifies one of an individual or a machine related to the individual; and
   identifying, by the computer assisted name-based aggregation system, a name of anonymized data specified by the hash values from the anonymized data received from each of the plurality of service providing systems and acquires name identified data.

2. The method according to claim 1, wherein the transmission request is a first transmission request, the value that changes for each transmission request is a first value valid only for the first transmission request, and the hash value is a first hash value; and further comprising:
   transmitting, by the computer assisted name-based aggregation system, a second transmission request requesting data transmission, and a second value valid only for the second transmission request, wherein the second value is different from the first value;
   receiving, by the computer assisted name-based aggregation system, a set of data containing a second hash value created based on the identification number for controlling the data and the second value, and the anonymized data specified by the identification number, from the plurality of service providing systems; and
   identifying, by the computer assisted name-based aggregation system, the name of anonymized data specified by the second hash value from the anonymized data received from each of the plurality of service providing systems and acquires name identified data.

3. The method according to claim 1, wherein the anonymized data specified by the hash value is encrypted using a public key related to users using name identified data or aggregate data that aggregates the name identified data, and wherein the values that change for each of the transmission requests comprise values including a salt, selected from a group comprising: a random value, a date and time, and a value that combines proprietary information including a MAC address or serial number of the computer assisted name-based aggregation system or positional information including positional information or network address from a global positioning system (GPS) or a wireless LAN access point of the computer assisted name-based aggregation system at the date and time.

4. A method for computer assisted name-based aggregation of anonymized data transmitted from a plurality of service providing systems, the method comprising:
   transmitting, by a computer assisted name-based aggregation system, a user approval request for identifying a name in each of the plurality of service providing systems, and a value that changes for each approval request, to a system that can process the user approval requests, wherein the value that changes for each approval request is used for data originating from a same user;
   responsive to the system receiving the user approval request, creating, by the system, a token that has at least an identification number related to the user and the value based on the user approving name-based aggregation, wherein an identification number for controlling data identifies one of an individual or a machine related to the individual;
   encrypting the token by the system that received the user approval request;
   transmitting the encrypted token by the system that received the user approval request to the computer assisted name-based aggregation system;

transmitting, by the computer assisted name-based aggregation system, the encrypted token to the plurality of service providing systems that store anonymized data, subject to name-based aggregation;

decoding the encrypted token, by each of the service providing systems that received the encrypted token;

determining by each of the service providing systems that received the encrypted token whether the anonymized data can be transmitted to the computer assisted name-based aggregation system based on the encrypted token;

transmitting the anonymized data, by each of the service providing systems that received the encrypted token to the computer assisted name-based aggregation system based on a determination that the anonymized data can be transmitted to the computer assisted name-based aggregation system; and identifying, by the computer assisted name-based aggregation system, a name of the anonymized data as specified by the encrypted token from the anonymized data received from each of the plurality of service providing systems and acquires name identified data.

5. The method according to claim 4, wherein the encrypted token further contains user approval conditions.

6. The method according to claim 5, wherein the determining further comprises determining whether the anonymized data can be sent to the computer assisted name-based aggregation system based on the user approval conditions in the encrypted token.

7. The method according to claim 4, further comprising:
transmitting the name identified data or aggregate data aggregating the name identified data to a user system related to a user using the name identified data or the aggregate data aggregating the name identified data.

8. The method according to claim 4, wherein the anonymized data transmitted to the computer assisted name-based aggregation system is encrypted using a public key related to users using the name identified data or the aggregate data aggregating the name identified data.

9. The method according to claim 8, further comprising:
decoding the encrypted anonymized data, by a user system related to the user, using the name identified data or the aggregate data aggregating the name identified data using a private key related to the user and corresponding to the public key.

10. The method according to claim 4, wherein transmitting the anonymized data to the computer assisted name-based aggregation system further comprises:
creating a hash value based on the identification number and the value, by each of the plurality of service providing systems, wherein each of the plurality of service providing systems performs hashing using a same hashing algorithm; and
transmitting, by each of the plurality of service providing systems, a set of data containing the hash value and the anonymized data specified by the identification number to the computer assisted name-based aggregation system, and wherein
the identifying the name further comprises identifying, by the computer assisted name-based aggregation system, the name of the anonymized data specified by the hash value from the anonymized data received from each of the plurality of service providing systems and acquires name identified data.

11. The method according to claim 4, wherein the encrypting the token further comprises:

encrypting the token using public keys of each of the plurality of service providing systems and creating a set of encrypted tokens, by the system that received the user approval request; and wherein the transmitting the encrypted token to the computer assisted name-based aggregation system further comprises:

transmitting the set of encrypted tokens to the computer assisted name-based aggregation system; and wherein the decoding the encrypted token further comprises:
decoding, by the service providing system that received the encrypted token, the encrypted token using a private key for the service providing system.

12. The method according to claim 11, wherein the transmitting at least one of the encrypted tokens from the plurality of service providing systems further comprises:
transmitting one from the set of encrypted tokens to the service providing system with a private key corresponding to a public key decoding the encrypted token.

13. The method according to claim 11, wherein the transmitting to the system that can process the user approval request further comprises:
transmitting each certificate of the plurality of service providing systems to the system that can process the user approval request; and wherein
the creating the set of encrypted tokens further comprises:
retrieving public keys of the plurality of service providing systems from each certificate and encrypting the token using the retrieved public keys.

14. The method according to claim 11, wherein the creating the set of encrypted tokens further comprises:
retrieving public keys of the plurality of service providing systems from a control server controlling the public keys; and
encrypting the tokens using the retrieved public keys.

15. A method for computer assisted name-based aggregation of anonymized data transmitted from a plurality of service providing systems, the method comprising:
querying, by a user system related to a user that uses name identified data that identifies a name of the anonymized data or aggregate data that aggregates the name identified data, one of the service providing systems from the plurality of service providing systems for an anonymized identification number of the user;

transmitting, by the one service providing system from the plurality of service providing systems, a transmission request requesting data transmission and the anonymized identification number of the user to a computer assisted name-based aggregation system;

transmitting, by the computer assisted name-based aggregation system, the transmission request, a value that changes for each transmission request, and the anonymized identification number of the user to at least one of the plurality of service providing systems, wherein the value that changes for each transmission request is used for data originating from a same user, and wherein an identification number for controlling data identifies one of an individual or a machine related to the individual;

creating a token based on the anonymized identification number of the user and the value, by the service providing system that received the transmission request, wherein the value is valid only for the transmission request and the anonymized identification number;

encrypting, by the service providing system that received the transmission request, the token, the value valid only for the transmission request, and the anonymized identification number;

transmitting, by the service providing system that received the transmission request, the encrypted token, the value valid only for the transmission request, and the anonymized identification number to the computer assisted name-based aggregation system;

transmitting, by the computer assisted name-based aggregation system, at least one of the encrypted tokens to the plurality of service providing systems that stores data subject to computer assisted name-based aggregation;

decoding the at least one of the encrypted tokens, by each of the service providing systems that received the at least one of the encrypted tokens;

determining, by each of the service providing systems that received the at least one of the encrypted tokens whether the anonymized data can be transmitted to the computer assisted name-based aggregation system based on the at least one of the encrypted tokens;

transmitting, by each of the service providing systems that received the at least one of the encrypted tokens, the anonymized data to the computer assisted name-based aggregation system based on a determination that the anonymized data can be transmitted to the computer assisted name-based aggregation system; and identifying, by the computer assisted name-based aggregation system, a name of anonymized data specified by the at least one of the encrypted tokens from the anonymized data received from each of the plurality of service providing systems and acquires name identified data.

16. A method for computer assisted name-based aggregation of anonymized data transmitted from a plurality of service providing systems, the method comprising:

creating, by a user system related to the user that uses name identified data that identifies a name of the anonymized data or aggregate data that aggregates the name identified data, a token with a value that changes for each transmission request that requests transmission of the anonymized data and an identification number for controlling the anonymized data;

encrypting, by the user system, the token;

transmitting, by the user system, a transmission request and the encrypted token to a computer assisted name-based aggregation system;

transmitting, by the computer assisted name-based aggregation system, the encrypted token to the plurality of service providing systems that store anonymized data subject to computer assisted name-based aggregation;

decoding, by each of the service providing systems that received the encrypted token, the encrypted token;

determining, by each of the service providing systems that received the encrypted token, whether the anonymized data can be transmitted to the computer assisted name-based aggregation system based on the encrypted token;

transmitting, by each of the service providing systems that received the encrypted token, the anonymized data to the computer assisted name-based aggregation system based on determining that the anonymized data can be transmitted to the computer assisted name-based aggregation system; and identifying, by the computer assisted name-based aggregation system, a name of anonymized data specified by the token from the anonymized data received from each of the plurality of service providing systems and acquires name identified data.

17. The method according to claim 16, further comprising:

encrypting, by the user system, the token using public keys of each of the plurality of service providing systems and creating a set of encrypted tokens;

transmitting the set of encrypted tokens to the computer assisted name-based aggregation system; and decoding the set of encrypted tokens, by the service providing system that received the set of encrypted tokens using a private key of the service providing system.

18. A method for computer assisted name-based aggregation of anonymized data transmitted from a plurality of service providing systems, the method comprising:

transmitting, by a user system related to a user that uses name identified data that identifies a name of the anonymized data or aggregate data that aggregates the name identified data, a transmission request that requests the transmission of a value that changes for each transmission request that requesting data transmission to a computer assisted name-based aggregation system, wherein the value that changes for each transmission request is used for data originating from a same user;

creating, by the computer assisted name-based aggregation system, the value based on receiving the transmission request for the value and transmitting the created value to the user system;

creating, by the user system, a first hash value based on an identification number related to the anonymized data and the created value based on received data and transmitting the created first hash value to the computer assisted name-based aggregation system, wherein the identification number related to the anonymized data, for controlling data, identifies one of an individual or a machine related to the individual;

transmitting, by the computer assisted name-based aggregation system, the created first hash value and the created value to each of the plurality of service providing systems based on a received first hash value;

creating, by each of the service providing systems that received the created first hash value and the created value, a second hash value based on the identification number related to the anonymized data and the received first hash value, wherein each of the plurality of service providing systems performs hashing using a same hashing algorithm as the user system;

comparing, by each of the service providing systems that received the created first hash value and the created value, the first created hash value and the second created hash value and transmitting the anonymized data with the identification number used when creating the second created hash value to the computer assisted name-based aggregation system based on matching the first created hash value and the second created hash value;

identifying, by the computer assisted name-based aggregation system, a name of anonymized data specified by the first created hash value from the anonymized data received from each of the plurality of service providing systems and acquires name identified data; and transmitting, by the computer assisted name-based aggregation system, the name identified data or the aggregate data to the user system.

19. The method according to claim 18, wherein the transmitting the anonymized data with the identification number used when the second created hash value is created by each of the service providing systems to the computer assisted name-based aggregation system further comprises:
encrypting the anonymized data transmitted to the computer assisted name-based aggregation system using a public key related to the user that uses the name identified data or the aggregate data that aggregates the name identified data; and
transmitting the encrypted anonymized data to the computer assisted name-based aggregation system.

20. A computer assisted name-based aggregation system for identifying a name of anonymized data transmitted from a plurality of service providing systems, the computer assisted name-based aggregation system comprising a processor coupled to a memory having program code stored thereon that when executed by the processor directs the computer assisted name-based aggregation system to:
transmit a transmission request that requests data transmission, and a value that changes for each transmission request, to each of the plurality of service providing systems, wherein the value that changes for each transmission request is used for data originating from a same user;
receive hash values created based on a set of data containing an identification number for controlling data, the value, and the anonymized data specified by the identification number from the plurality of service providing systems, wherein the hash values are hashed using a same hashing algorithm in each of the plurality of service providing systems, and wherein the identification number for controlling data identifies one of an individual or a machine related to the individual; and
identify a name of anonymized data specified by the hash values from the anonymized data received from each of the plurality of service providing systems and acquires name identified data.

21. A computer system for name-based aggregation, the computer system comprising:
a plurality of service providing systems; and
a computer assisted name-based aggregation system for receiving anonymized data from each of the plurality of service providing systems and for identifying names of the received anonymized data, wherein:
the computer assisted name-based aggregation system transmits a user approval request that identifies a name in each of the plurality of service providing systems, and a value that changes for each user approval request, to a system that can process the user approval request, wherein the value that changes for each transmission request is used for data originating from a same user;
the system, in response to receiving the user approval request, creates a token with at least an identification number related to a user and the value based on approval of the name-based aggregation by the user, wherein the identification number, for controlling data, identifies one of an individual or a machine related to the individual;
the system, in response to receiving the user approval request encrypts the token
and transmits the encrypted token to the computer assisted name-based aggregation system;
the computer assisted name-based aggregation system transmits the encrypted token to the plurality of service providing systems that store anonymized data subject to computer assisted name-based aggregation;
each of the service providing systems, in response to receiving the encrypted token, decodes the encrypted token,
determines whether the anonymized data can be transmitted to the computer assisted name-based aggregation system based on the encrypted token,
and transmits the anonymized data to the computer assisted name-based aggregation system based on determining that the anonymized data can be transmitted to the computer assisted name-based aggregation system; and
the computer assisted name-based aggregation system identifies a name of the anonymized data specified by the encrypted token from the anonymized data received from each of the plurality of service providing systems and acquires name identified data.

22. A computer system for name-based aggregation, the computer system comprising:
a plurality of service providing systems;
a computer assisted name-based aggregation system for receiving anonymized data from each of the plurality of service providing systems and for identifying names of the received anonymized data; and
a user system related to a user using name identified data, wherein:
the user system queries an anonymized identification number of the user of one of the service providing systems from the plurality of service providing systems;
the one service providing system from the plurality of service providing systems transmits a transmission request requesting data transmission and the anonymized identification number to the computer assisted name-based aggregation system;
the computer assisted name-based aggregation system transmits the transmission request, a value that changes for each transmission request, and the anonymized identification number to at least one of the plurality of service providing systems, wherein the value that changes for each transmission request is used for data originating from a same user;
the one service providing system, in response to receiving the transmission request, the value that changes for each of the transmission requests, and the anonymized identification number, creates a token based on the anonymized identification number and the value, encrypts the token, and transmits the encrypted token to the computer assisted name-based aggregation system;
the computer assisted name-based aggregation system transmits the encrypted token to the plurality of service providing systems that stores the data subject to name-based aggregation;
each of the plurality of service providing systems, in response to receiving the encrypted token, decodes the encrypted token, determines whether the anonymized data can be transmitted to the computer assisted name-based aggregation system based on the encrypted token, and transmits the anonymized data to the computer assisted name-based aggregation system based on determining that the anonymized data can be transmitted to the computer assisted name-based aggregation system; and
the computer assisted name-based aggregation system identifies a name of anonymized data specified by the encrypted token from the anonymized data received from each of the plurality of service providing systems and acquires name identified data.

23. A computer system for name-based aggregation, the computer system comprising:
 a plurality of service providing systems;
 a computer assisted name-based aggregation system for receiving anonymized data from each of the plurality of service providing systems and for identifying names of the received anonymized data; and
 a user system related to a user that uses name identified data or aggregate data that aggregates the name identified data, wherein:
  the user system related to the user that uses the name identified data or the aggregate data creates a token with an identification number for controlling the anonymized data and a value that changes for each transmission request requesting transmission of the anonymized data, wherein the value that changes for each transmission request is used for data originating from a same user;
  the user system encrypts the token;
  the user system transmits the transmission request and the encrypted token to the computer assisted name-based aggregation system;
  the computer assisted name-based aggregation system transmits the encrypted token to the plurality of service providing systems that stores anonymized data subject to computer assisted name-based aggregation;
  each of the service providing systems that receives the encrypted token, decodes the encrypted token, determines whether the anonymized data can be transmitted to the computer assisted name-based aggregation system based on the encrypted token, and transmits the anonymized data to the computer assisted name-based aggregation system based on determining that the anonymized data can be transmitted to the computer assisted name-based aggregation system; and
  the computer assisted name-based aggregation system identifies a name of anonymized data specified by the encrypted token from the anonymized data received from each of the plurality of service providing systems and acquires name identified data.

24. A computer system for name-based aggregation, the computer system comprising:
 a plurality of service providing systems;
 a computer assisted name-based aggregation system for receiving anonymized data from each of the plurality of service providing systems and for identifying names of the received anonymized data; and
 a user system related to a user that uses the name identified data or aggregate data that aggregates the name identified data, wherein:
 the user system transmits a transmission request that requests transmission of a value that changes for each transmission request that requests data transmission to the computer assisted name-based aggregation system, wherein the value that changes for each transmission request is used for data originating from a same user;
 the computer assisted name-based aggregation system creates the value based on the received transmission request for the value and transmits the created value to the user system;
 the user system creates a first hash value based on an identification number related to the anonymized data and the value based on received data and transmits the first hash value to the computer assisted name-based aggregation system, wherein the identification number related to the anonymized data, for controlling data, identifies one of an individual or a machine related to the individual;
 the computer assisted name-based aggregation system transmits the first hash value and the value to each of the plurality of service providing systems based on the first hash value;
 each of the service providing systems receiving the first hash value and the value creates a second hash value based on the identification number related to the anonymized data and the value, wherein each of the plurality of service providing systems performs hashing using a same hashing algorithm as the user system;
 each of the service providing systems receiving the first hash value and the value compares the first hash value and the second hash value and transmits the anonymized data with the identification number used when creating the second hash value to the computer assisted name-based aggregation system based on matching the first hash value and the second hash value;
 the computer assisted name-based aggregation system identifies a name of anonymized data specified by the first hash value from the anonymized data received from each of the plurality of service providing systems and acquires name identified data; and
 the computer assisted name-based aggregation system transmits the name identified data or the aggregate data that aggregates the name identified data to the user system.

25. A computer program product comprising a non-transitory computer readable storage medium having computer program code recorded thereon that when executed by a data processing system directs the data processing system to:
 transmit, from a computer assisted name-based aggregation system, a transmission request that requests transmission of data and a value that changes for each transmission request to a plurality of service providing systems, wherein the value that changes for each transmission request is used for data originating from a same user;
 receive, by the computer assisted name-based aggregation system, a set of data containing hash values created based on an identification number for controlling data, the value, and the anonymized data specified by the identification number from the plurality of service providing systems, wherein the hash values are created using a same hashing algorithm in each of the plurality of service providing systems, and wherein the identification number for controlling data identifies one of an individual or a machine related to the individual; and
 identify, by the computer assisted name-based aggregation system, a name of anonymized data specified by the hash values from the anonymized data received from each of the plurality of service providing systems and acquires name identified data.

* * * * *